United States Patent
Favor et al.

(10) Patent No.: US 11,868,469 B2
(45) Date of Patent: Jan. 9, 2024

(54) PROCESSOR THAT MITIGATES SIDE CHANNEL ATTACKS BY PREVENTING ALL DEPENDENT INSTRUCTIONS FROM CONSUMING ARCHITECTURAL REGISTER RESULT PRODUCED BY INSTRUCTION THAT CAUSES A NEED FOR AN ARCHITECTURAL EXCEPTION

(71) Applicant: Ventana Micro Systems Inc., Cupertino, CA (US)

(72) Inventors: John G. Favor, San Francisco, CA (US); Srivatsan Srinivasan, Cedar Park, TX (US)

(73) Assignee: Ventana Micro Systems Inc., Cupertino, CA (US)

( * ) Notice: Subject to any disclaimer, the term of this patent is extended or adjusted under 35 U.S.C. 154(b) by 193 days.

(21) Appl. No.: 17/204,701

(22) Filed: Mar. 17, 2021

(65) Prior Publication Data

US 2022/0067155 A1 Mar. 3, 2022

Related U.S. Application Data

(63) Continuation-in-part of application No. 17/004,581, filed on Aug. 27, 2020, and a continuation-in-part of (Continued)

(51) Int. Cl.
*G06F 21/55* (2013.01)
*G06F 21/54* (2013.01)
(Continued)

(52) U.S. Cl.
CPC ........ *G06F 21/556* (2013.01); *G06F 9/30101* (2013.01); *G06F 9/3842* (2013.01); (Continued)

(58) Field of Classification Search
CPC .. G06F 21/556; G06F 9/30101; G06F 9/3842; G06F 9/3857; G06F 21/54; G06F 21/554; G06F 9/3861; G06F 9/3858
See application file for complete search history.

(56) References Cited

U.S. PATENT DOCUMENTS

| 4,742,451 A | 5/1988 | Bruckert et al. |
| 5,371,855 A | 12/1994 | Idleman et al. |

(Continued)

FOREIGN PATENT DOCUMENTS

| CN | 110232031 A | 9/2019 |
| JP | 2021520545 A | 8/2021 |

OTHER PUBLICATIONS

Saporito et al., IBM J. Res. & Dev, "Design of the IBM z15 microprocessor", Published Jul. 10, 2020, pp. 7:1-7:11 (Year: 2020).*

(Continued)

*Primary Examiner* — Khalil Naghdali
(74) *Attorney, Agent, or Firm* — E. Alan Davis; Huffman Law Group, PC

(57) ABSTRACT

A microprocessor that mitigates side channel attacks includes a front end that processes instructions in program order and a back end that performs speculative execution of instructions out of program order in a superscalar fashion. Producing execution units produce architectural register results during execution of instructions. Consuming execution units consume the produced architectural register results during execution of instructions. The producing and consuming execution units may be the same or different execution units. Control logic detects that, during execution by a producing execution unit, an architectural register result producing instruction causes a need for an architectural exception and consequent flush of all instructions younger in program order than the producing instruction and prevents all instructions within the back end that are dependent upon (Continued)

---

Receive first and second load operations 702

↓

Detect condition in which first load generates need for architectural exception, second load misses in data cache, and second load is newer in program order than the first load 704

↓

Prevent state of data cache from being affected by the miss of the second load operation by inhibiting generation of its fill request or by canceling the fill request if the fill request was already generated 706 the producing instruction from consuming the architectural register result produced by the producing instruction.

22 Claims, 21 Drawing Sheets

Related U.S. Application Data application No. 17/064,540, filed on Oct. 6, 2020, now Pat. No. 11,733,972.

(51) Int. Cl.
  *G06F 9/30* (2018.01)
  *G06F 9/38* (2018.01)
(52) U.S. Cl.
  CPC ............ *G06F 9/3858* (2023.08); *G06F 21/54* (2013.01); *G06F 21/554* (2013.01)

(56) References Cited

U.S. PATENT DOCUMENTS

| | | | |
|---|---|---|---|
| 5,383,143 A | 1/1995 | Crouch et al. | |
| 5,479,616 A * | 12/1995 | Garibay, Jr. | G06F 9/3802 |
| | | | 712/E9.055 |
| 5,561,774 A * | 10/1996 | Aikawa | G06F 9/3863 |
| | | | 712/E9.071 |
| 5,778,245 A | 7/1998 | Papworth et al. | |
| 6,098,167 A * | 8/2000 | Cheong | G06F 9/3863 |
| | | | 712/228 |
| 7,711,763 B2 * | 5/2010 | Stribaek | G06F 7/724 |
| | | | 708/492 |
| 10,116,436 B1 | 10/2018 | Kodalapura et al. | |
| 11,119,784 B2 | 9/2021 | Branco et al. | |
| 11,176,055 B1 | 11/2021 | Mukherjee et al. | |
| 11,579,884 B2 | 2/2023 | Venkatachar et al. | |
| 11,593,504 B1 | 2/2023 | Yates et al. | |
| 2004/0148468 A1 | 7/2004 | Hooker | |
| 2007/0022348 A1 * | 1/2007 | Racunas | G06F 11/1641 |
| | | | 714/E11.063 |
| 2007/0028051 A1 | 2/2007 | Williamson et al. | |
| 2007/0244950 A1 | 10/2007 | Golic | |
| 2008/0109614 A1 | 5/2008 | Begon et al. | |
| 2008/0148282 A1 | 6/2008 | Sodani et al. | |
| 2010/0199045 A1 | 8/2010 | Bell et al. | |
| 2010/0281219 A1 | 11/2010 | Lippert et al. | |
| 2012/0159103 A1 | 6/2012 | Peinado et al. | |
| 2013/0067202 A1 * | 3/2013 | Henry | G06F 9/30174 |
| | | | 712/E9.016 |
| 2013/0151819 A1 | 6/2013 | Piry et al. | |
| 2015/0089152 A1 | 3/2015 | Busaba et al. | |
| 2015/0254189 A1 | 9/2015 | Coppola et al. | |
| 2019/0004961 A1 | 1/2019 | Boggs et al. | |
| 2019/0114422 A1 | 4/2019 | Johnson et al. | |
| 2019/0138720 A1 * | 5/2019 | Grewal | G06F 9/3863 |
| 2019/0266091 A1 | 8/2019 | Robinson et al. | |
| 2019/0286821 A1 | 9/2019 | Strogov et al. | |
| 2020/0089625 A1 | 3/2020 | Wallach | |
| 2020/0133679 A1 * | 4/2020 | Brandt | G06F 9/3844 |
| 2020/0210070 A1 | 7/2020 | Durham | |
| 2020/0250099 A1 | 8/2020 | Campbell et al. | |
| 2021/0135882 A1 * | 5/2021 | Sun | H04L 9/0825 |
| 2021/0144517 A1 | 5/2021 | Guim Bernat et al. | |
| 2022/0067154 A1 | 3/2022 | Favor et al. | |
| 2022/0067156 A1 | 3/2022 | Favor et al. | |
| 2022/0107784 A1 | 4/2022 | Favor et al. | |
| 2022/0108012 A1 | 4/2022 | Favor et al. | |
| 2022/0108013 A1 | 4/2022 | Favor et al. | |

OTHER PUBLICATIONS

Abu-Ghazaleh, Nael et al. "How the Spectre and Meltdown Hacks Really Worked." IEEE Spectrum. Downloaded on Nov. 24, 2019 from https://spectrum.IEEE.org/computing/hardware/how-the-spectre-andmeltdown-hacks-really-worked. pp 1-10.

Fruhlinger, Josh. "Spectre and Meltdown Explained: What They Are, How They Work, What's at Risk." CSO Online. Downloaded on Nov. 24, 2019 from https://csoonline.com/article/3247868/spectre-and-meltdown-explained-what-they-are-how-they-work-whats-at-risk.html pp. 1-10.

Frogh, Anders et al. "Wrangling the Ghost: An Inside Story of Mitigating Speculative Execution Side Channel Vulnerabilities." Microsoft. Downloaded on Nov. 24, 2019 from https://i.blackhat.com/us-18/Thu-August-9/us-18-Fogh-Ertl-Wrangling-with-the-Ghost-An-Inside-Story-of-Mitigating-Speculative-Execution-Side-Channels-Vulnerabilities.pdf. pp. 1-44.

Intel Analysis of Speculative Execution Side Channels. White Paper. Revision 1.0. Jan. 2018. Document No. 336983-001. Pages 1-12.

Cache Speculation Side-Channels. Whitepaper. Arm Limited. Version 2.4. Oct. 2018. pp. 1-21.

Kocher, Paul et al. "Spectre Attacks: Exploiting Speculative Execution." Submitted on Jan. 3, 2018. Cornell University, Computer Science, Cryptography and Security. arXiv.org>cs>arXiv:1801.01203. pp. 1-19.

Yarom, Yuval et al. "Flush+Reload: a High Resolution, Low Noise, L3 Cache Side-Channel Attack." The University of Adelaid. Computer Science, IACR Cryptol. ePrint Arch. 2013. pp. 1-14.

Ge, Qian et al. "A Survey of Microarchitectural Timing Attacks and Countermeasures on Contemporary Hardware." Journal of Cryptographic Engineering 8, Apr. 2018. pp. 1-37.

Lipp, Moritz et al. "Meltdown: Reading Kernel Memory from user Space." 27th USENIX Security Symposium. Aug. 15-17, 2018. Baltimore, MD, USA. pp. 973-990 ISBN 978-1-939133-04-5.

Ainsworth, Sam et al. "MuonTrap: Preventing Cross-Domain Spectre-Like Attacks by Capturing Speculative State." 2020 ACM/IEEE 47th Annual International Symposium on Computer Architecture (ISCA). pp. 132-144.

Do, Sang Wook Stephen et al. "Transaction-Based Core Reliability." 2020 IEEE International Parallel and Distributed Processing Symposium (IPDPS). pp. 168-179 DOI: 10.1109/IPDPS47924.2020.00027.

\* cited by examiner

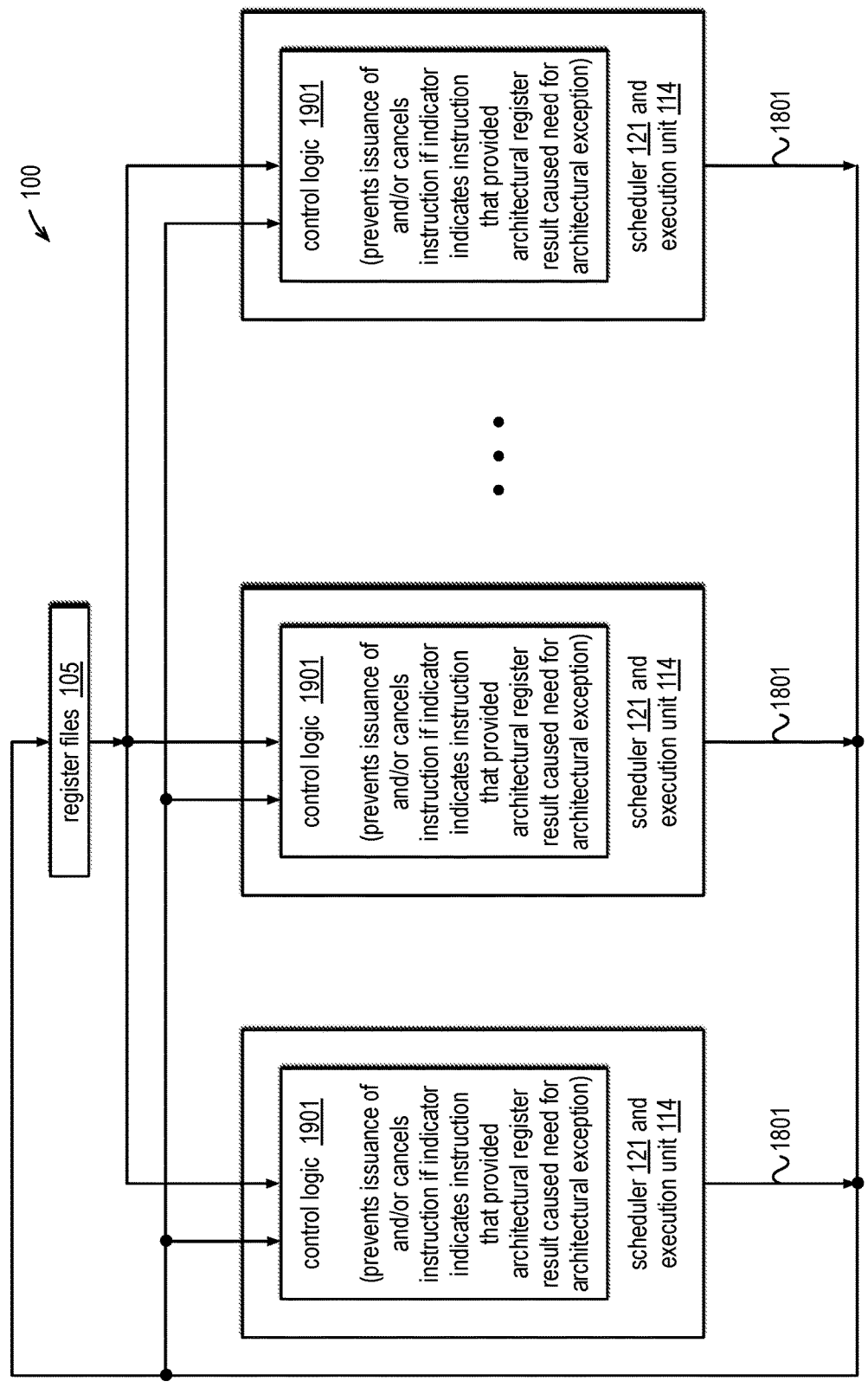

PROCESSOR THAT MITIGATES SIDE CHANNEL ATTACKS BY PREVENTING ALL DEPENDENT INSTRUCTIONS FROM CONSUMING ARCHITECTURAL REGISTER RESULT PRODUCED BY INSTRUCTION THAT CAUSES A NEED FOR AN ARCHITECTURAL EXCEPTION

CROSS REFERENCE TO RELATED APPLICATION(S)

This application is a continuation-in-part of U.S. patent application Ser. No. 17/004,581 (VENT.0119), filed Aug. 27, 2020, and is a continuation-in-part of U.S. patent application Ser. No. 17/064,540 (VENT.0102), filed Oct. 6, 2020, each of which is hereby incorporated by reference in its entirety.

BACKGROUND

A side channel is an unintended pathway that leaks information from one software program (a victim program) to another (the attacker program). The leaked information may be a secret that the victim does not want the attacker to know, such as an encryption key or bank account information. The unintended pathway can, in theory, be any shared hardware resource, such as a central processing unit (CPU) cache, a branch predictor, or a translation lookaside buffer (TLB).

Side channel attacks (SCAs) exploit microarchitectural speculation in high-performance CPUs to break architectural security protections. Speculative execution of an instruction means execution of the instruction during a time when at least one instruction older in program order than the instruction has not completed execution such that a possibility exists that execution of the older instruction will result in an abort, i.e., flush, of the instruction. Opportunities for speculative execution by a CPU are often created by predictions, such as predictions of branch instruction outcomes or predictions that the data written to memory by an instruction is the data that a later instruction wants to read. As a result, an attacker may "encode" privileged information into persistent microarchitectural state. For example, an attacker may encode privileged information, such as a security key, in the presence or absence of a line in a cache if speculatively accessed. This presence or absence of the speculatively accessed line in the cache is not the architectural state of the CPU and therefore not directly visible by the attacker program. However, it may be indirectly visible to an SCA.

More specifically, speculative execution may leave traces of the privileged information in microarchitectural state that can then be revealed based upon the time it takes selected instructions to execute. SCA exploits detect these timing "signals" or differences in the timing of accesses to memory addresses to infer the privileged information used by the victim program.

In a "Flush and Reload" attack, for example, the attacker program first flushes cache lines from the cache at 256 possible memory addresses the victim program will access depending upon the value of a secret data byte the attacker wants to determine (e.g., a byte of an encryption key). The attacker program then causes or waits for the victim program to access the secret data byte, use the secret data byte value to generate a memory address (that is one of the 256 known addresses), and bring the data at the (secret data byte-dependent) generated address into the cache. Next, the attacker program systematically accesses the 256 possible address locations, timing how long each of the 256 accesses takes, which is affected by whether a cache hit or cache miss occurs. By determining which of the 256 addresses was quickly accessed (i.e., got a cache hit), the attacker program indirectly determines the value of the secret data byte.

Known side-channel exploits can be roughly categorized into four groups. Spectre-type attacks are based on speculation past control and data dependencies, e.g., branch predictions. Meltdown-type attacks are based on speculation past architectural or microarchitectural faults, e.g., memory protection violations. Microarchitectural data sampling (MDS) type attacks are based on speculative sampling of stale state left in microarchitectural buffers between a processor and its cache. Microarchitectural shared resource type attacks are based on observation of cross-thread contention for shared microarchitectural resources in multi-threaded CPU designs. Furthermore, even in non-multi-threaded CPUs, there may be shared cache resources (e.g., a shared second-level cache or last level cache (LLC) or snoop filters), which may be leveraged in a shared resource type attach. Such attacks have been effective on some CPUs that have a globally shared inclusive LLC.

"Spectre" attacks trick the processor into incorrect speculative execution. Consider a victim program that contains secret data, such as a secret key, in its memory address space. By searching the compiled victim binary and the operating system's (OS's) shared libraries, an attacker discovers instruction sequences, such as conditional and indirect branches, that can be exploited to reveal information from that address space. Assume that the attacker knows the general or specific location of the secret data.

In a conditional branch attack, the attacker writes a program with mis-training and exploitation aspects. First, the attacker program mis-trains the branch predictor of the CPU to predict that a branch condition of a piece of victim code will be satisfied. For example, in the "Spectre v1" attack, an attacker program causes code to run in a victim program that includes a conditional branch instruction, such as "If index1<array1size then index2=array1[index1] and junk=array2[index2*multiplier]." In the example code, array1 is an array of unsigned bytes and index2 is an unsigned byte. In the victim code, index1 is a large data type (e.g., 32 bits) and can therefore have a very large value. For values of index1 less than array1size, memory accesses are legal; whereas, for values of index1 greater than array1size, memory accesses are illegal. That is, the array bounds check is intended to prevent memory accesses outside array1. The result generated from this first operation ("index2=array1 [index1]") is referred to herein as "index2" because it is used to index into array2. The "multiplier" value causes distinct cache lines to be implicated by different values of the secret byte so that later, during a probing portion of the SCA, the attacker reads from 256 different memory addresses that correspond to 256 different cache lines that are implicated by the 256 different possible values of "index2."

To mis-train the branch predictor, the conditional branch instruction is run with valid values for index1 a sufficient number of times to train the branch predictor to predict that the branch condition will be satisfied, i.e., to train the branch predictor that index1 is within the bounds of array1. Previously, the relevant cache lines are either explicitly or effectively flushed. This constitutes the "flush" and "mis-train" aspects of the attack.

The attacker program then invokes the same conditional branch instruction in the victim code using a malicious index1 value that equals the address offset between the memory location of the first element of array1 and the known or guessed memory location of the secret data byte. (Some SCAs instead invoke a different conditional branch instruction that aliases to the same entry in the branch predictor that was trained by the attacker.) The malicious index1 value is outside the bounds of array1. However, because the branch predictor has been maliciously mistrained, it predicts that the malicious index1 value is in the bounds of array1 (i.e., index1<array1size). Therefore, the processor speculatively executes "array1[index1]" using the malicious index1 value. This results in the secret data byte value being loaded from the out-of-bounds location in the victim's memory into a register of the processor, namely from the address of the secret data byte.

Because the attacker flushed the value of array1 size from cache prior to invoking the victim code, the processor must bring in array1 size from memory, which means it will take many clock cycles until the processor can detect that the predicted branch instruction associated with the bounds check was mis-predicted. This creates a high likelihood that the second operation using the index2 value equal to the secret data byte to pull junk data into the cache will occur before the branch mis-prediction is detected. That is, the processor likely will speculatively execute the second operation ("junk=array2[index2*multiplier]"). The purpose of the second operation is to place junk data into a unique one of the 256 cache lines selected by the secret data byte value, i.e., index2. The attack does not care about the contents of the cache line; it only cares that the fetch of the cache line sets up the core part of the attack, which identifies the content of the secret data byte.

After the cache line indexed by the secret data byte value is loaded into the otherwise empty cache, the results are observed by the attacker through the cache timing "side channel" to determine the value of the secret data byte. The attacker code performs a third operation "junk=array2[probe value*multiplier]" for each of 256 possible 8-bit probe_values, while measuring the amount of time each of the 256 memory accesses takes. This is the core of the attack. Typically, all but one of the 256 runs (and 256 8-bit probe_values) results in a cache miss that requires the processor to access external memory, a slow process that consumes scores of clock cycles. By contrast, a single one of the accesses hits in the cache, which requires a much smaller number of clock cycles. Without directly reading the secret data byte, this side channel portion of the code identifies the probe value associated with the shortest memory access time (the cache hit), knowing that it likely the secret value.

Eventually, the processor discovers that it mis-predicted the bounds check and reverts changes made to its nominal architectural and microarchitectural state, but without reverting the changes made to the cache.

In summary, the Spectre attack works, in the representative example, by (1) knowing where a secret byte is located, (2) flushing the cache, (3) mis-training a branch predictor to mis-predict a malicious array index (based on the known secret byte location) passed to the victim code by the attacker code is within the bounds of a first array, (4) through speculative execution because of the branch prediction, indexing the first array with the malicious value in order to retrieve the secret byte, (5) still through speculative execution, using the secret byte to index a second array spanning at least 256 cache lines in order to load a single cache line indexed by the secret byte value, (6) afterwards, timing accesses to the second array for each of 256 possible index values corresponding to the 256 cache lines, and (7) identifying the index value of the second array access that signifies a cache hit, which will be the secret byte value.

In an indirect branch variant of the Spectre attack, an attacker finds the virtual address of a piece of code in the victim program, known as a gadget, that handles secret data. The attacker program trains the processor's branch target buffer (BTB) to mis-predict the target address of an indirect branch instruction to jump to the gadget. Until the mis-prediction is detected by the processor, it speculatively executes instructions of the gadget, which may cause the secret data to be pulled into the cache making the cache a side channel to determine the secret data value by timing subsequent cache accesses similar to the manner described above with respect to the first Spectre attack.

Together, the "flush" and "side-channel" portions of the code are sometimes referred to as a "flush-and-reload" attack, variants of which are used in many other attacks, for example, Meltdown.

In a "Meltdown" attack, unlike the "Spectre" attack, the attack is not dependent on the use of a conditional branch instruction or the mis-training of a branch predictor in order to speculatively execute a load of secret data. Rather, "Meltdown" directly runs a load instruction that reads a secret byte from a selected memory location that the load instruction is not privileged to read. The processor may speculatively execute the load instruction and forward the secret byte to dependent instructions before it discovers and deals with the privilege violation. Some processors have been optimized for performance, e.g., for short cycle times, to delay discovering and/or dealing with the privilege violation since privilege violations tend to occur infrequently (outside of SCAs). This may enlarge the window of speculation for dependent instructions to execute. Specifically, during the enlarged speculation window, the dependent instructions may encode the secret byte value into the cache to create the opportunity for a cache timing attack.

There is also a subset of "Meltdown" attacks known as "Foreshadow" attacks. These attacks exploit speculative TLB operations during address translation and cause terminal faults by clearing (or waiting for the OS to clear) a page table entry (PTE) present bit. The resulting dereferencing of the unmapped page from user memory triggers a terminal fault. This exposes metadata left by the OS in the PTE—for example, the physical address to which the page pointed—to exploitation and discovery by transient instructions.

Some "Foreshadow" variants target virtual machines (allowing transient reads of a virtual machine's exclusive memory space), hypervisors (allowing transient reads of the hypervisor's exclusive memory space), and system management mode memory in addition to OS kernel memory.

There is also a class of MDS attacks that eavesdrop on in-flight data from CPU-internal buffers such as line fill buffers, load ports, and store buffers. The discussion herein focuses on three such variants—a store-buffer variant known as "Fallout," a fill buffer variant known as "RIDL" for "Rogue In-Flight Data Load" (alternatively known as "MFBDS" for "Microarchitectural Fill Buffer Data Sampling"), and a load port variant known as "MLPDS" for "Microarchitectural Load Port Data Sampling."

The "Fallout" variant exploits splitting of a store instruction into separate store address (STA) and store data (STD) micro-operations, each of which independently executes and writes into a store buffer. Before the result of an operation is committed to cache memory, it is temporarily stored in a store buffer—a table of address, value, and "is valid" entries. Speculative store-to-load forwarding logic enables the store buffer to forward store data to be used as operands in younger operations. Fallout exploits this to monitor recent stores performed by other programs, containers, operating systems, and virtual machines running on the same hardware thread.

The RIDL or MFBDS variant exploits the design of fill buffers in some processors that support hyper-threading. Transfers of data from a lower level cache or main memory must pass through the fill buffer, each entry of which is the length of a cache line, before it is transferred to the level-1 data cache. When a line in the fill buffer has been transferred, the line is considered as invalid, but the fill buffer continues to retain the stale information transferred by a previous operation. Because logic enables fill buffer data to be speculatively forwarded to subsequent instructions, an attacker program running as a sibling hyper-thread can indirectly determine the value of that information through a side-channel cache timing attack.

The MLPDS variant also exploits hyper-threading. Data loading from a cache line into the register file must go through a load port, which is large enough—e.g., 512 bits wide—to handle the largest possible load the ISA permits. Because there are typically only a couple of load ports servicing a register file, sibling threads of a hyperthreaded core compete for them. In some processors, smaller 8, 16, 32 and 64-bit loads into the load port do not purge any higher-order bits left over from a previous load. While these processors track the size of the load and forward only those corresponding bits to the register file, the entirety of the load port contents, including several higher-order bits of stale data, may be speculatively forwarded to a subsequent malicious operation even as the load port data is in-flight to the register file. Because a single pass of this attack may recover only some of the bits, the attack may be run repeatedly to probabilistically discover a more complete set of data.

SUMMARY

In one embodiment, the present disclosure provides a microprocessor that mitigates side channel attacks that includes a front end that processes instructions in program order and a back end that is configured to perform speculative execution of instructions out of program order in a superscalar fashion that includes a plurality of execution units including one or more producing execution units configured to produce architectural register results during execution of instructions and one or more consuming execution units configured to consume the produced architectural register results during execution of instructions. The producing and consuming execution units may be a same execution unit or different execution units. The microprocessor also includes control logic configured to detect that, during execution by a producing execution unit, an architectural register result producing instruction causes a need for an architectural exception and consequent flush of all instructions younger in program order than the producing instruction and prevent all instructions within the back end that are dependent upon the producing instruction from consuming the architectural register result produced by the producing instruction.

In another embodiment, the present disclosure provides a method for mitigating side channel attacks in a microprocessor that comprises a front end that processes instructions in program order and a back end that is configured to perform speculative execution of instructions out of program order in a superscalar fashion. The back end includes a plurality of execution units comprising one or more producing execution units configured to produce architectural register results during execution of instructions and one or more consuming execution units configured to consume the produced architectural register results during execution of instructions. The producing and consuming execution units may be a same execution unit or different execution units. The method includes detecting that, during execution by a producing execution unit, an architectural register result producing instruction causes a need for an architectural exception and consequent flush of all instructions younger in program order than the producing instruction and preventing all instructions within the back end that are dependent upon the producing instruction from consuming the architectural register result produced by the producing instruction.

BRIEF DESCRIPTION OF THE DRAWINGS

FIG. 18 is an example block diagram of result signals produced by an execution unit onto a result bus in accordance with embodiments of the present disclosure.

FIG. 19 is an example block diagram of portions of the processor of FIG. 1.

DETAILED DESCRIPTION

As may be observed from the foregoing, SCAs prey on processors that engage in speculative execution of instructions. Stated alternatively, speculative execution is a critical component to SCA vulnerability. As may also be observed from the foregoing, SCAs exploit the microarchitectural state of data caches of processors that engage in speculative execution of instructions as side channels. However, speculative execution significantly improves processor performance. Therefore, high performance processors will continue to engage in speculative execution. Embodiments of processors and methods are described herein that mitigate SCAs by allowing speculative and out-of-order execution, but that prevent cache state from being affected by a miss of a speculatively executed load operation that architecturally will not be executed because an older load operation generated an architectural exception. In particular, the embodiments mitigate Meltdown-style SCAs because they inhibit generation of a fill request for the newer load when an older load generates a need for the architectural exception or, if the fill request was already generated, the embodiments cancel the fill request. The embodiments may also mitigate SCAs other than Meltdown-style SCAs, both current and future.

Figure 1:
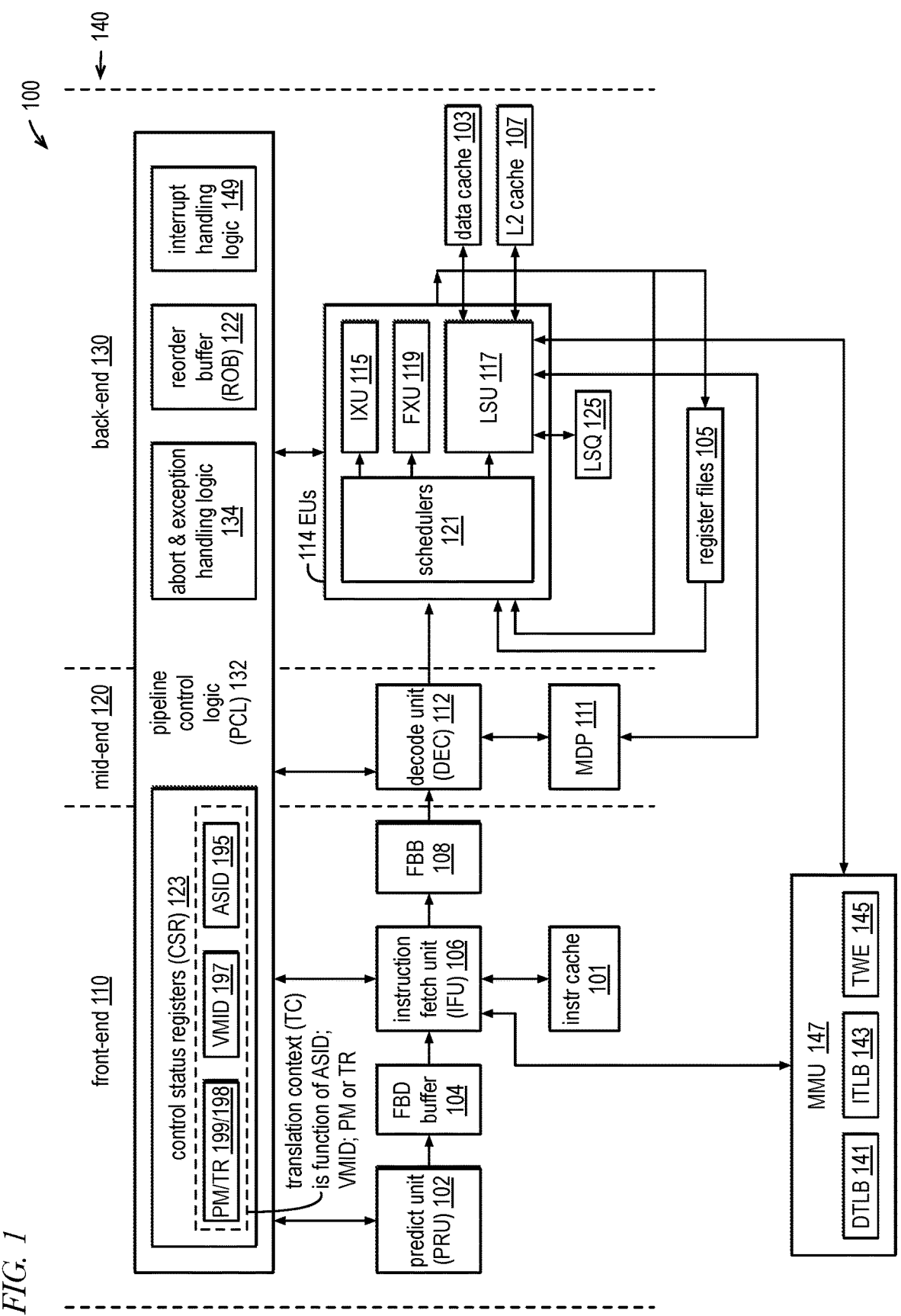
FIG. 1 is an example block diagram of a pipelined super-scalar, out-of-order execution microprocessor core that performs speculative execution in accordance with an embodiment of the present disclosure.

FIG. 1 is an example block diagram of a pipelined super-scalar, out-of-order execution microprocessor core 100 that performs speculative execution of instructions in accordance with embodiments of the present disclosure. Speculative execution of an instruction means execution of the instruction during a time when at least one instruction older in program order than the instruction has not completed execution such that a possibility exists that execution of the older instruction will result in an abort, i.e., flush, of the instruction. The core 100 is configured to mitigate SCAs. Although a single core 100 is shown, the SCA mitigation techniques described herein are not limited to a particular number of cores. Generally, the SCA mitigation embodiments may be employed in a processor conforming to various instruction set architectures (ISA), including but not limited to, x86, ARM, PowerPC, SPARC, MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments of the SCA mitigation techniques are not generally limited to RISC-V.

The core 100 has an instruction pipeline 140 that includes a front-end 110, mid-end 120, and back-end 130. The front-end 110 includes an instruction cache 101, a predict unit (PRU) 102, a fetch block descriptor (FBD) FIFO 104, an instruction fetch unit (IFU) 106, and a fetch block (FBlk) FIFO 108. The mid-end 120 include a decode unit (DEC) 112.

The back-end 130 includes a data cache 103, level-2 (L2) cache 107, register files 105, a plurality of execution units (EU) 114, and load and store queues (LSQ) 125. In one embodiment, the register files 105 include an integer register file, a floating-point register file and a vector register file. In one embodiment, the register files 105 include both architectural registers as well as microarchitectural registers. In one embodiment, the EUs 114 include integer execution units (IXU) 115, floating point units (FXU) 119, and a load-store unit (LSU) 117. The LSQ 125 hold speculatively executed load/store micro-operations, or load/store Ops, until the Op is committed. More specifically, the load queue 125 holds a load operation until it is committed, and the store queue 125 holds a store operation until it is committed. The store queue 125 may also forward store data that it holds to other dependent load Ops. When a load/store Op is committed, the load queue 125 and store queue 125 may be used to check for store forwarding violations. When a store Op is committed, the store data held in the associated store queue 125 entry is written into the data cache 103 at the store address held in the store queue 125 entry. In one embodiment, the load and store queues 125 are combined into a single memory queue structure rather than separate queues. The DEC 112 allocates an entry of the LSQ 125 in response to decode of a load/store instruction.

The core 100 also includes a memory management unit (MMU) 147 coupled to the IFU 106 and LSU 117. The MMU 147 includes a data translation lookaside buffer (DTLB) 141, an instruction translation lookaside buffer (ITLB) 143, and a table walk engine (TWE) 145. In one embodiment, the core 100 also includes a memory dependence predictor (MDP) 111 coupled to the DEC 112 and LSU 117. The MDP 111 makes store dependence predictions that indicate whether store-to-load forwarding should be performed. The microprocessor 110 may also include other blocks not shown, such as a write combining buffer, a load buffer, a bus interface unit, and various levels of cache memory above the instruction cache 101 and data cache 103 and L2 cache 107, some of which may be shared by other cores of the processor. Furthermore, the core 100 may be multi-threaded in the sense that it includes the ability to hold architectural state (e.g., program counter, architectural registers) for multiple threads that share the back-end 130, and in some embodiments the mid-end 120 and front-end 110, to perform simultaneous multithreading (SMT).

The core 100 provides virtual memory support. Each process, or thread, running on the core 100 may have its own address space identified by an address space identifier (ASID). The core 100 may use the ASID to perform address translation. For example, the ASID may be associated with the page tables, or translation tables, of a process. The TLBs (e.g., DTLB 141 and ITLB 143) may include the ASID in their tags in order to distinguish entries for different processes. In the x86 ISA, for example, an ASID may correspond to a processor context identifier (PCID). The core 100 also provides machine virtualization support. Each virtual machine running on the core 100 may have its own virtual machine identifier (VMID). The TLBs may include the VMID in their tags in order to distinguish entries for different virtual machines. Finally, the core 100 provides different privilege modes (PM), or privilege levels. The PM of the core 100 determines, among other things, whether or not privileged instructions may be executed. For example, in the x86 ISA there are four PMs, commonly referred to as Ring 0 through Ring 3. Ring 0 is also referred to as Supervisor level and Ring 3 is also referred to as User level, which are the two most commonly used PMs. For another example, in the RISC-V ISA, PMs may include Machine (M), User (U), Supervisor (S) or Hypervisor Supervisor (HS), Virtual User (VU), and Virtual Supervisor (VS). In the RISC-V ISA, the S PM exists only in a core without virtualization supported or enabled, whereas the HS PM exists when virtualization is enabled, such that S and HS are essentially non-distinct PMs. For yet another example, the ARM ISA includes exception levels (EL0, EL1, EL2 and EL3).

As used herein and as shown in FIG. 1, a translation context (TC) of the core 100 (or of a hardware thread in the case of a multi-threaded core) is a function of the ASID, VMID, and/or PM or a translation regime (TR), which is based on the PM. In one embodiment, the TR indicates whether address translation is off (e.g., M mode) or on, whether one level of address translation is needed (e.g., U mode, S mode and HS mode) or two levels of address translation is needed (VU mode and VS mode), and what form of translation table scheme is involved. For example, in a RISC-V embodiment, the U and S privilege modes (or U and HS, when the hypervisor extension is active) may share a first TR in which one level of translation is required based on the ASID, VU and VS share a second TR in which two levels of translation are required based on the ASID and VMID, and M privilege level constitutes a third TR in which no translation is performed, i.e., all addresses are physical addresses.

Pipeline control logic (PCL) 132 is coupled to and controls various aspects of the pipeline 140 which are described in detail herein. The PCL 132 includes a ReOrder Buffer (ROB) 122, interrupt handling logic 149, abort and exception-handling logic 134, and control and status registers (CSR) 123. The CSRs 123 hold, among other things, the PM 199, VMID 197, and ASID 195 of the core 100, or one or more functional dependencies thereof (such as the TR and/or TC). In one embodiment (e.g., in the RISC-V ISA), the current PM 199 does not reside in a software-visible CSR 123; rather, the PM 199 resides in a microarchitectural register. However, the previous PM 199 is readable by a software read of a CSR 123 in certain circumstances, such as upon taking of an exception. In one embodiment, the CSRs 123 may hold a VMID 197 and ASID 195 for each TR or PM.

The pipeline units may signal a need for an abort, as described in more detail below, e.g., in response to detection of a mis-prediction (e.g., by a branch predictor of a direction or target address of a branch instruction, or of a mis-prediction that store data should be forwarded to a load Op in response to a store dependence prediction, e.g., by the MDP 111) or other microarchitectural exception, architectural exception, or interrupt. Examples of architectural exceptions include an invalid opcode fault, debug breakpoint, or illegal instruction fault (e.g., insufficient privilege mode) that may be detected by the DEC 112, a page fault, permission violation or access fault that may be detected by the LSU 117, and an attempt to fetch an instruction from a non-executable page or a page the current process does not have permission to access that may be detected by the IFU 106. In response, the PCL 132 may assert flush signals to selectively flush instructions/Ops from the various units of the pipeline 140. Conventionally, exceptions are categorized as either faults, traps, or aborts. The term "abort" as used herein is not limited by the conventional categorization of exceptions. As used herein, "abort" is a microarchitectural mechanism used to flush instructions from the pipeline 140 for many purposes, which encompasses interrupts, faults and traps. Purposes of aborts include recovering from microarchitectural hazards such as a branch mis-prediction or a store-to-load forwarding violation. The microarchitectural abort mechanism may also be used to handle architectural exceptions and for architecturally defined cases where changing the privilege mode requires strong in-order synchronization to mitigate SCAs. In one embodiment, the back-end 130 of the processor 100 operates under a single PM, while the PM for the front-end 110 and mid-end 120 may change (e.g., in response to a PM-changing instruction) while older instructions under an older PM continue to drain out of the back-end 130. Other blocks of the core 100, e.g., DEC 112, may maintain shadow copies of various CSRs 123 in order to perform their operations.

The PRU 102 maintains the program counter (PC) and includes predictors that predict program flow that may be altered by control flow instructions, such as branch instructions. In one embodiment, the PRU 102 includes a next index predictor (NIP), a branch target buffer (BTB), a main conditional branch predictor (CBP), a secondary conditional branch predictor (BMP), an indirect branch predictor (IBP), and a return address predictor (RAP). As a result of predictions made by the predictors, the core 100 may speculatively execute instructions in the instruction stream of the predicted path.

The PRU 102 generates fetch block descriptors (FBD) that are provided to the FBD FIFO 104 in a first-in-first-out manner. Each FBD describes a fetch block (FBlk or FB). An FBlk is a sequential set of instructions. In one embodiment, an FBlk is up to sixty-four bytes long and may contain as many as thirty-two instructions. An FBlk ends with either a branch instruction to be predicted, an instruction that causes a PM change or that requires heavy abort-based synchronization (aka "stop" instruction), or an indication that the run of instructions continues sequentially into the next FBlk. An FBD is essentially a request to fetch instructions. An FBD may include the address and length of an FBlk and an indication of the type of the last instruction. The IFU 106 uses the FBDs to fetch FBlks into the FBlk FIFO 108, which feeds fetched instructions to the DEC 112. The FBD FIFO 104 enables the PRU 102 to continue predicting FBDs to reduce the likelihood of starvation of the IFU 106. Likewise, the FBlk FIFO 108 enables the IFU 106 to continue fetching FBlks to reduce the likelihood of starvation of the DEC 112. The core 100 processes FBlks one at a time, i.e., FBlks are not merged or concatenated. By design, the last instruction of an FBlk can be a branch instruction, a privilege-mode-changing instruction, or a stop instruction. Instructions may travel through the pipeline 140 from the IFU 106 to the DEC 112 as FBlks, where they are decoded in parallel.

The DEC 112 decodes architectural instructions of the FBlks into micro-operations, referred to herein as Ops. The DEC 112 dispatches Ops to the schedulers 121 of the EUs 114. The schedulers 121 schedule and issue the Ops for execution to the execution pipelines of the EUs, e.g., IXU 115, FXU 119, LSU 117. The EUs 114 receive operands for the Ops from multiple sources including: results produced by the EUs 114 that are directly forwarded on forwarding busses—also referred to as result busses or bypass busses—back to the EUs 114 and operands from the register files 105 that store the state of architectural registers as well as microarchitectural registers, e.g., renamed registers. In one embodiment, the EUs 114 include four IXU 115 for executing up to four Ops in parallel, two FXU 119, and an LSU 117 that is capable of executing up to four load/store Ops in parallel. The instructions are received by the DEC 112 in program order, and entries in the ROB 122 are allocated for the associated Ops of the instructions in program order. However, once dispatched by the DEC 112 to the EUs 114, the schedulers 121 may issue the Ops to the individual EU 114 pipelines for execution out of program order.

The PRU 102, IFU 106, DEC 112, and EUs 114, along with the intervening FIFOs 104 and 108, form a concatenated pipeline 140 in which instructions and Ops are processed in mostly sequential stages, advancing each clock cycle from one stage to the next. Each stage works on different instructions in parallel. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op.

Many structures within the core 100 address, buffer, or store information for an instruction or Op by reference to an FBlk identifier. In one embodiment, checkpoints for abort recovery are generated for and allocated to FBlks, and the abort recovery process may begin at the first instruction of the FBlk containing the abort-causing instruction.

In one embodiment, the DEC 112 converts each FBlk into a series of up to eight OpGroups. Each OpGroup consists of either four sequential Ops or, if there are fewer than four Ops in the FBlk after all possible four-op OpGroups for an FBlk have been formed, the remaining Ops of the FBlk. Ops from different FBlks are not concatenated together into the same OpGroup. Because some Ops can be fused from two instructions, an OpGroup may correspond to up to eight instructions. The Ops of the OpGroup may be processed in simultaneous clock cycles through later DEC 112 pipe stages, including rename and dispatch to the EU 114 pipelines. In one embodiment, the MDP 111 provides up to four predictions per cycle, each corresponding to the Ops of a single OpGroup. Instructions of an OpGroup are also allocated into the ROB 122 in simultaneous clock cycles and in program order. The instructions of an OpGroup are not, however, necessarily scheduled for execution together.

In one embodiment, each of the EUs 114 includes a dedicated scheduler 121. In an alternate embodiment, a scheduler 121 common to all of the EUs 114 (and integrated with the ROB 122 according to one embodiment) serves all of the EUs 114. In one embodiment, each scheduler 121 includes an associated buffer (not shown) that receives Ops dispatched by the DEC 112 until the scheduler 121 issues the Op to the relevant EU 114 pipeline for execution, namely when all source operands upon which the Op depends are available for execution and an EU 114 pipeline of the appropriate type to execute the Op is available.

The PRU 102, IFU 106, DEC 112, each of the execution units 114, and PCL 132, as well as other structures of the core 100, may each have their own pipeline stages in which different operations are performed. For example, in one embodiment, the DEC 112 has a pre-decode stage, an extract stage, a rename stage, and a dispatch stage.

The PCL 132 tracks instructions and the Ops into which they are decoded throughout their lifetime. The ROB 122 supports out-of-order instruction execution by tracking Ops from the time they are dispatched from DEC 112 to the time they retire. In one embodiment, the ROB 122 has entries managed as a FIFO, and the ROB 122 may allocate up to four new entries per cycle at the dispatch stage of the DEC 112 and may deallocate up to four oldest entries per cycle at Op retire. In one embodiment, each ROB entry includes an indicator that indicates whether the Op has completed its execution and another indicator that indicates whether the result of the Op has been committed to architectural state. More specifically, load and store Ops may be committed subsequent to completion of their execution. Still further, an Op may be committed before it is retired.

Because the ROB 122 retires all Ops and their associated instructions in program order, some Ops may complete execution many cycles before they can be retired or aborted. For example, a speculatively executed instruction may need to be aborted due to detection of a mis-prediction or an architectural exception. The mis-prediction may have been made for the speculatively executed instruction or for an older instruction in program order than the speculatively executed instruction, and the architectural exception could be generated by the speculatively executed instruction or by an older instruction in program order than the speculatively executed instruction. For example, a speculatively executed instruction that loads a secret data byte from a memory address could complete its speculative execution before the processor detects a mis-prediction or architectural exception. For another example, a speculatively executed load/store instruction that uses the secret data byte value—e.g., to modify a previously flushed cache that becomes a side channel to be probed by an SCA to indirectly detect the value of the secret data byte—could complete before the processor detects the mis-prediction or the architectural exception. However, advantageously, embodiments are described in which a fill request for a cache missing load operation is inhibited or canceled if it is newer in program order than a load operation that generates a need for an architectural exception, e.g., attempt to access an impermissible or inaccessible memory location.

Figure 2:
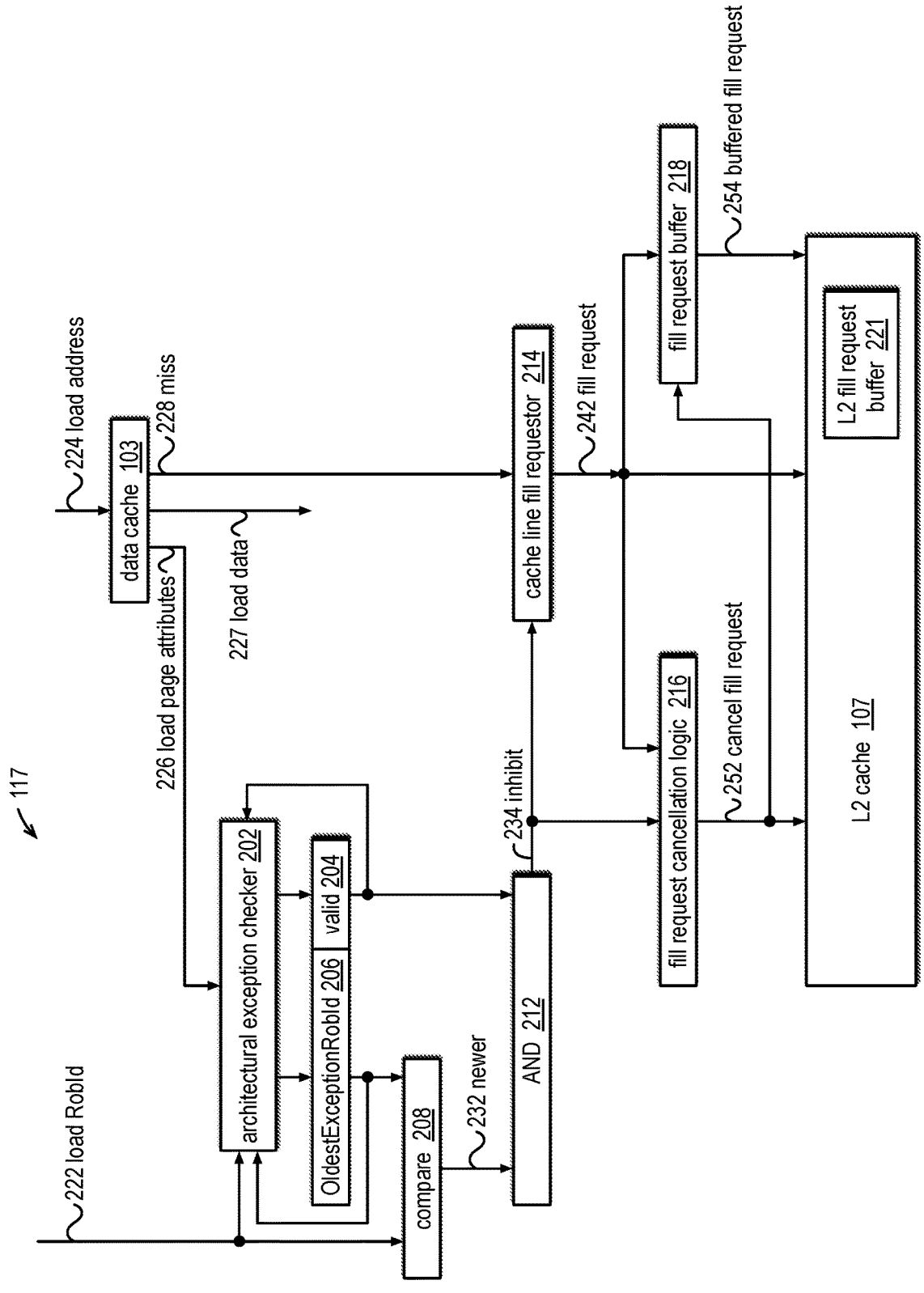
FIG. 2 is an example block diagram of the load-store unit of FIG. 1 in accordance with embodiments of the present disclosure.

FIG. 2 is an example block diagram of the LSU 117 of FIG. 1 in accordance with embodiments of the present disclosure. The LSU 117 is shown in communication with the data cache 103 and the L2 cache 107. The L2 cache 107 includes an L2 fill request buffer 221 whose use is described in more detail below. The LSU 117 includes architectural exception checking logic 202, a valid bit register 204, an OldestExceptionRobId register 206, a comparator 208, an AND gate 212, a cache line fill requestor 214, fill request cancellation logic 216, and a fill request buffer 218. The data cache 103 of FIG. 1 receives a virtual load address 224 of a load operation and in response generates a miss indicator 228 that indicates whether or not the load address 224 hits or misses in the data cache 103. If the load address 224 hits, the data cache 103 also provides load data 227. The data cache 103 also provides page attributes 226 of the page of memory implicated by the load address 224. When the miss indicator 228 indicates a miss for the load operation (or store operation), the cache line fill requestor 214 generates a cache line fill request 242 to the L2 cache 107, unless inhibited from doing so by an inhibit signal 234, as described in more detail below.

The fill request 242 is received by the L2 cache 107 into the L2 fill request buffer 221. In some instances, the cache line fill requestor 214 may not be able to send the fill request 242 to the L2 cache 107 immediately, e.g., the L2 fill request buffer 221 is full. In such instances, the fill request 242 is pushed into the fill request buffer 218 and subsequently sent to the L2 cache 107, e.g., once the L2 fill request buffer 221 is no longer full.

The OldestExceptionRobId register 206 holds the identifier of the entry in the ROB 122 that is allocated to the oldest load/store operation that has generated a need for an architectural exception. The valid bit 204 indicates whether the value in the OldestExceptionRobId register 206 is valid.

The architectural exception checker 202 receives the page attributes 226, a load RobId 222 of the load operation, the OldestExceptionRobId 206, and the valid bit 204. The architectural exception checker 202 examines the page attributes 226 of the load to determine whether the load operation generates the need for an architectural exception. In one embodiment, the architectural exception checker 202 determines the load operation generates the need for an architectural exception when the page attributes 226 of the load indicate that the load address 224 is inaccessible (e.g., no valid translation is available because a present or valid bit in a page table entry is clear) or the load operation does not have permission to access the load address 224 (e.g., there is a valid translation but the permission bits indicate no permission). If the load generates a need for an architectural exception, if the valid bit 204 is set, and if the load RobId 222 is older than the OldestExceptionRobId 206, then the architectural exception checker 202 updates the OldestExceptionRobId 206 with the load RobId 222 and sets the valid bit 204. In this manner, the RobID of a load operation that generates the need for an architectural exception will be recorded in the OldestExceptionRobId 206 for use during execution of other load operations to decide whether cache line fill requests of the other load operations should be inhibited or canceled. As described above, the LSU 117 may comprise multiple pipelines for concurrently executing multiple load operations. In one embodiment, the OldestExceptionRobId 206 is updated by and shared by all the pipelines.

To determine whether a fill request should be inhibited or canceled, the comparator 208 compares the load RobId 222 with the OldestExceptionRobId 206 to generate a newer indicator 232 that indicates whether the load is newer in program order than the load operation indicated by the OldestExceptionRobId 206. The AND gate 212 outputs a true value on the inhibit signal 234 if the valid bit 204 and the newer 232 indicator are both set. If the inhibit signal 234 is true, the cache line fill requestor 214 does not generate a fill request 242 for the missing load operation.

Advantageously, inhibiting the fill request associated with the speculatively executed load operation may mitigate SCAs. For example, assume an SCA flushes the data cache 103, assume the older load operation indicated by the OldestExceptionRobId 206 is a first load operation of a Meltdown-style SCA that is attempting to read a secret byte from an address that it does not have permission to access, and assume the newer missing load is a second load operation of the Meltdown-style SCA that uses the secret byte value from the first load to form its load address 224 in order to fill the cache line at the second load operation address in order to speculatively update the state of the data cache 103 to create a side channel that may later be probed to indirectly detect the secret byte value. By inhibiting the cache fill request, there are no side effects on the data cache 103. That is, the state of the data cache 103 is unaffected by the miss of the speculatively executed newer/second load operation thereby foiling the SCA from creating a side channel of the data cache 103.

In many instances, the LSU 117 may be able to inhibit the fill request for the missing/second load operation, although in others it may not. Factors that affect the ability of the LSU 117 to inhibit the fill request include the time of issuance of the first and second load operations relative to one another, whether the second load operation is dependent on the result (i.e., load data) of the first load operation, and parameters of the LSU 117, such as the load-to-use latency of the LSU 117 and the inhibit latency. The inhibit latency may be considered the time from issuance of a load operation (e.g., the first load operation) to generation of the inhibit signal 234, which in the embodiment of FIG. 2 may include detection of the need for an architectural exception by the architectural exception checker 202, update of the OldestExceptionRobId 206 and valid bit 204, and propagation delay through the comparator 208 and AND gate 212, as well as any relevant pipeline stage register delays. The load-to-use latency is the number of clock cycles from issuance of a load operation to the availability of the load result (assuming a cache hit) for operations that are dependent on the load result. Therefore, the scheduler 121 waits to issue an operation that is dependent on a load instruction until at least the load-to-use latency number of clocks after the load operation was issued.

As an example, if the second load operation is dependent on the first load operation and the load-to-use latency is greater than the inhibit latency, then the inhibit signal 234 will be able to inhibit the fill request, since the scheduler 121 will delay issuance of the second load operation after issuance of the first load operation at least by the load-to-use latency. For another example, even if the second load operation is independent of the first load operation, due to the operation mix of the program and utilization of the pipelines of the LSU 117, the second load operation may get issued by the scheduler 121 at least the inhibit latency after the first load operation such that the inhibit signal 234 is able to inhibit the fill request.

However, in some instances the LSU 117 may not be able to inhibit the fill request for the missing/second load operation such that the cache line fill requestor 214 generates the fill request 242 that is sent to the L2 cache 107 or fill request buffer 218. In such instances, the LSU 117 cancels the fill request. The fill request cancellation logic 216 receives the inhibit signal 234 and the fill request signal 242. If the fill request cancellation logic 216 detects that a fill request 242 has been made and that subsequently the inhibit signal 234 indicated that the same fill request 242 is to be inhibited, then the fill request cancellation logic 216 asserts a cancel fill request signal 252 to cancel the fill request 242 that was attempted to be inhibited. If the fill request is in the fill request buffer 218, the fill request buffer 218 clears (e.g., invalidates) the entry occupied by the fill request. If the fill request is in the L2 fill request buffer 221, the L2 cache 107 clears (e.g., invalidates) the entry occupied by the fill request. In one embodiment, each fill request 242 includes a small tag, or identifier, and the cancel fill request signal 252 identifies the tag of the load operation to be canceled. In other embodiments, there is a fixed timing relationship (e.g., a fixed number of clock cycles) between the generation of the fill request 242 and the generation of the cancel fill request signal 252 that enables the fill request buffer 218 and L2 cache 107 to know which fill request 242 to cancel.

Advantageously, canceling the fill request may mitigate SCAs for reasons similar to those described above with respect to the inhibiting of fill requests. By canceling the cache fill request associated with the speculatively executed second load operation, there are no side effects on the data cache 103. That is, the state of the data cache 103 is unaffected by the miss of the speculatively executed newer/second load operation thereby foiling an SCA, such as a Meltdown-style attack, from using the data cache 103 as a side channel.

Figures 3, 4:
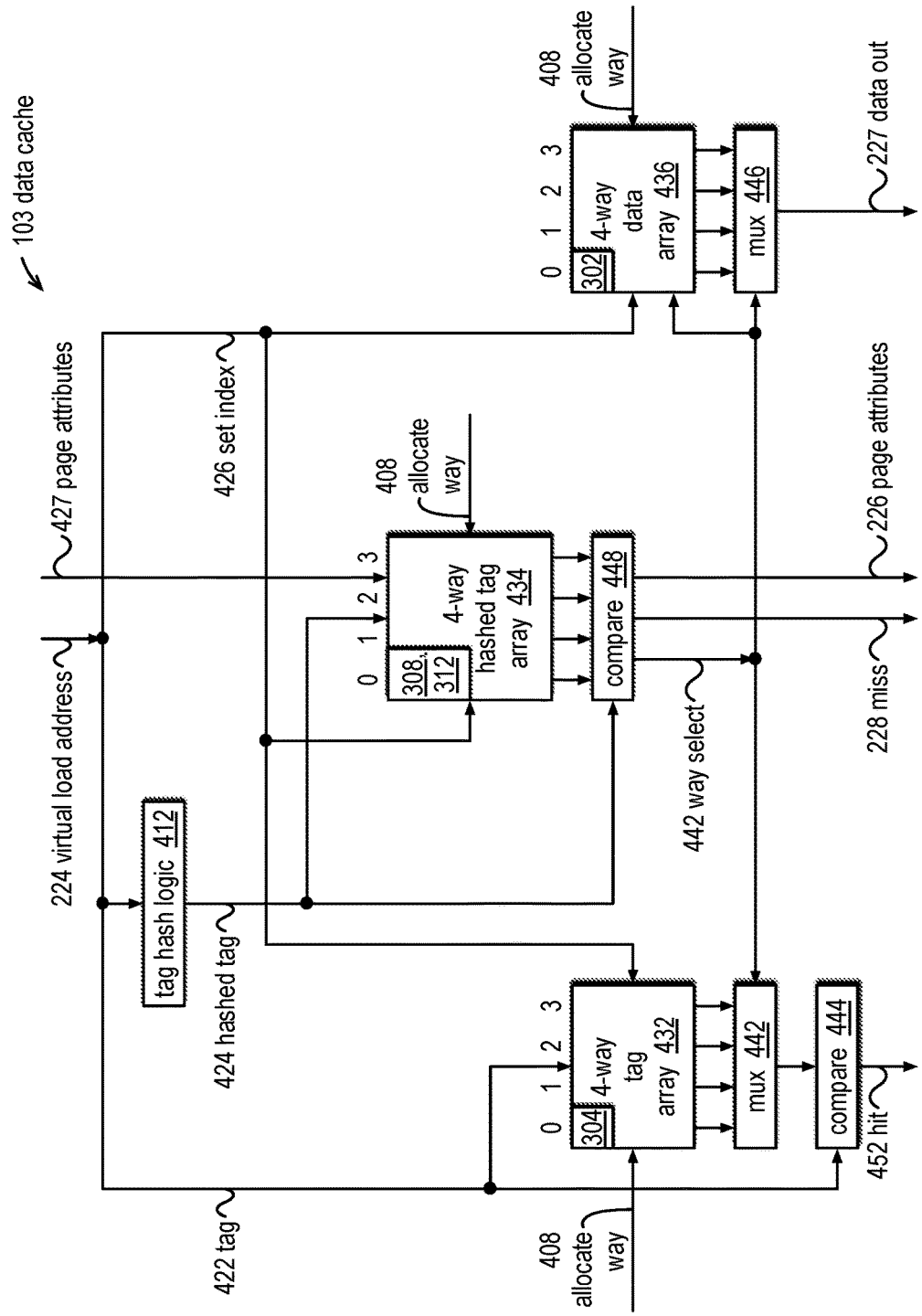
FIG. 3 is an example block diagram of a cache entry of the data cache of FIG. 1 in accordance with embodiments of the present disclosure.
FIG. 4 is an example block diagram illustrating the data cache of FIG. 1 in accordance with embodiments of the present disclosure.

FIG. 3 is an example block diagram of a cache entry 301 of data cache 103 of FIG. 1 in accordance with embodiments of the present disclosure. The cache entry 301 is used in the virtual cache embodiment of FIG. 4 described in more detail below. The cache entry 301 includes cache line data 302, a virtual address tag 304, a status field 306, a hashed tag field 308, and a page attributes field 312. The cache line data 302 is the copy of the data brought into the data cache 103 from system memory, in some embodiments indirectly through a higher level of the cache memory hierarchy, e.g., L2 cache 107.

The tag 304 is upper bits (e.g., tag bits 422 of FIG. 4) of the virtual memory address (e.g., virtual address 224 of FIG. 4) specified by the operation that brought the cache line into the data cache 103, e.g., the virtual memory address specified by a load/store operation. That is, when an entry in the data cache 103 is allocated, the tag bits 422 of the virtual memory address 224 are written to the virtual address tag 304 of the entry. When the data cache 103 is subsequently accessed (e.g., by a subsequent load/store operation), the virtual address tag 304 is used to determine whether the access hits in the data cache 103. Generally speaking, the data cache 103 uses lower bits (e.g., index bits 426 of FIG. 4) of the virtual memory address to index into the data cache 103 and uses the remaining bits of the address above the index bits as the tag bits. To illustrate by way of example, assume a 64 kilobyte (KB) data cache 103 arranged as a 4-way set associative cache having 64-byte cache lines; address bits [5:0] are an offset into the cache line, virtual address bits [13:6] (index bits) are used as the set index, and virtual address bits [N-1:14] (tag bits) are used as the tag, where N is the number of bits of the virtual memory address.

The status 306 indicates the state of the cache line. More specifically, the status 306 indicates whether the cache line data is valid or invalid. Typically, the status 306 also indicates whether the cache line has been modified since it was brought into the cache memory. The status 306 may also indicate whether the cache line is exclusively held by the cache memory or whether the cache line is shared by other cache memories in the system. An example protocol used to maintain cache coherency defines four possible states for a cache line: Modified, Exclusive, Shared, Invalid (MESI).

The hashed tag 308 is a hash of the tag bits 422 of FIG. 4 of the virtual memory address 224, as described in more detail below. Advantageously, the hashed tag 308 may be used to generate a predicted early miss indication, e.g., miss 228 of FIG. 4, and may be used to generate a predicted early way select signal, e.g., way select 442 of FIG. 4, as described in more detail with respect to FIG. 4.

The page attributes 312 are attributes of a physical memory page that includes the cache line data associated with the entry 301. The page attributes are cached versions of page attributes (e.g., page attributes 427 of FIG. 4) obtained from page translation tables during a page table walk performed (e.g., by TWE 145 of FIG. 1) in response to the virtual memory address 224 missing in the virtual data cache 103 and also missing in a second-level data translation lookaside buffer (e.g., DTLB 141 of FIG. 1). For example, the page attributes 312 may include permissions information and accessibility information. The page attributes 312 may be used by the architectural exception checker 202 of FIG. 2 to determine whether a load operation generates the need for an architectural exception.

FIG. 4 is an example block diagram illustrating the data cache 103 of FIG. 1 in accordance with embodiments of the present disclosure. In the embodiment of FIG. 4, the data cache 103 is a virtual cache, i.e., it is virtually-indexed and virtually-tagged. In the embodiment of FIG. 4, the DTLB 141 of FIG. 1 is a second-level TLB, and the processor 100 includes no first-level TLB. The data cache 103 includes a tag array 432, a data array 436, a hashed tag array 434, a multiplexer 442, a comparator 444, a multiplexer 446, and tag hash logic 412. The data cache 103 also includes a virtual load address input 224 (corresponding to the load address 224 of FIG. 2). The virtual load address 224 includes a tag 422 portion and a set index 426 portion. The data cache 103 also includes an allocate way input 408 for allocating an entry into the data cache 103. The data cache 103 also includes a data in input (not shown) for writing data into the data cache 103, e.g., during a store operation and during an allocation.

The data cache 103 also includes a hit output 452, early miss prediction 228, a page attributes 226 output, and a data out output 227 (corresponding to load data 227 of FIG. 2). The tag array 432 and data array 436 are random access memory arrays. In the embodiment of FIG. 4, the data cache 103 is arranged as a 4-way set associative cache; hence, the tag array 432 and data array 436 are arranged as 4-way set associative memory arrays. However, other embodiments are contemplated in which the associativity has a different number of ways than four, including direct-mapped and fully associative embodiments. The set index 426 selects the set of entries on each allocation or access, e.g., load operation.

In the embodiment of FIG. 4, each entry of the data cache 103 is structured as the entry 301 of FIG. 3, having cache line data 302, a tag 304, a status 306, a hashed tag 308, and page attributes 312. The data array 436 holds the cache line data 302 associated with each of the entries 301 of the data cache 103. The tag array 432 holds the tag 304 associated with each of the entries 301 of the data cache 103. The hashed tag array 434, also referred to as a hashed address directory 434, holds the hashed tag 308 and page attributes 312 associated with each of the entries 301 of the data cache 103. In one embodiment, the status 306 of each entry is also stored in the tag array 432, whereas in another embodiment the data cache 103 includes a separate memory array for storing the status 306 of the entries. Although in the embodiment of FIG. 4 the data array 436 and tag array 432 are separate, other embodiments are contemplated in which the data and tag (and status) reside in the same memory array.

The tag hash logic 412 hashes the tag 422 portion of the virtual load address 224 to generate the hashed tag 424. That is, the tag 422 is an input to a hash function performed by tag hash logic 412 that outputs the hashed tag 424. The hash function performs a logical and/or arithmetic operation on its input bits to generate output bits. For example, in one embodiment, the hash function is a logical exclusive-OR on at least a portion of the tag 422 bits. The number of output bits of the hash function is the size of the hashed tag 424 and the hashed tag field 308 field of the data cache entry 301. The hashed tag 424 is provided as an input to the hashed tag array 434 for writing into the hashed tag 308 of the selected entry 301 of the hashed tag array 434, e.g., during an allocation. Similarly, page attributes 427 obtained from page translation tables during a page table walk are written into the page attributes 312 of the selected entry 301 of the hashed tag array 434 during an allocation. The set index 426 selects the set of entries of the hashed tag array 434. In the case of an allocation, the hashed tag 424 and page attributes 427 are written into the hashed tag 308 of the entry of the way selected by an allocate way input 408 of the selected set. In the case of an access, comparator 448 compares the hashed tag 424 with each of the hashed tags 308 of the selected set. If there is a valid match, the early miss signal 228 is false and the way select 442 indicates the matching way and the page attributes 312 of the matching way are provided as page attributes 226; otherwise, the early miss signal 228 is true.

Because the hashed tag 424 and the hashed tags 308 are small (e.g., 16 bits as an illustrative example) relative to the tag 422 and tags 304 (e.g., 54 bits as an illustrative example), the comparison performed by comparator 448 may be faster than the comparison performed by comparator 444 (described more below), for example. Therefore, the way select 442 may be signaled by an earlier stage in the data cache memory 103 pipeline than an embodiment that relies on a comparison of the tags 304 of the tag array 432 to generate a way select. This may be advantageous because it may shorten the time to data out 227.

Additionally, the early miss prediction 228 may be signaled by an earlier stage than the stage that signals the hit indicator 452. This may be advantageous because it may enable cache line fill requestor 214 to generate a cache line fill request 242 to fill a missing cache line earlier than an embodiment that would rely on a comparison of the tags 304 in the tag array 432 to detect a miss. Thus, the hashed tag array 434 may enable a high performance, high frequency design of the processor 100.

It is noted that due to the nature of the hashed tag 424, if the early miss indicator 228 indicates a false value, i.e., indicates a hit, the hit indication may be incorrect, i.e., the hit indicator 452 may subsequently indicate a false value, i.e., a miss. Thus, the early miss indicator 228 is a prediction, not necessarily a correct miss indicator. This is because differing tag 422 values may hash to the same value. However, if the early miss indicator 228 indicates a true value, i.e., indicates a miss, the miss indication is correct, i.e., the hit indicator 452 will also indicate a miss, i.e., will indicate a false value. This is because if two hash results are not equal (assuming they were hashed using the same hash algorithm), then they could not have been generated from equal inputs, i.e., matching inputs.

The tag 422 is provided as an input to the tag array 432 for writing into the tag 304 field of the selected entry of the tag array 432, e.g., during an allocation. The set index 426 selects the set of entries of the tag array 432. In the case of an allocation, the tag 422 is written into the tag 304 of the entry of the way selected by the allocate way input 408 of the selected set. In the case of an access (e.g., a load operation), the mux 442 selects the tag 304 of the way selected by the early way select 442, and the comparator 444 compares the tag 422 with the tag 304 of the selected set. If there is a valid match, the hit signal 452 is true; otherwise, the hit signal 452 is false. In the embodiment of FIG. 4, the cache line fill requestor 214 of FIG. 2 advantageously uses the early miss prediction 228 provided by the hashed tag array 434 in order to generate a fill request 242 as soon as possible, rather than waiting for the hit signal 452. However, in embodiments of the LSU 117 that employ the data cache 103 of FIG. 4, the cache line fill requestor 214 is also configured to examine both the early miss prediction 228 and the hit indicator 452, detect an instance in which the early miss prediction 228 predicted a false hit, and generate a fill request 242 accordingly.

The data array 436 receives the data in input (not shown) for writing into the cache line data 302 field of the selected entry of the data array 436, e.g., during a cache line allocation or a store operation. The set index 426 selects the set of entries of the data array 436. In the case of an allocation, the way of the selected set is selected by the allocate way input 408, and in the case of a memory access operation (e.g., load/store operation) the way is selected by the way select signal 442. In the case of a read operation (e.g., load operation), the mux 446 receives the cache line data 302 of all four ways and selects one of the ways based on the way select signal 442, and the cache line data 302 selected by the mux 446 is provided on the data out output 227 (corresponding to load data 227 of FIG. 2).

Figures 5, 6:
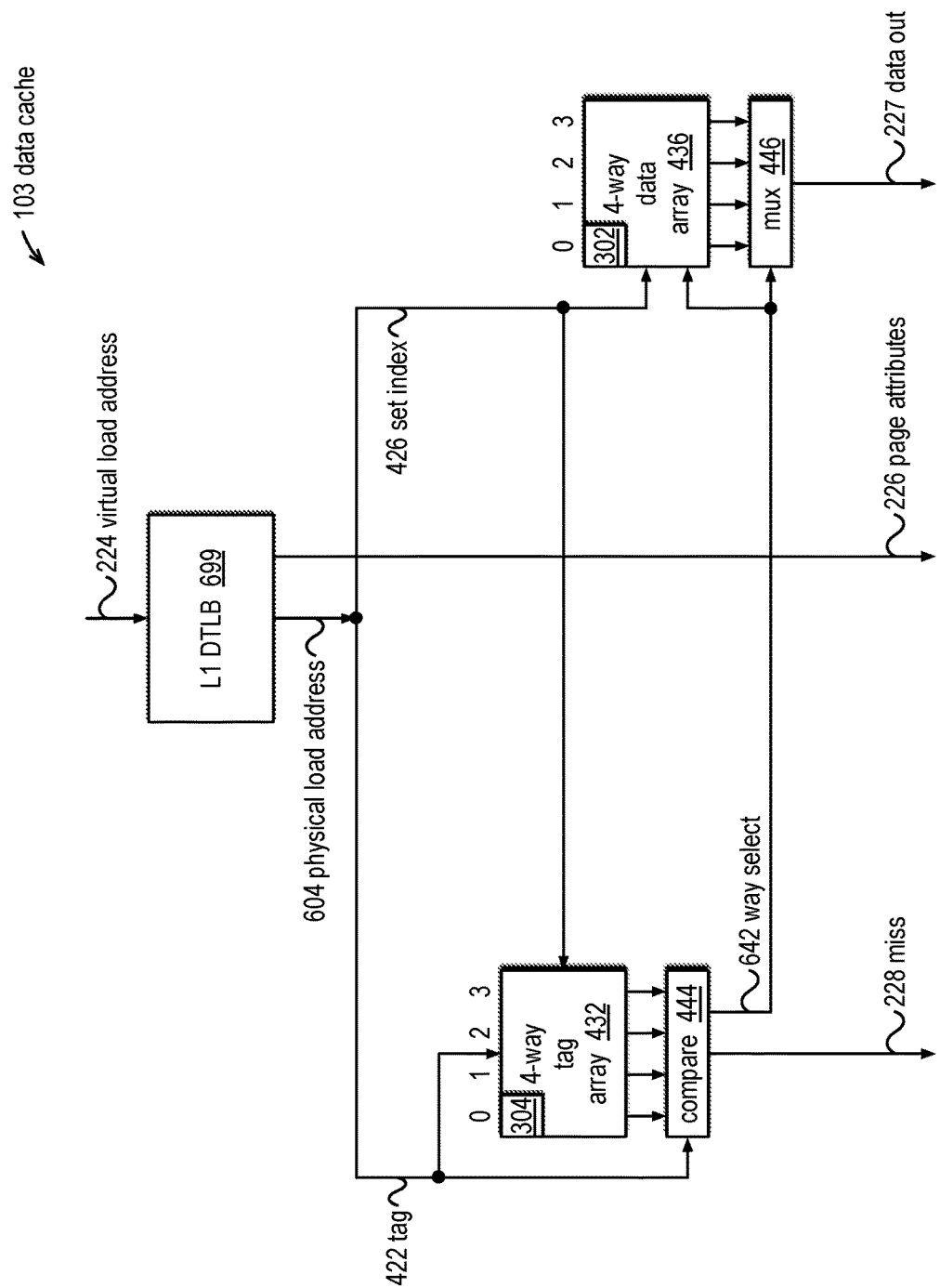
FIG. 5 is an example block diagram of a cache entry of data cache of FIG. 1 in accordance with embodiments of the present disclosure.
FIG. 6 is an example block diagram illustrating the data cache of FIG. 1 in accordance with embodiments of the present disclosure.

FIG. 5 is an example block diagram of a cache entry 501 of data cache 103 of FIG. 1 in accordance with embodiments of the present disclosure. The cache entry 501 is used in the physically-tagged cache embodiment of FIG. 6 described in more detail below. That is, the tag field 304 holds a physical address tag, rather than a virtual address tag. The cache entry 501 of FIG. 5 is similar in many respects to the cache entry 301 of FIG. 3. However, the cache entry 501 of FIG. 5 does not include a hashed tag field 308 nor a page attributes field 312.

FIG. 6 is an example block diagram illustrating the data cache 103 of FIG. 1 in accordance with embodiments of the present disclosure. The data cache 103 of FIG. 6 is similar in many respects to the data cache 103 of FIG. 4. However, in the embodiment of FIG. 6, the core 100 includes a first-level (L1) TLB 699 that receives the virtual load address 224 of FIG. 2 and outputs a physical load address 604 that is the translation of the virtual load address 224 and outputs the page attributes 226 of FIG. 2 associated with the memory page implicated by the physical load address 604. Additionally, in the embodiment of FIG. 6, the data cache 103 is physically-tagged. That is, tag 422 is the tag portion of the physical load address 604, and the set index 426 is the index portion of the physical load address 604. Still further, the data cache 103 of FIG. 6 does not include the hashed tag array 434 of FIG. 4. Finally, the comparator 444 compares the tag 422 with the tag 304 of all ways of the selected set. If there is a valid match, the hit signal 452 is true and a way select signal 642, which indicates the matching way, is provided to mux 446; otherwise, the hit signal 452 is false.

Figure 7:
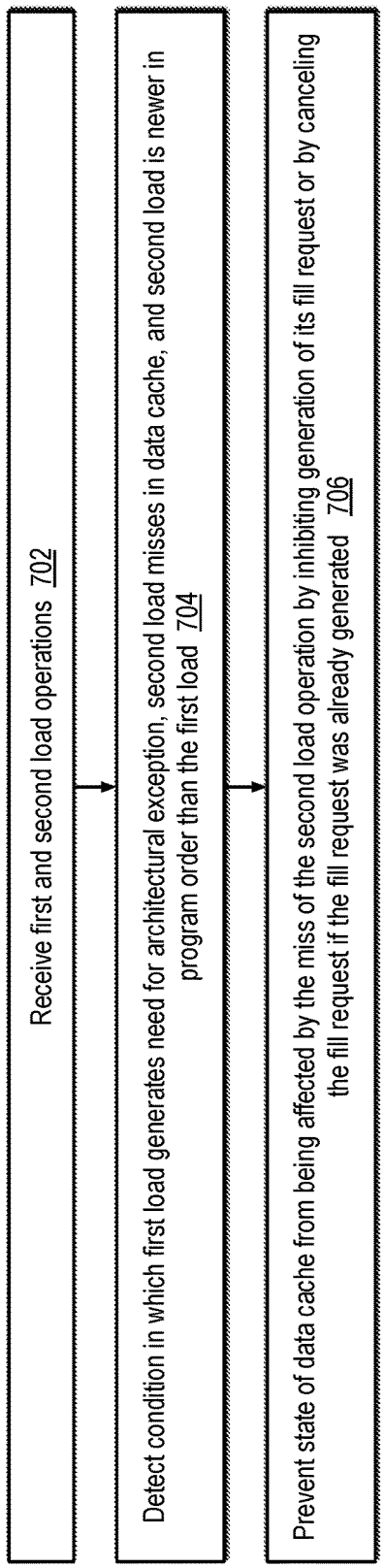
FIG. 7 is a flowchart illustrating operation of a processor to mitigate side channel attacks by inhibiting or canceling cache line fill requests under detected conditions according to embodiments of the present disclosure.

FIG. 7 is a flowchart illustrating operation of a processor (e.g., core 100 of FIG. 1 that includes the LSU 117 of FIG. 2) to mitigate side channel attacks by inhibiting or canceling cache line fill requests under detected conditions according to embodiments of the present disclosure. Operation begins at block 702.

At block 702, a load unit (e.g., LSU 117) receives first and second load operations each of which specifies a respective load address (e.g., load address 224) which is also used to access a data cache (e.g., data cache 103). The first and second load operations may be issued (e.g., by scheduler 121 to LSU 117) out of program order. Additionally, the first and second load operations may be speculatively executed by the core 100. Operation proceeds to block 704.

At block 704, a condition is detected (e.g., by LSU 117) in which the first load operation generates a need for an architectural exception, the second load operation misses in the data cache 103, and the second load operation is newer in program order than the first load operation. Operation proceeds to block 706.

At block 706, generation of a cache line fill request in response to the second load operation miss is inhibited or canceled if the fill request was already generated, thereby preventing the state of the data cache from being affected by the miss of the second load operation. In this manner, advantageously, side channel attacks may be mitigated, e.g., a Meltdown-style SCA, since the speculatively executed second load operation miss will not cause any side effects on the cache state.

Figure 8:
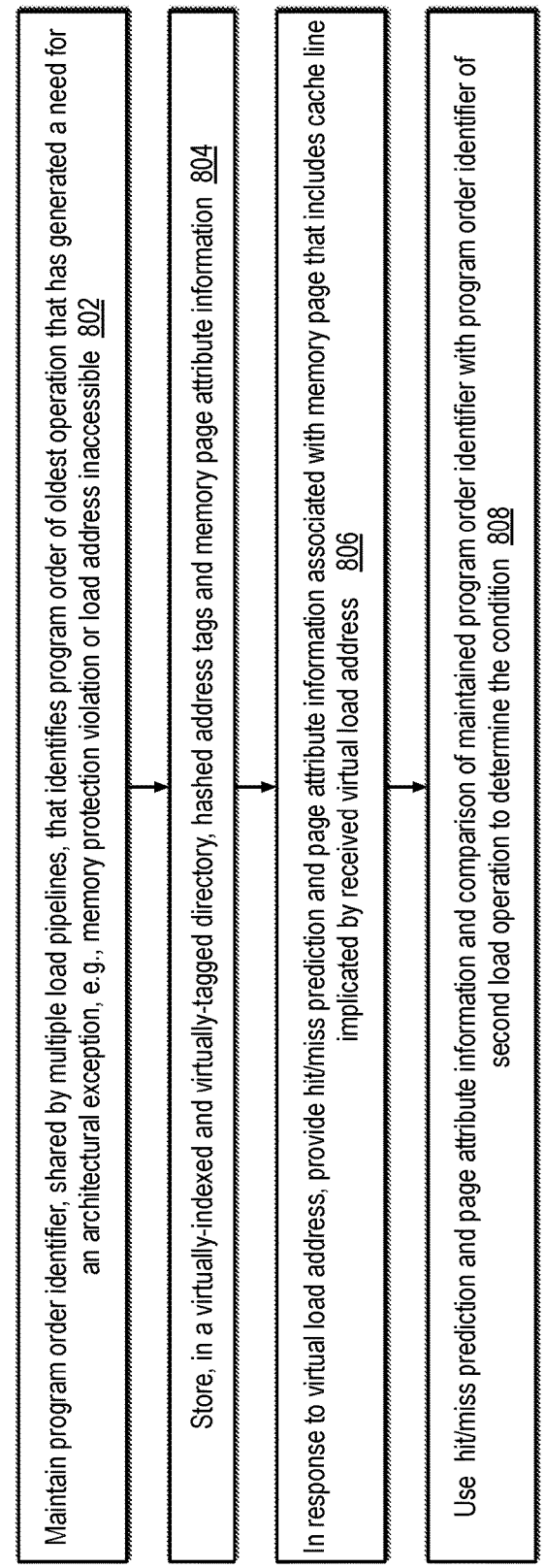
FIG. 8 is a flowchart illustrating operation of a processor to perform the second operation of FIG. 7 in more detail according to embodiments of the present disclosure.

FIG. 8 is a flowchart illustrating operation of a processor to perform the operation at block 704 of FIG. 7 in more detail according to embodiments of the present disclosure. Operation begins at block 802.

At block 802, a program order identifier (e.g., OldestExceptionRobId 206) is maintained (e.g., by LSU 117) that identifies the program order of the oldest operation that has generated a need for an architectural exception, e.g., a memory protection violation or an attempt to address an inaccessible memory location. The program order identifier may be shared by multiple pipelines of the LSU 117. Operation proceeds to block 804.

At block 804, hashed address tags and page attributes (e.g., hashed tags 308 and page attributes 312 of FIG. 3) may be stored in a virtually-indexed, virtually-tagged directory (e.g., hashed tag array 434 of FIG. 4). In the embodiment of FIG. 6, the page attributes may be stored in the L1 DTLB 699. Operation proceeds to block 806.

At block 806, in response to a virtual address of a load operation (e.g., load address 224), a hit/miss prediction and page attributes (e.g., early miss prediction 228 and page attributes 226 of FIG. 4) associated with a memory page that includes the cache line implicated by the virtual load address are provided (e.g., by hashed tag array 434 of FIG. 4). In the embodiment of FIG. 6, the page attributes may be provided by the L1 DTLB 699 as page attributes 226 in response to the virtual load address 224, and the hit/miss indication may be provided as miss indication 228 by comparator 444. Operation proceeds to block 808.

At block 808, the hit/miss prediction and the page attributes as well as a comparison of a program identifier of the load operation and the maintained program order identifier of the oldest architectural exception need generating operation are used to detect the condition in which the first load operation generates a need for an architectural exception, the second load operation misses in the data cache, and the second load operation is newer in program order than the first load operation.

Expeditious Initiation of Flushing Instructions Dependent Upon Load Instruction that Causes a Need for an Architectural Exception As described above, generally speaking, in a Meltdown type SCA a load instruction reads a secret byte from a memory location that the load instruction is not privileged to read, and a dependent instruction (e.g., another load instruction) uses the result of the load instruction (the secret byte value) to encode the secret byte value into the cache memory to create the opportunity for a cache timing attack. Typically, the dependent instruction encodes the secret byte by causing a cache line fill request. More specifically, the processor may speculatively execute the load instruction and forward the secret byte to the dependent instruction before it discovers and deals with the privilege violation. Conventional processors have been designed to delay discovering and/or dealing with the privilege violation since privilege violations, in the absence of SCAs, tend to occur infrequently. That is, a conventional superscalar out-of-order speculative execution processor may take a long time to flush the dependent instruction because, rather than merely determining the information intrinsically necessary to initiate flushing dependent instructions and doing so as soon as the intrinsic information is determined, the conventional processor may wait for other conditions or events to occur. For example, the conventional processor may wait until the exception-causing instruction is ready to retire, i.e., until all older instructions have retired, thus simplifying the conventional processor design. For another example, the conventional processor may wait until all older instructions than the exception-causing instruction are guaranteed abort free, i.e., guaranteed not to generate an abort request. For another example, the conventional processor may attempt to optimize performance by prioritizing branch mispredictions or other frequently occurring abort request causes, but de-prioritizing abort requests from load instructions that cause an architectural exception or other uncommon abort request causes by handling the latter with more delay than the high priority abort requests. For example, a conventional processor may include a "fast" logic block that only receives and handles the frequently occurring abort requests (which may purposely be chosen as a small subset) and a slow logic block that receives and handles the infrequently occurring abort requests, which includes the load exception abort requests, that may not affect performance if handled more slowly. Such delay may enlarge the window of speculation, i.e., the window of time in which dependent instructions may speculatively execute, and therefore increase the opportunity for the SCA to encode the secret byte value into the cache for subsequent exploitation.

Advantageously, embodiments are described in which the processor expeditiously initiates flushing dependent instructions to reduce, and in some cases eliminate, the window of speculation for dependent instructions to set up a cache side channel attack opportunity. More specifically, the processor initiates flushing the dependent instructions as soon as the processor determines the intrinsic information needed to perform the flushing, as described below.

When an out-of-order superscalar speculative execution processor detects that an instruction, such as a load instruction, causes a need for the processor to raise an exception such as a protection violation, the processor must perform a selective flush in order to accomplish architectural correctness. That is, the processor needs to continue executing and retiring the instructions older than the exception-causing instruction (unless they also cause a need for an exception), and the processor needs to flush instructions dependent upon the exception-causing instruction (and possibly also flush the exception-causing instruction, depending upon the type of the exception). Additionally, the processor executes many instructions concurrently, each capable of causing a need for the processor to raise an exception. Therefore, the exception-causing instructions must be prioritized by age to determine the oldest exception-causing instruction and make it the highest priority. Still further, a given instruction may even have multiple exception causes that need to be prioritized. Finally, the program order location of highest priority exception-causing instruction within the outstanding instruction stream needs to be determined in order to find the dependent instructions, since the dependent instructions are later in program order than the highest priority exception-causing instruction.

The determination of the highest priority exception-causing instruction and its location in the program order of the outstanding instructions in an out-of-order superscalar speculative execution processor may be referred to as the intrinsic information needed to perform the flushing of dependent instructions. Advantageously, in the embodiments described, the processor initiates an abort process, which includes flushing the dependent instructions, as soon as the processor determines the intrinsic information. In one embodiment, the flushing starts with the oldest dependent instructions since they are more likely to be the instruction of the SCA (e.g., load instruction) that encodes the secret byte value into the cache for subsequent exploitation. In some embodiments, initiating the abort process, which includes flushing the dependent instructions, as soon as the highest priority abort-requesting instruction and its location are determined means the time between receiving the abort request and initiating the abort process is no more than a single clock cycle; in other embodiments, the time is no more than two clock cycles; and in other embodiments, the time is no more than three clock cycles. The number of clock cycles is effectively a function of the clock cycle period of the processor and the time required to determine and use the intrinsically needed information.

Figure 9:
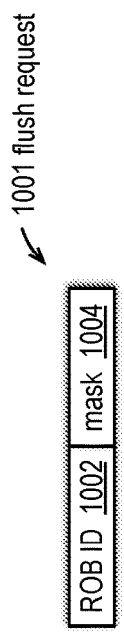
FIG. 9 is a block diagram illustrating an abort request according to an embodiment of the present disclosure.

FIG. 9 is a block diagram illustrating an abort request 901 according to an embodiment of the present disclosure. The abort request 901 includes a ROB ID field 902 and a type field 904. The ROB ID 902 specifies the location in the ROB 122 of FIG. 1 of the instruction that is causing the abort request. Since the ROB 122 maintains program order of instructions, the ROB ID 902 also specifies the location in program order of the abort-requesting instruction. The type field 904 specifies the type of the abort request, e.g., architectural exceptions such as a permission violation exception or page not present exception, and microarchitectural exceptions such as a branch misprediction or a store-to-load-forwarding misprediction. An abort request 901 to the PCL 132 may be generated by a unit of the processor core 100 of FIG. 1, e.g., by the execution units 114, in order to request the PCL 132 to perform an abort process with respect to the instruction specified in the ROB ID 902 and an abort type specified in the type field 904, which may include a permission violation in the case of a load instruction being run by an SCA. In one embodiment, the abort process performed by the PCL 132 includes flushing all instructions that are younger than the instruction that is causing the abort request. In another embodiment, all instructions are flushed that are dependent upon the result of the instruction that is causing the abort request, which by definition are younger than the instruction that is causing the abort request. The abort process, described in more detail below, may include non-selectively flushing all instructions from the in-order front-end 110 and mid-end 120 of the processor 100 and restoring microarchitectural state of the processor 100 (e.g., register rename tables, program counter fetch address) to its appropriate state, and selectively flushing from the out-of-order back-end 130 all instructions younger than/dependent upon the instruction causing the abort request. Depending upon the type of abort request, the instruction causing the abort request may also be flushed. An abort request that requests also flushing of the instruction causing the abort request is referred to herein as a "pre-op" abort request; whereas an abort request that does not request also flushing of the instruction causing the abort request is referred to herein as a "post-op" abort request. As described in more detail below, an LSU 117 may generate an abort request 901 in response to detecting that a load instruction causes a need for the processor 100 to raise an architectural exception, such as a permission violation exception, which is a common occurrence in some side channel attacks, such as a Meltdown style of SCA or other SCA. Advantageously, the PCL 132 initiates flushing of dependent instructions as soon as the intrinsic information is obtained to do so, as described in more detail herein. It should be understood that the term "instruction" herein may be used to refer to an architectural instruction and/or to a micro-operation, or Op, into which an architectural load instruction is decoded, as described above, particularly within the back-end 130 of the processor 100, and in particular the use of the term "load instruction" herein may be used to refer to an architectural load instruction and/or to a load micro-operation, or load Op, into which an architectural load instruction is decoded.

Figure 10:
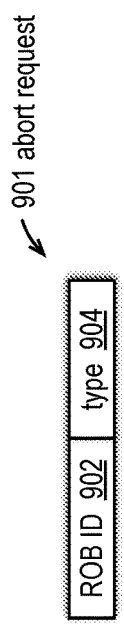
FIG. 10 is a block diagram illustrating a flush request according to an embodiment of the present disclosure.

FIG. 10 is a block diagram illustrating a flush request 1001 according to an embodiment of the present disclosure. The flush request 1001 includes a ROB ID field 1002 and a mask field 1004. The mask field 1004 specifies, either directly or indirectly, a number of instructions to be flushed in response to the flush request 1001. The ROB ID 1002 specifies the location in the ROB 122 of FIG. 1, and thus the instruction's location in program order, of at least one instruction that is requested to be flushed from the back-end 130. A flush of an instruction includes invalidating, or removing, the instruction (e.g., clearing a valid bit associated with the instruction as it flows down a pipeline and/or sits in a storage structure) from all pipelines (e.g., pipelines of the EUs 114) and relevant storage structures (e.g., entries in the scheduler 121, entries in the load/store queue 125). A flush of an instruction also includes invalidating the entry in the ROB 122 allocated to the instruction. In one embodiment, the flush request 1001 requests the back-end 130 to flush the single instruction whose location is specified by the ROB ID 1002 (in which case the mask 1004 may be unnecessary). Such an embodiment is referred to herein as a "single flush." In such an embodiment, the PCL 134 may employ a sequence of single instruction flush requests 1001 to perform the flush portion of the abort process. In another embodiment, the flush request 1001 requests the back-end 130 to flush all outstanding instructions younger than and including the instruction whose location is specified by the ROB ID 1002, which would include all instructions dependent upon the instruction whose location is specified by the ROB ID 1002. Such an embodiment is referred to herein as a "flash flush." In such an embodiment, the PCL 134 may employ one flash flush request 1001 to perform the flush portion of the abort process. In yet another embodiment, the flush request 1001 requests the back-end 130 to flush the number of instructions specified by the mask 1004 that are younger than and including the instruction whose location is specified by the ROB ID 1002. Such an embodiment is referred to herein as a "hybrid flush." In such an embodiment, the PCL 134 may employ a sequence of hybrid flush requests 1001 to perform the flush portion of the abort process. Thus, the flushing of the dependent instructions (and the highest priority abort-requesting instruction in the case of a pre-op abort) is initiated expeditiously, i.e., as soon as the highest priority abort-requesting instruction and its location in program order is determined. The completion of the selective flush, i.e., flushing the dependent/younger instructions, may be performed over the course of multiple clock cycles, depending upon whether a flash flush, hybrid flush or sequence of single flushes is performed and the number of instructions that need to be flushed.

Figure 11:
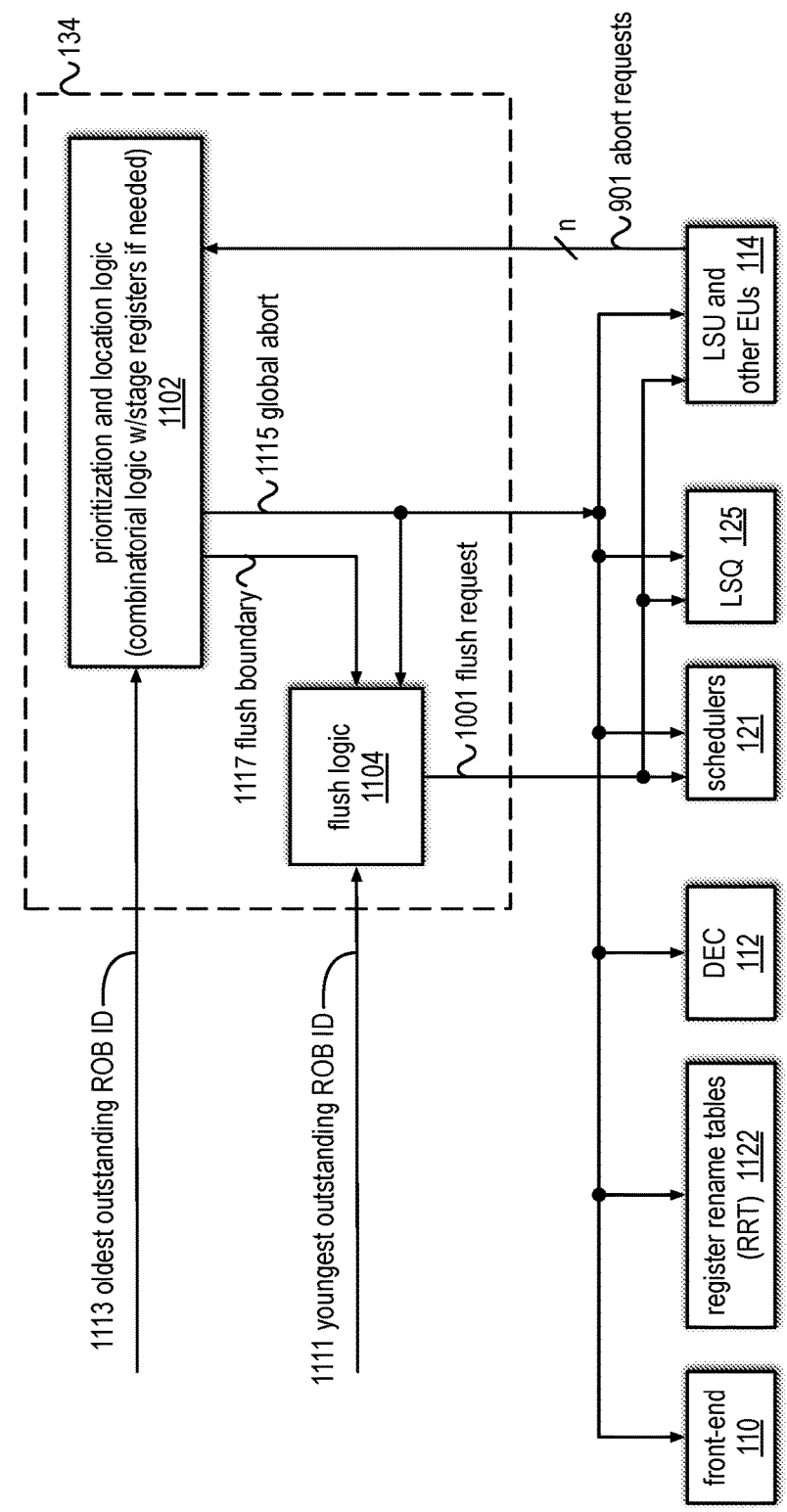
FIG. 11 is a block diagram illustrating in more detail the abort and exception handling logic and other portions of the processor core of FIG. 1 according to an embodiment of the present disclosure.

FIG. 11 is a block diagram illustrating in more detail the abort and exception handling logic 134 and other portions of the processor core 100 of FIG. 1 according to an embodiment of the present disclosure. The abort and exception handling logic 134 comprises control logic referred to in FIG. 11 as prioritization and location logic 1102 and flush logic 1104. The prioritization and location logic 1102 receives abort requests 901 (e.g., of FIG. 9) from the execution units 114. In particular, the prioritization and location logic 1102 receives abort requests 901 from the LSU 117 in response to detecting that a load instruction causes a need for the processor 100 to raise an architectural exception, which is common in Meltdown style SCAs and potentially other types of SCAs.

In response to receiving one or more abort requests 901, the prioritization and location logic 1102 generates a global abort signal 1115 to initiate an abort process that includes non-selectively flushing all instructions from the in-order front-end 110 and mid-end 120 of the processor 100, restoring microarchitectural state of the processor 100 to its appropriate state, and selectively flushing from the out-of-order back-end 130 all instructions younger than/dependent upon the instruction causing the abort request. The global abort signal 1115 includes information needed by various units of the processor 100 to accomplish the abort process, as described in more detail below. More specifically, the global abort signal 1115 is received by the EUs 114 (including the LSU 117), the LSQ 125, the schedulers 121, the decoder 112, the front-end 110, and register rename tables (RRT) 1122. Additionally, the prioritization and location logic 1102 generates a flush boundary 1117, also referred to as the abort point, that is received by the flush logic 1104. In response to assertion of the global abort signal 1115 and the flush boundary 1117, the flush logic 1104 generates one or more flush requests 1001 to accomplish the selective flushing of the back-end 130, as described above with respect to FIG. 10 and as described below. The flush requests 1001 are received by the EUs 114 (including the LSU 117), the LSQ 125 and the schedulers 121.

The prioritization and location logic 1102 receives the abort requests 901 and prioritizes them to determine the highest priority abort-requesting instruction based on their relative ages with respect to program order and selects the abort-requesting instruction that is oldest in program order as the highest priority abort-requesting instruction. In one embodiment, the prioritization and location logic 1102 determines the oldest, i.e., highest priority, abort-requesting instruction by comparing the ROB IDs of the instructions requesting an abort, although other embodiments (e.g., ROB-less embodiments) are contemplated in which the highest priority abort-requesting instruction is determined in another manner. In one embodiment, multiple stages of the LSU 117 may generate an abort request 901, and different stages of the LSU 117 pipeline may detect and generate different types, or causes, of abort requests 901. For example, a privilege violation exception may be detected in one stage of the LSU 117, a page not present exception may be detected in a different stage of the LSU 117, and a cause of a microarchitectural abort may be detected in yet a third stage of the LSU 117. In one embodiment, if the LSU 117 detects a need to request an abort in multiple stages, the LSU 117 internally prioritizes the abort request types such that it sends a single abort request 901 to the PCL 132 with the highest priority type 904 of abort request. In other embodiments, the PCL 132 may receive multiple abort requests from different stages of the same execution pipeline, and the prioritization and location logic 1102 performs the prioritization of the abort requests with respect to abort request type 904. The ISA of the processor 100 defines the priority of abort causes among architectural causes. The microarchitecture of the processor 100 defines the priority of abort causes with respect to microarchitectural causes and with respect to architectural causes.

Once the highest priority abort-requesting instruction is determined, the prioritization and location logic 1102 then determines the location in program order of the highest priority abort-requesting instruction. In the case of a pre-op abort, the flush boundary 1117 points to (e.g., is the ROB ID of) the highest priority abort-requesting instruction. In the case of a post-op abort, the flush boundary 1117 points to the instruction immediately following in program order the highest priority abort-requesting instruction. In one embodiment (e.g., a RISC-V ISA embodiment), all abort requests 901 generated by the LSU 117 in response to detecting that a load instruction causes a need for the processor to raise an architectural exception are pre-op abort requests. In the processor 100 embodiment of FIG. 1, the ROB ID of the highest priority abort-requesting instruction is its location in program order, although other embodiments are contemplated in which the processor 100 employs another method than a ROB to maintain program order among out-of-order executed instructions and the location of the highest priority abort-requesting instruction is determined by other methods. In such embodiments, the prioritization and location logic 1102 may need to retrieve other information besides the output of the prioritization operation, i.e., besides the identifier of the highest priority abort-requesting instruction.

In the embodiment of FIG. 11, the prioritization and location logic 1102 comprises combinatorial logic whose inputs include the abort requests 901 and the oldest outstanding instruction ROB ID 1113, and whose outputs include the flush boundary 1117 and global abort signal 1115. The oldest outstanding instruction ROB ID 1113, i.e., the ROB ID of the oldest outstanding instruction in the processor 100, enables the prioritization and location logic 1102 to determine, between two or more received ROB IDs 902, which is relatively older. In particular, the prioritization and location logic 1102 is absent a state machine. This is because the prioritization and location logic 1102 does not wait for other conditions or events to occur beyond the reception of the abort requests 901 to initiate the abort process. Rather, in the embodiment of FIG. 11, the prioritization and location combinatorial logic 1102 receives the abort requests 901 and oldest outstanding instruction ROB ID 1113 as inputs and combinatorially makes the prioritization and location determinations that are indicated on the flush boundary 1117 output without respect to other conditions or events. Stated alternatively, the abort process is initiated within the propagation delay time required for the abort requests 901 and oldest outstanding instruction ROB ID 1113 to flow through the combinatorial logic of the prioritization and location logic 1102 to its flush boundary 1117 and global abort signal 1115 outputs plus the propagation delay time required by the flush logic 1104 to generate the first flush request 1001 from reception of the flush boundary 1117 and global abort signal 1115, as described below. Staging registers may be needed within the prioritization and location logic 1102 depending upon the processor cycle time, where in the processor clock cycle the abort requests 901 and oldest outstanding instruction ROB ID 1113 are received by the prioritization and location logic 1102, the propagation delay of the combinatorial logic, and the setup and hold times associated with the flush logic 1104 that receives and uses the flush boundary 1117 and global abort signal 1115. For example, in the embodiment of FIG. 11 the time required by the prioritization and location logic 1102 to compare the associated ROB IDs 902 of the abort requests 901, taking into account the oldest instruction ROB ID 1113, to determine the highest priority abort-requesting instruction may be substantial relative to the clock cycle of the processor 100, in which case one or two levels of stage registers may be required such that the flush boundary 1117 and global abort signal 1115 may appear in the next clock cycle or next two clock cycles after the clock cycle in which the prioritization and location logic 1102 receives the abort requests 901. Furthermore, although the prioritization and location logic 1102 and flush logic 1104 are shown as separate logic blocks in FIG. 11, they may be designed as combined logic blocks. For example, the prioritization and location logic 1102 and/or flush logic 1104 may be designed as logic equations that are provided as input to logic synthesis tools that synthesize the design as a single block such that the flush boundary 1117 and global abort signal 1115 are communicated from the prioritization and location logic 1102 to the flush logic 1104 internally within the single block. Additionally, the synthesis tools may receive the processor clock cycle period as an input and insert staging registers into the combinatorial logic as necessary to meet timing requirements. In summary, the prioritization and location logic 1102 performs only the described prioritization and location functions without waiting for any other conditions to be satisfied or met. Stated alternatively, the prioritization and location logic 1102 does not delay the prioritization and location determinations by waiting for the availability of other inputs that are not necessary for making the prioritization and location determinations. For example, the prioritization and location logic 1102 does not wait until a fuller set of outputs or results from execution of a load instruction have been received as inputs so that functions other than the prioritization and location functions can be performed together with the prioritization and location functions.

The flush logic 1104 receives the global abort signal 1115, flush boundary 1117 and the youngest outstanding instruction ROB ID 1111, i.e., the ROB ID of the youngest outstanding instruction in the processor 100. In response, the flush logic 1104 generates one or more flush requests 1001 to accomplish selective flushing of the back-end 130 at the flush boundary 1117. The flush logic 1104 includes combinatorial logic that generates the initial flush request 1001 of a sequence (or the flash flush request 1001) as soon as it receives the flush boundary 1117, global abort signal 1115 and youngest outstanding instruction ROB ID 1111, i.e., within the propagational delay time of the combinatorial logic that receives the flush boundary 1117, global abort 1115 and youngest outstanding instruction ROB ID 1111 inputs and generates the initial flush request 1001 output. The propagation delay time for the initial flush request 1001 may be very small in some embodiments since the ROB ID 1002 of the initial flush request 1001 may simply be the flush boundary 1117 and since the mask 1004 is unused in the case of a flash flush request or single flush request and therefore requires no logic, and in the case of a hybrid flush request the mask 1004 may be determined with very simple logic. In the case of a non-flash flush embodiment, e.g., such as a hybrid flush embodiment or sequence of single flushes embodiment as described above, the flush logic 1104 may include a state machine to accomplish the selective flushing over additional clock cycles after the initial flush request 1001 is generated by the combinatorial logic. The flush logic 1104 uses the youngest outstanding instruction ROB ID 1111 to determine the number of instructions to flush during the selective flushing as a whole and, in the case of a hybrid flush, the number instructions to flush during the given flush request 1001 of the sequence.

In one embodiment, if the prioritization and location logic 1102 is performing a current abort process and receives a new abort request associated with an instruction older than the highest priority abort-requesting instruction, the new abort request supplants the current abort process, i.e., the prioritization and location logic 1102 initiates a new abort process that includes flushing all instructions younger than the older instruction associated with the new abort request. Conversely, if the prioritization and location logic 1102 is performing a current abort process and receives a new abort request for a younger instruction than the highest priority abort-requesting instruction, the new abort request for the younger instruction is ignored.

The in-order front-end 110 receives the global abort signal 1115 that includes a fetch-block ID that it uses to index into a FB check-point buffer and retrieve contents of the indexed entry. The front-end 110 uses the retrieved entry content to restore microarchitectural state of the front-end 110 and to train branch predictors. Additionally, in response to the global abort signal 1115, the front-end 110 performs a non-selective flush of all instructions in the front-end 110, which could include an instruction designed by an SCA to encode a secret byte loaded by the exception-causing load instruction. The front-end 110 also receives a restart PC included in the global abort signal 1115 and restarts fetching at the restart PC. Additionally, restoration logic receives information included in the global abort signal 1115 that it uses to restore the register rename tables (RRT) 1122. Furthermore, in response to the global abort signal 1115, the decoder 112 stops dispatching instructions to the schedulers 121 and performs a non-selective flush of all instructions inside the decoder 112, which could include an instruction designed by an SCA to encode in the cache memory a secret byte loaded by the exception-causing load instruction.

As described above, a flush of an instruction in response to a flush request 1001 includes invalidating, or removing, the instruction from all pipelines and relevant storage structures. More specifically, in response to a flush request 1001, all entries in the scheduler 121 whose ROB ID matches the ROB ID 1002 of the flush request 1001—or any ROB ID in the case of a flash flush, or any ROB ID included within the set of ROB IDs specified by the combination of the ROB ID 1002 and mask 1004 in the case of a hybrid flush—are invalidated (e.g., valid bit is cleared) such that they will not be issued for execution, which may prevent the execution of an instruction designed by an SCA to encode in the cache memory a secret byte loaded by the exception-causing load instruction. Similarly, in response to a flush request 1001, all entries in the load and store queue 125 whose ROB ID matches the ROB ID 1002 of the flush request 1001—or any ROB ID in the case of a flash flush, or any ROB ID included within the set of ROB IDs specified by the combination of the ROB ID 1002 and mask 1004 in the case of a hybrid flush—are invalidated (e.g., valid bit is cleared) such that the entry is removed from the LSQ 125, which may prevent update of the cache memory by an instruction designed by an SCA to encode in the cache memory a secret byte loaded by the exception-causing load instruction. In the case of a flush request 1001 associated with a hybrid flush or sequence of single flushes, pointers within the LSQ 125 may be updated to indicate the flush. Additionally, in the case of an instruction already issued to an EU 114, in response to a flush request 1001, the EU 114 invalidates the instruction such that it may prevent or inhibit actions that might otherwise get generated at a subsequent stage in the pipeline, such as a fill request being generated by the LSU 117.

As described above, the load-to-use latency is the number of clock cycles from issuance of a load instruction to the availability of the load result (assuming a cache hit) for instructions that are dependent on the load result. Therefore, the scheduler 121 waits to issue an instruction that is dependent on a load instruction (e.g., a load/store instruction that might attempt to encode a secret byte value in the cache) until at least the load-to-use latency number of clock cycles after the load instruction was issued. In one embodiment, the load-to-use latency, the stage of the LSU 117 pipeline that signals an abort request 901 in response to detecting a privilege violation exception by a load instruction, the stage of the LSU 117 that generates a fill request in response to a cache miss by a dependent load/store instruction issued to the LSU 117 (and in some embodiments the stage of the LSU 117 that can cancel an already-generated fill request), and the time required by the abort and exception handling logic 134 from reception of the abort request 901 caused by the exception-causing load instruction to reception by the LSU 117 of the initial flush request 1001 of the abort process are such that the dependent load/store instruction that would attempt to encode the secret byte value in the cache may be invalidated before the LSU 117 generates a fill request for its miss in the cache memory (or its generated fill request canceled), as described in more detail below with respect to FIGS. 14 through 17.

In one embodiment that does not perform a flash flush, the flush logic 1104 begins the selective flush by initially flushing the oldest instructions younger than the highest priority abort-requesting instruction, which may advantageously minimize the speculation window in which an instruction dependent upon an SCA exception-causing load instruction will be able to encode the secret byte value by modifying the cache state, i.e., may minimize the likelihood the cache state will be modified, since it may be more likely that the secret byte encoding dependent load/store instruction follows very closely in program order after the exception-causing load instruction.

In one embodiment, when the LSU 117 generates an abort request 901, the LSU 117 keeps track of the oldest pending abort that it has requested, e.g., the ROB ID of the load/store instruction associated with the oldest pending abort request 901, and all cache line fill requests resulting from younger load/store instructions are inhibited or canceled, as described above.

Figure 12:
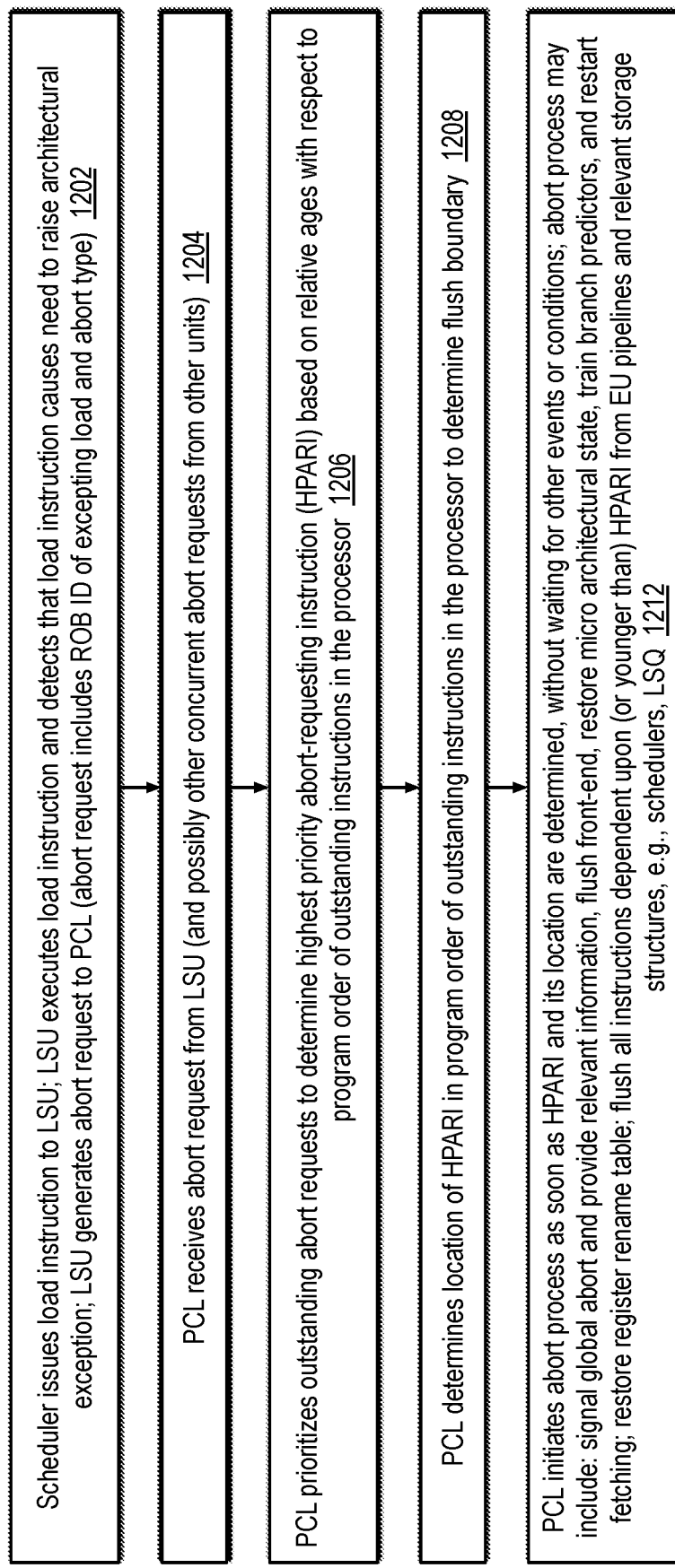
FIG. 12 is a flowchart illustrating operation of the exception handling logic and other portions of the processor core of FIG. 1 to mitigate side channel attacks according to embodiments of the present disclosure.

FIG. 12 is a flowchart illustrating operation of the exception handling logic 134 and other portions of the processor core 100 of FIG. 1 to mitigate side channel attacks according to embodiments of the present disclosure. Operation begins at block 1202.

At block 1202, the scheduler 121 issues a load instruction to the LSU 117 for execution. The load instruction proceeds down the LSU 117 pipeline which detects that the load instruction causes a need for the processor 100 to raise an architectural exception, e.g., a privilege violation or a page not present violation. In response, the LSU 117 generates an abort request 901 to the PCL 132 that includes the ROB ID 902 of the exception-causing load instruction and the abort type 904. More specifically, the LSU 117 looks up the load address (e.g., load address 224 of FIG. 2) in a TLB to obtain the permissions associated with the memory location specified by the load address and looks up the load address in a data cache (e.g., data cache 103 of FIG. 2) to determine whether the load address hits or misses in the data cache. The permissions may be checked to determine, among other abort causes, whether the load instruction causes a need for the processor to raise an exception, e.g., permissions violation or page not present. In the case of a miss, a fill request is generated to fill the missing cache line into the data cache, although in some embodiments the fill request is inhibited or canceled in order to mitigate a side channel attack by preventing or reducing the likelihood of a cache state update that might create a vulnerability, as described above. The TLB and data cache lookups may be performed sequentially or in parallel. For example, in a physically-tagged cache embodiment such as described with respect to FIGS. 5 and 6 in which the TLB and data cache are separate, the TLB lookup is performed first to obtain the physical load address and permissions, and then the physical address is looked up in the data cache to make a cache hit/miss determination. For another example, in a virtually-tagged cache embodiment such as described with respect to FIGS. 3 and 4 in which the TLB and data cache are combined, the TLB and data cache accesses may be performed in parallel to obtain the permissions and cache hit/miss determination. Operation proceeds to block 1204.

At block 1204, the PCL 132 receives the abort request 901 from the LSU 117. The PCL 132 may also concurrently receive abort requests 901 from other EUs 114, including other LSUs. 117. Operation proceeds to block 1206.

At block 1206, the prioritization and location logic 1102 prioritizes the outstanding abort requests 901 to determine the highest priority abort-requesting instruction based on the relative ages of the outstanding instructions in the processor 100 with respect to their program order. To illustrate the SCA mitigation capability, assume in the example that the exception-causing load instruction issued and executed at block 1202 is the highest priority abort-requesting instruction. As described above, in embodiments in which the PCL 132 receives multiple abort requests from different stages of the same execution pipeline, the prioritization and location logic 1102 also performs the prioritization of the abort requests with respect to abort request type 904. Operation proceeds to block 1208.

At block 1208, the prioritization and location logic 1102 determines the location of the highest priority abort-requesting instruction (assumed to be the exception-causing load instruction in the example) in the program order of the outstanding instructions in the processor 100. The location of the highest priority abort-requesting instruction enables the prioritization and location logic 1102 to determine the flush boundary 1117, which in the case of a pre-op abort is the highest priority abort-requesting instruction and which in the case of a post-op abort is the instruction after (younger/newer than) the highest priority abort-requesting instruction. As described above, in an embodiment in which the ROB ID 902 specified in a pre-op abort request 901 identifies the highest priority abort-requesting instruction, the ROB ID 902 is the flush boundary 1117. In one embodiment in which the ISA is RISC-V, only load/store instructions may generate architectural abort requests, and all the architectural abort requests are pre-op abort requests. Embodiments with other ISAs may include post-op abort requests, e.g., divide by zero abort request, in which case the flush boundary 1117 is the instruction after the highest priority abort-requesting instruction. Operation proceeds to block 1212.

At block 1212, as described above, as soon as the prioritization and location logic 1102 determines the highest priority abort-requesting instruction and its location in the program order (i.e., determines the intrinsic information needed to perform the abort process), the prioritization and location logic 1102 initiates the abort process, without waiting for other events or conditions to occur, by signaling the global abort 1115 and providing the flush boundary 1117, in response to which the flush logic 1104 initiates the selective flush at the flush boundary 1117 and the other units respond to the global abort signal 1115 to perform the abort process. Flushing the instructions at the flush boundary 1117 results in the flushing of instructions dependent upon the result of the highest priority abort-requesting instruction. In one embodiment, flushing the instructions at the flush boundary 1117 includes flushing all instructions younger than and including the instruction at the flush boundary 1117. Instructions older than the flush boundary 1117 are not flushed. As described above, flushing an instruction involves invalidating the instruction from its execution unit 114 pipeline and relevant storage structures, e.g., scheduler 121 and LSQ 125 entries. As also described above, the abort process further includes flushing the front-end 110, restoring microarchitectural state, training branch predictors 102, restoring of register rename tables 1122, and restarting fetching of instructions. As described herein, advantageously the abort process is expeditiously initiated in order to eliminate or reduce the likelihood that, for example, a load/store instruction will update the state of the data cache 103 with the result (secret byte value) of the exception-causing load instruction that may be later discovered in a probe of the cache by a side channel attack.

Figure 13:
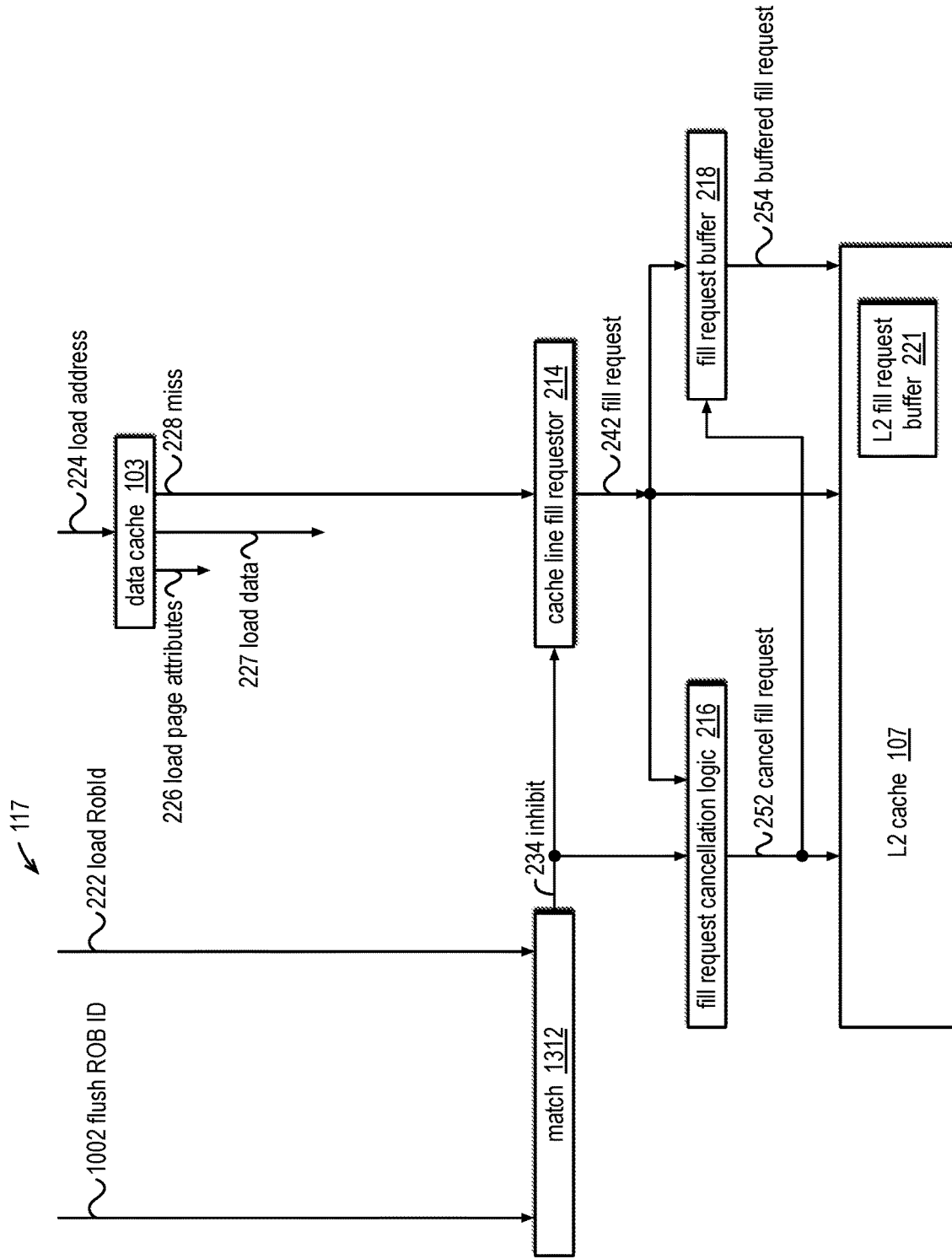
FIG. 13 is an example block diagram of the load-store unit of FIG. 1 in accordance with embodiments of the present disclosure.

FIG. 13 is an example block diagram of the LSU 117 of FIG. 1 in accordance with embodiments of the present disclosure. The LSU 117 of FIG. 13 is similar in some respects to the LSU 117 of FIG. 2. However, match logic 1312 receives the load ROB ID 222 and compares it to the ROB ID 1002 of the flush request 1001 of FIG. 11 and generates a true value on the inhibit signal 234 if the two inputs are equal, or in the case of a hybrid flush if the load ROB ID 222 is encompassed by the ROB ID 1002 and the mask 1004 of the flush request 1001. Similar to the manner described above, if the inhibit signal 234 is true, the cache line fill requestor 214 does not generate a fill request 242 for the load (or store) instruction, or if the fill request 242 has already been generated, the fill request cancellation logic 216 cancels the fill request 242. Embodiments of the fill request inhibition and/or fill request cancellation in response to a flush request 1001 are described below.

Figure 14:
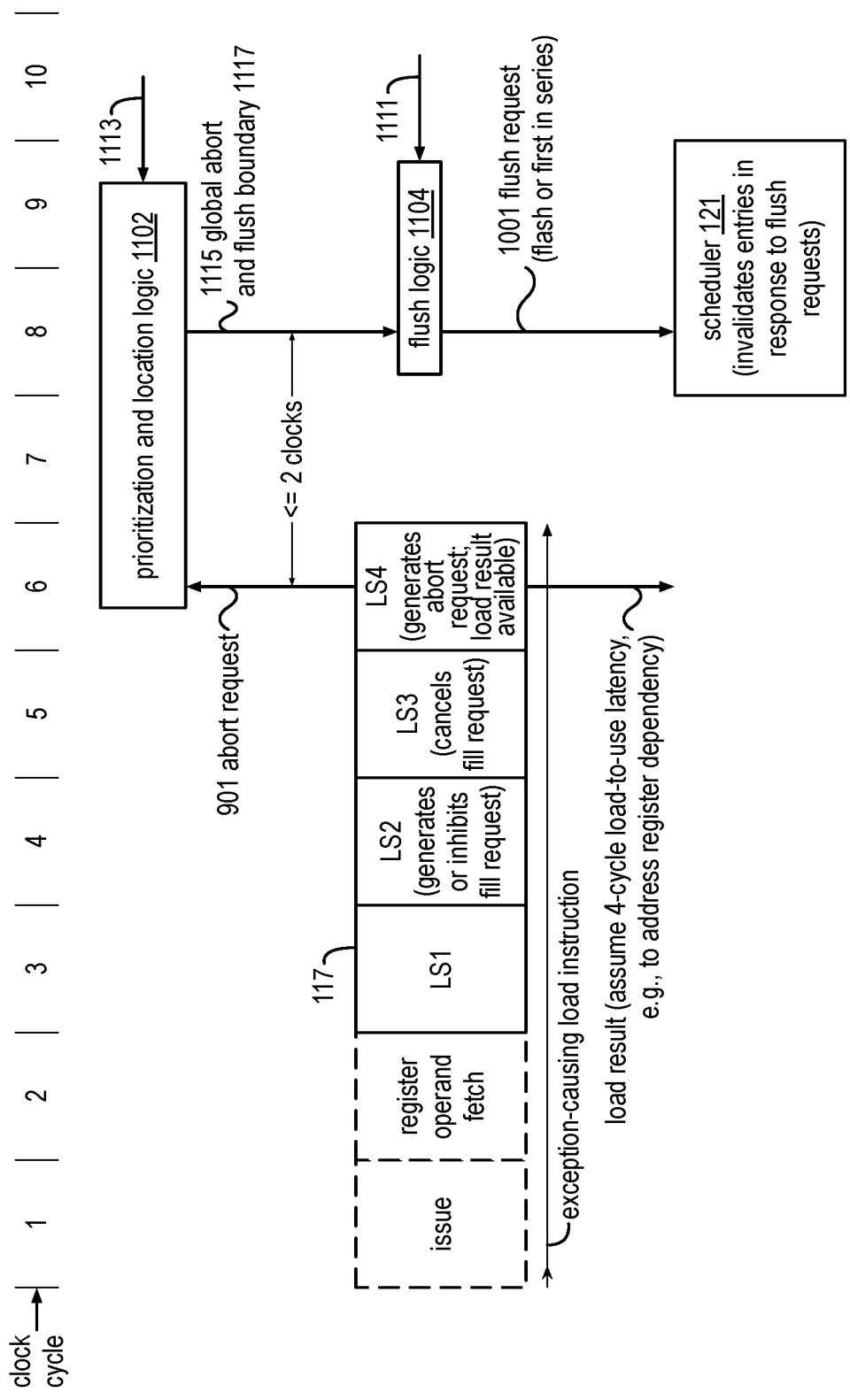
FIGS. 14 through 17 are pipeline timing diagrams illustrating operation of the processor core of FIG. 1 to mitigate side channel attacks according to embodiments of the present disclosure.

FIG. 14 is a pipeline diagram illustrating operation of the processor core 100 of FIG. 1 to mitigate side channel attacks according to an embodiment of the present disclosure. The pipeline diagram shows a series of processor clock cycles numbered 1 through 10. The pipeline diagram also shows portions of the pipeline 140 of the processor 100, namely the prioritization and location logic 1102, the flush logic 1104, the scheduler 121, and pipeline stages of the LSU 117. An exception-causing load instruction is shown flowing through the LSU 117 pipeline.

In clock cycle 1 the exception-causing load instruction is issued by the scheduler 121. In clock cycle 2, register operands specified by the load instruction are fetched and address generation is performed. In one embodiment, the address generation may be performed by a different EU, e.g., an IXU 115 of FIG. 1. As described more below with respect to FIG. 15, the load address generation by a dependent load/store instruction may use as one of its register operands the value of a secret byte speculatively read by the malicious load instruction that does not have permission to read the secret byte and upon whose secret byte result the dependent load/store instruction depends. In clock cycle 3, a first stage of the LSU 117 (LS1) processes the load instruction, e.g., performs an access of the data cache (e.g., data cache 103).

In clock cycle 4, a second stage of the LSU 117 (LS2) continues processing the load instruction. In one embodiment, LS2 is the stage in which an early miss 228 determination may be made. In the case of a cache miss, the LSU 117 may responsively generate a cache line fill request (e.g., fill request 242). Additionally, LS2 may be the stage in which a fill request is inhibited, either in response to detection of an architectural exception (e.g., through generation of the inhibit signal 234 by the control logic of FIG. 2) or in response to a flush request 1001 of FIG. 11 (e.g., through generation of the inhibit signal 234 by the control logic of FIG. 13), which may have been generated in response to abort request 901 signaled by an LSU 117 pipeline in response to detecting a need to raise an architectural exception.

In clock cycle 5, a third stage of the LSU 117 (LS3) continues processing the load instruction. In one embodiment, LS3 is the stage in which the LSU 117 cancels a fill request, either in response to detection of an architectural exception (e.g., through generation of the cancel fill request signal 252 by the control logic of FIG. 2) or in response to a flush request 1001 of FIG. 11 (e.g., through generation of the cancel fill request signal 252 by the control logic of FIG. 13), which may have been generated in response to abort request 901 signaled by an LSU 117 pipeline in response to detecting a need to raise an architectural exception.

In clock cycle 6, a fourth stage of the LSU 117 (LS4) continues processing the load instruction. In one embodiment, LS4 is the stage in which the LSU 117 makes the result of a load instruction available for dependent instructions. That is, in the embodiment of FIG. 14, the load-to-use latency is four clock cycles. In one embodiment, LS4 is also the stage in which the LSU 117 generates an abort request 901 in response to detecting a need to do so, including detecting a need to raise an architectural exception, e.g., by examining the page attributes (e.g., page attributes 226) to detect a permission violation such as might be caused by a load instruction of an SCA that is attempting to read a secret byte from a memory address that it does not have permission to read.

The prioritization and location logic 1102 receives the abort request 901 from the LSU 117 along with the oldest outstanding instruction ROB ID 1113 in clock cycle 6 and responsively generates the global abort signal 1115 and flush boundary 1117. The flush logic 1104, in response to the global abort signal 1115 and flush boundary 1117 along with the youngest outstanding instruction ROB ID 1111, generates a flush request 1101 in clock cycle 8. That is, in the embodiment of FIG. 14, the propagation delay time of the abort and exception handling logic 134 and flush logic 1104 is less than or equal to two clock cycles, i.e., the time from reception of the abort request 901 (caused by the exception-causing load instruction) by the abort and exception handling logic 134 to reception of the initial flush request 1001 of the abort process by the LSU 117, as shown. In the embodiment shown in FIG. 14, the global abort signal 1115 and flush boundary 1117 are shown being generated in clock cycle 8, although in other embodiments they may be generated during clock cycle 7, i.e., in an earlier clock cycle than the flush logic 1104 generates the flush request 1001. However, in other embodiments the propagation delay time of the abort and exception handling logic 134 and flush logic 1104 may be less than or equal to three clock cycles, and in other embodiments the propagation delay time of the abort and exception handling logic 134 and flush logic 1104 may be less than or equal to a single clock cycle.

The flush request 1001 is received by the scheduler 121 which responsively invalidates (e.g., clears valid bit of) entries whose ROB IDs are encompassed by the flush request 1001, i.e., by the ROB ID 1002 and mask 1004. In one embodiment, the number of entries in the scheduler 121 may be large which may require a large number of ROB ID comparators and a large amount of logic that uses the large number of comparator outputs such that more than one clock may be required to invalidate the entries of the scheduler 121 specified by the flush request 1001. One flush request 1001 is shown in FIG. 14, although with hybrid flush or sequence of single flush embodiments, the flush logic 1104 may generate a sequence of flush requests 1001. Thus, advantageously, given the parameters of the embodiment of FIG. 14 and assuming a flash flush embodiment, dependent load/store instructions that are still in the scheduler 121, i.e., have not yet been issued to an LSU 117 for execution, within two clock cycles of the generation of the abort request 901 will be invalidated and prevented from being issued for execution and therefore from updating the state of the cache memory to encode a secret byte value such as might be attempted by an SCA. Additionally, as described in more detail below with respect to FIG. 15, the flush request 1001 is also provided to the LSU 117 such that instructions executing within the LSU 117 pipeline whose ROB IDs are encompassed by the flush request 1001 may also be invalidated (e.g., valid bit cleared). Thus, if the dependent load/store instruction is present in those pipeline stages it may be invalidated such that it may not be executed by the LSU 117 and therefore not be able to generate a fill request to update the cache memory state. Consequently, even for hybrid flush and sequence of single flush embodiments, if a dependent load/store instruction gets issued, i.e., it does not get invalidated in the scheduler 121, it may still be invalidated in the LSU 117 by a second or subsequent flush request 1001.

Figure 15:
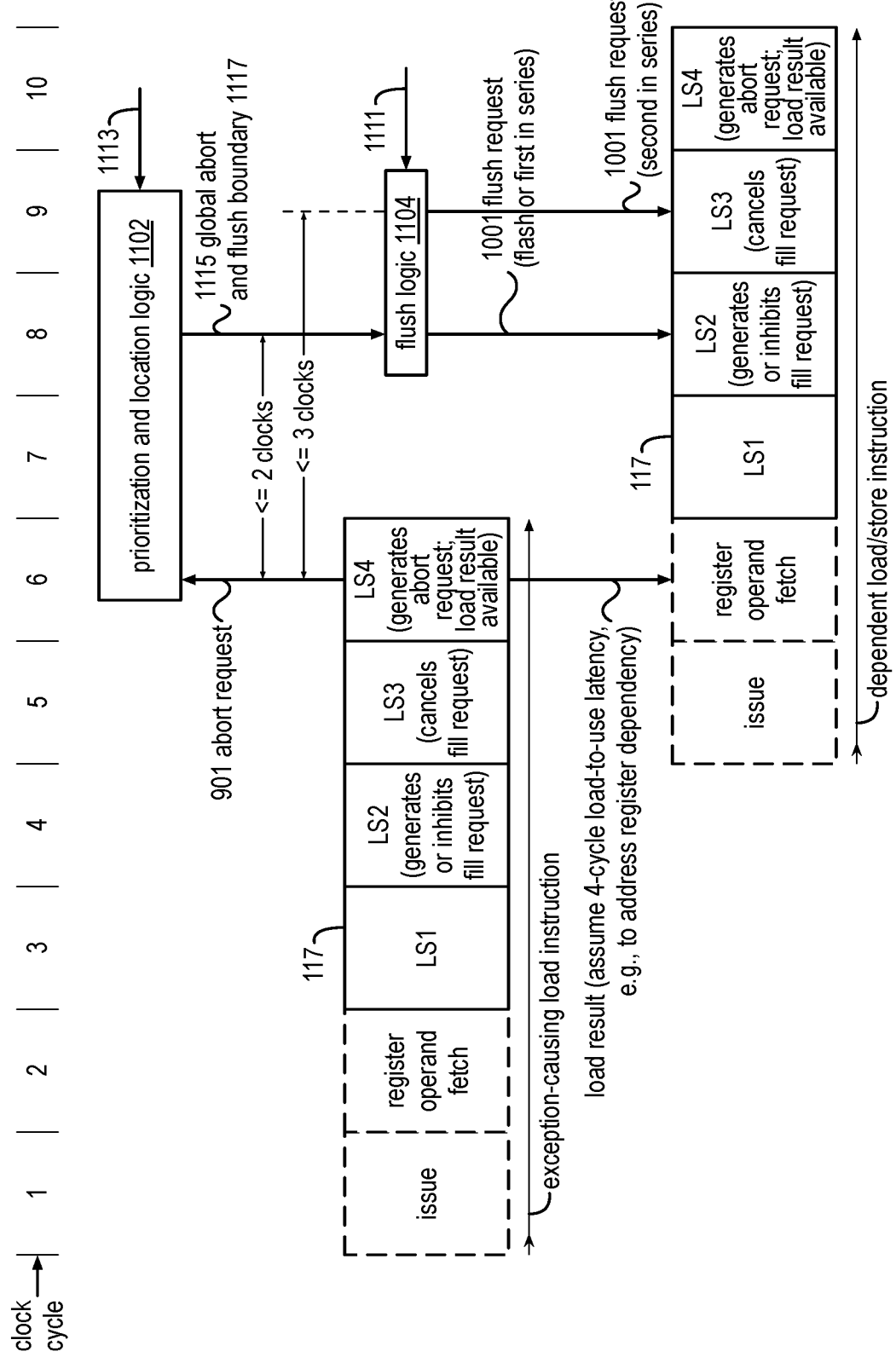

FIG. 15 is a pipeline diagram illustrating operation of the processor core 100 of FIG. 1 to mitigate side channel attacks according to an embodiment of the present disclosure. The pipeline diagram of FIG. 15 is similar in many respects to that of FIG. 14. The pipeline diagram of FIG. 15 also shows the processing of a dependent load/store instruction by the LSU 117 pipeline, i.e., a load/store instruction dependent upon the result of the exception-causing load instruction, that is assumed to miss in the cache memory, e.g., a load/store instruction that may attempt to encode a secret byte value in the cache. Because of the assumed 4-cycle load-to-use latency of the embodiment, the dependent load/store instruction is issued in clock cycle 5 and performs its operand fetch of the result of the exception-causing load instruction in clock cycle 6, and LS1 processes the dependent load/store instruction in clock cycle 7, as shown. As described above with respect to FIG. 14, in clock cycle 6 the dependent load/store instruction may generate its load address by using as one of its register operands the value of a secret byte speculatively read by the malicious load instruction that does not have permission to read the secret byte and upon whose secret byte result the dependent load/store instruction depends. In clock cycle 8, LS2 receives the flush request 1001 (generated as described with respect to FIG. 14) from the flush logic 1104 and inhibits generation of a fill request that would otherwise have been generated by LS2 in response to the cache miss by the dependent load/store instruction. Additionally, although not shown, the flush request 1001 is also provided to LS1 and the pipeline stages in which the register operand fetch is performed and in which the dependent load/store instruction is issued such that if the dependent load/store instruction is present in those pipeline stages it is invalidated (e.g., its valid bit is cleared) such that it will not be executed by the LSU 117 and therefore not be able to generate a fill request to update the cache memory state. As may be observed, advantageously, given the parameters of the embodiment of FIGS. 14 and 15, in a flash flush embodiment, all dependent load/store instructions are guaranteed not to update the cache memory state. As described in more detail below (e.g., with respect to FIGS. 26 and 27), a flash flush may be employed to prevent all instructions dependent upon an instruction causing a need for an architectural exception from consuming an architectural register result produced by the exception-causing instruction as long as the flash flush is performed sufficiently soon after the producing execution unit signals an abort request. That is, although FIG. 15 describes a load-to-load/store dependency, a flash flush may be employed regardless of the instruction type of the producing instruction, i.e., the instruction that causes the need for the architectural exception and produces the architectural register result, and regardless of the instruction type of the consuming instruction to prevent all instructions dependent upon the architectural exception-causing instruction from consuming its architectural register result.

Additionally, in hybrid flush or sequence of single flush embodiments, a second flush request 1001 is generated by the flush logic 1104 in clock cycle 9, which is shown provided to LS3. Therefore, even if the fill request for the dependent load/store instruction was not inhibited by the initial flush request in clock cycle 8, if the ROB ID of the dependent load/store instruction is encompassed by the second flush request 1001, then the LSU 117 (e.g., the control logic of FIG. 13) will cancel the fill request generated by the dependent load/store instruction, as described above. This reasoning continues for third, fourth, etc. flush requests 1001 for embodiments in which the fill request may be canceled multiple clock cycles after it is generated. Thus, the likelihood that a dependent load/store instruction may be able to update the cache state to encode a secret byte value is minimized.

Although the embodiments of FIGS. 14 through 17 are described with various parameters, e.g., the propagation delay through the abort and exception handling logic 134 and flush logic 1104 from signal of an abort request to initiation of the abort process, the load-to-use latency, the LSU 117 pipeline stages in which the various actions are performed, the flush type (e.g., flash, hybrid, sequence of single flush), the number of clock cycles after generation of a fill request that it may be cancelled, etc., in other embodiments the parameters may be different. As described, depending upon the values of the parameters, embodiments may ensure that a dependent load/store instruction will not update the cache memory state, whereas other embodiments may minimize the likelihood that a dependent load/store instruction will update the cache memory state.

Figure 16:
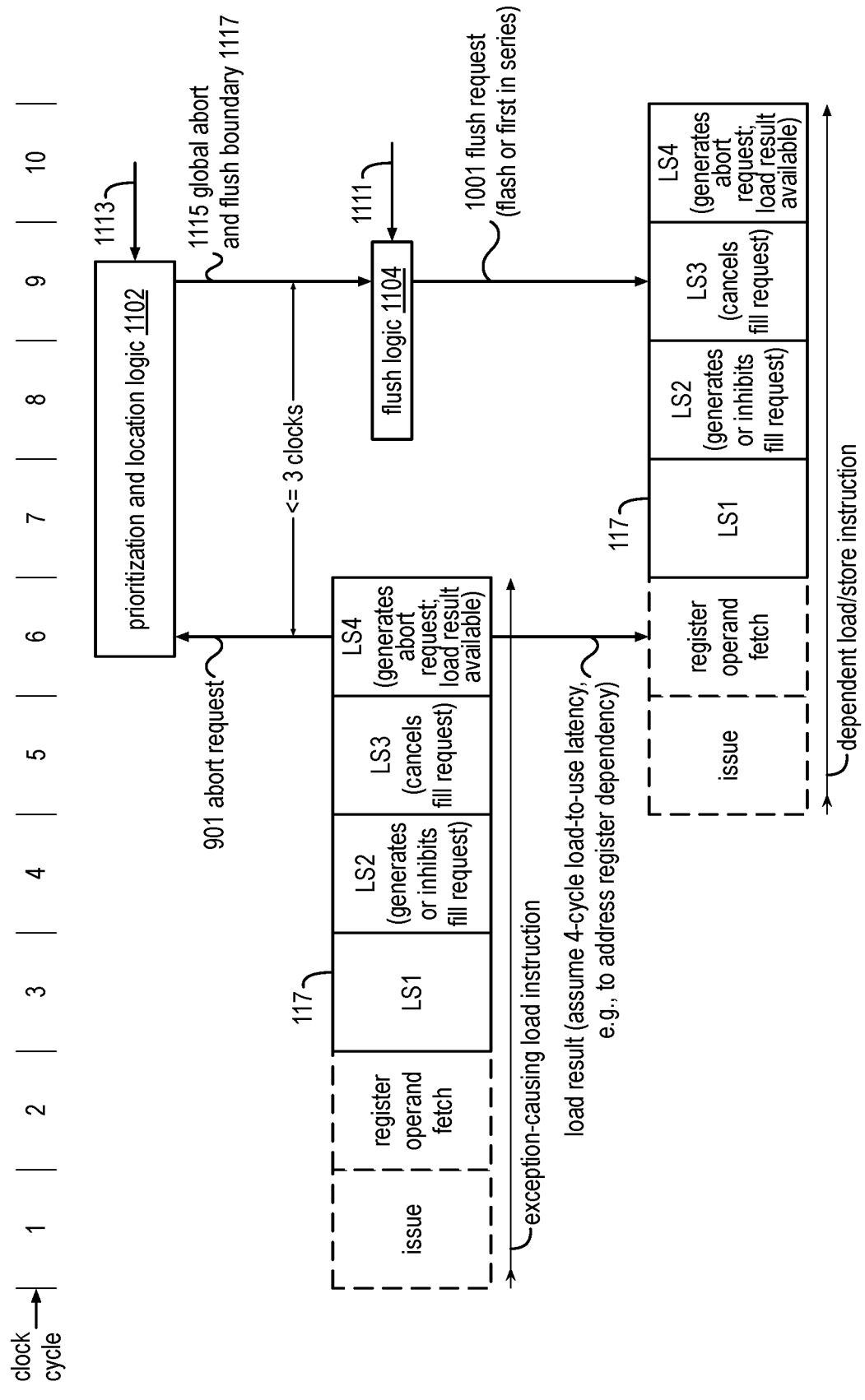

FIG. 16 is a pipeline diagram illustrating operation of the processor core 100 of FIG. 1 to mitigate side channel attacks according to an embodiment of the present disclosure. The pipeline diagram of FIG. 16 is similar in many respects to that of FIG. 15. However, in the embodiment of FIG. 16, the propagation delay time of the abort and exception handling logic 134 and flush logic 1104 is less than or equal to three clock cycles rather than two clock cycles as in the embodiment of FIG. 15. Therefore, the initial flush request 1001 arrives at LS3 (rather than LS2 as in FIG. 15) in clock cycle 9. However, if the ROB ID of the dependent load/store instruction in LS3 is encompassed by the initial flush request 1001, then the LSU 117 will cancel the fill request generated by the dependent load/store instruction, as described above. Thus, as in FIG. 15, advantageously, given the parameters of the embodiment of FIG. 16, in a flash flush embodiment, all dependent load/store instruction are guaranteed not to update the cache memory state. Additionally, in hybrid flush or sequence of single flush embodiments, if the dependent load/store instruction was issued one or more clock cycle beyond the load-to-use latency, if the ROB ID of the dependent load/store instruction is encompassed by the second or subsequent flush request 1001, then the LSU 117 will cancel the fill request generated by the dependent load/store instruction. Thus, the likelihood that a dependent load/store instruction may be able to update the cache state to encode a secret byte value is minimized.

Figure 17:
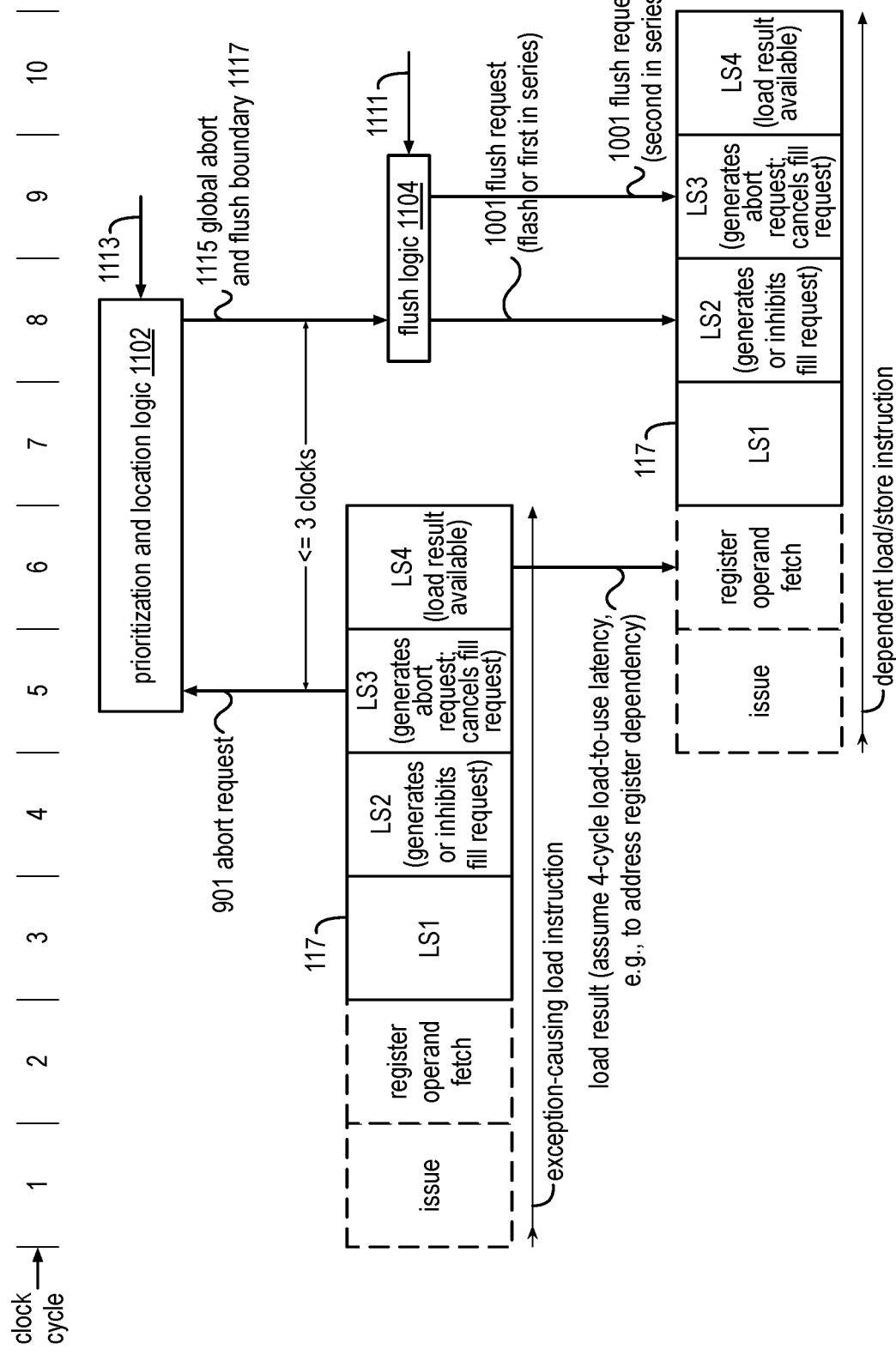

FIG. 17 is a pipeline diagram illustrating operation of the processor core 100 of FIG. 1 to mitigate side channel attacks according to an embodiment of the present disclosure. The pipeline diagram of FIG. 17 is similar in many respects to that of FIG. 16. However, in the embodiment of FIG. 17, LS3 generates the abort request 901 rather than LS4 as in the embodiment of FIG. 16. Therefore, the initial flush request 1001 arrives at LS2 as in FIG. 15 in clock cycle 8. Therefore, if the ROB ID of the dependent load/store instruction is encompassed in LS2 by the initial or in LS3 by the second flush request 1001, then the LSU 117 will respectively inhibit the fill request or cancel the fill request generated by the dependent load/store instruction, as described above. Thus, as in FIGS. 15 and 16, advantageously, given the parameters of the embodiment of FIG. 17, in a flash flush embodiment, all dependent load/store instruction are guaranteed not to update the cache memory state. Additionally, in hybrid flush or sequence of single flush embodiments, if the dependent load/store instruction was issued one or more clock cycle beyond the load-to-use latency, if the ROB ID of the dependent load/store instruction is encompassed by the second or subsequent flush request 1001, then the LSU 117 will cancel the fill request generated by the dependent load/store instruction. Thus, the likelihood that a dependent load/store instruction may be able to update the cache state to encode a secret byte value is minimized.

It should be understood that although the expeditious initiation of the abort process in response to a load instruction causing a need for an architectural exception, in particular the initiation of flushing dependent instructions as soon as the exception-causing load instruction has been identified as highest priority and its location in the program order of outstanding instructions has been determined, may serve to reduce the shadow cast by the mis-speculatively executed load instruction in order to mitigate Meltdown type SCAs, other types of SCAs—both present and future—may also be mitigated by the reduction of the mis-speculation shadow within which dependent instructions may speculatively execute before being flushed. Furthermore, it should be understood that the embodiments for expeditiously initiating flushing of instructions dependent upon a load instruction that causes a need for an architectural exception described with respect to FIGS. 9 through 17 and the embodiments for preventing cache memory state from being affected by a missing load operation by internally inhibiting or canceling a fill request of the load operation if an older load generates a need for an architectural exception described with respect to FIGS. 1 through 8 may both be included in the processor 100 to, in combination, improve the likelihood of mitigating SCAs, particularly SCAs that have not yet been discovered or developed but may later be.

Prevention of all Dependent Instructions from Consuming Architectural Register Result Produced by Producing Instruction that Causes Need for Architectural Exception FIG. 18 is an example block diagram of result signals 1801 produced by an execution unit 114 onto a result bus of FIG. 1 in accordance with embodiments of the present disclosure. The result signals 1801 includes an architectural register result (ARR) 1802 and an exception indicator 1806. The ARR 1802 is the architectural result of a producing instruction executed by a producing execution unit 114 (except in an instance in which a random data value is substituted for the architectural result because the producing instruction caused a need for an architectural exception, as described in more detail below with respect to FIG. 25). For example, the ARR 1802 may be the output of an arithmetic logic unit (ALU) (e.g., of one of the IXUs 115 or one of the FXUs 119 of FIG. 1) or data obtained from the data cache 103 (e.g., by a load instruction executed by an LSU pipeline 117). An ALU should be understood broadly as including a unit that performs other operations than merely arithmetic or logical operations. For example, an instruction executed by an ALU may examine a status register and produce an ARR 1802 based on the value of the status register. For another example, an instruction executed by an ALU may move a register value from one register to another register, such as an instruction that converts a floating-point register source operand to an integer register result. For another example, a call instruction may produce a return address that is written to an architectural register. An associated register number (not shown) that identifies the architectural register 105 for which the ARR 1802 is destined may also be generated, e.g., by the producing execution unit 114 or by another logic block. The exception indicator 1806 has a true value if the producing instruction that produced the result caused a need for an architectural exception and otherwise has a false value.

A producing execution unit is an execution unit 114 that executes a producing instruction, which is an instruction that specifies an architectural register of the register files 105 as the destination of its result. Examples of producing instructions are load instructions, arithmetic and logical instructions, non-arithmetic/logical architectural register result-producing instructions, architectural register move instructions, and call instructions. A consuming execution unit is an execution unit 114 that executes a consuming instruction, which is an instruction that specifies an architectural register as a source of an instruction operand. Examples of consuming instructions are load instructions, which use architectural register operands to compute the load address; store instructions, which use architectural register operands as store data and to compute the store address; arithmetic and logical and non-arithmetic/logical instructions, which use architectural register operands as operands; conditional branch instructions, which use architectural register operands as a condition value; indirect branch instructions, which use architectural register operands as a target address; and return instructions that use an architectural register operand as a return address.

A consuming instruction is necessarily a dependent instruction upon the producing instruction that produces the architectural register result that the consuming instruction consumes. (A consuming instruction may be dependent upon multiple producing instructions if the consuming instruction consumes multiple architectural results, e.g., specifies two or more architectural register source operands.) Architecturally, the dependent instruction consumes the architectural register result of the youngest instruction in program order that is older than the dependent instruction and that specifies as its destination register the same register that the dependent instruction specifies as its source register. However, because the processor 100 performs speculative execution, there is a need to prevent the dependent instruction from consuming an architectural register operand of a producing instruction that has caused a need for an architectural exception, which might make the processor 100 vulnerable to a side channel attack. For example, a malicious load/store instruction that uses a speculative architectural register result to compute its load/store address may encode in the data cache a secret byte read from a memory address that the producing instruction does not have permission to read but which was speculatively executed. For another example, an attacker may employ a conditional branch instruction that uses a speculative architectural register result as its condition or an indirect branch instruction that uses a speculative architectural register result as its target address to train—or more aptly to mis-train—a branch predictor to predict a subsequent instance of the branch instruction in a manner that exposes a vulnerability to a side channel attack. Embodiments have been described above that specifically prevent a dependent load/store instruction from consuming an architectural register operand of a producing load instruction that has caused a need for an architectural exception in order to mitigate SCAs. However, embodiments are described below that prevent all dependent instructions from consuming an architectural register operand of a producing instruction that has caused a need for an architectural exception in order to additionally mitigate SCAs.

FIG. 19 is an example block diagram of portions of the processor 100 of FIG. 1. The processor 100 includes register files 105 (e.g., an integer register file and a floating-point register file) and multiple schedulers 121 and execution units 114 of FIG. 1. Each of the execution units 114 is coupled to the register files 105 to receive architectural register operands. Each of the execution units 114 produces result signals 1801 of FIG. 18 on its result bus that is coupled to the register files 105 and to the inputs of the schedulers 121 and execution units 114. That is, each execution unit 114 provides an ARR 1802 and exception indicator 1806 that is provided to the register files 105 and also bypassed, or forwarded, to consuming execution units 114. If the execution of the producing instruction caused a need for an architectural exception, then the producing execution unit 114 sets the exception indicator 1806 to true. The ARR 1802 and exception indicator 1806 may not necessarily be output by the producing execution unit 114 on the same cycle, and the associated register number may be generated on yet another clock cycle. For example, the register number may be output one or more cycles ahead of the ARR 1802 in order to wake up the scheduler 121 so that the scheduler 121 can issue the consuming instruction (e.g., during an issue cycle such as shown in FIGS. 14 through 17) so that the consuming instruction can fetch or bypass the ARR 1802 (e.g., during a register operand fetch cycle such as shown in FIGS. 14 through 17). The number of cycles that the register number is output ahead of the ARR 1802 may be based on the result-to-use latency of the producing execution unit 114. The result-to-use latency is the number of clock cycles from issuance of a producing instruction to the availability of the produced ARR 1802 for instructions that are dependent on the produced ARR 1802. Additionally, the cycle in which the producing execution unit 114 outputs the exception indicator 1806 may depend upon the stage in which the producing execution unit 114 detects the need for an architectural exception. For example, in the embodiments of FIGS. 14 through 16, the LSU 117 generates the exception indicator 1806 in stage LS4, whereas in the embodiment of FIG. 17, the LSU 117 generates the exception indicator 1806 in stage LS3. In one embodiment, the IXU 115 and the FXU 119 generate the exception indicator 1806 in the first stage of their execution pipelines.

Some instructions are not producing instructions, in which case the result signals 1801 are not valid. When a producing execution unit 114 outputs valid result signals 1801, the ARR 1802 is written to the physical register of the register files 105 that is specified by the associated register number. Additionally, the value of the exception indicator 1806 is written to the specified physical register. Thus, regardless of whether a consuming execution unit 114 receives an architectural register operand from the register files 105 or from a result/bypass bus, the consuming execution unit 114 and associated scheduler 121 receive the architectural register operand and the exception indicator 1806.

Each of the schedulers 121 and execution units 114 includes control logic 1901. A scheduler 121 waits to issue an instruction until an execution unit 114 of the appropriate type to execute the instruction is available. Additionally, if the instruction is a consuming instruction, the scheduler 121 waits to issue the instruction until all source operands upon which the instruction depends are available. More specifically, for each source operand of a waiting consuming instruction, the scheduler 121 compares the register number of the source operand with the produced register numbers to determine whether the needed source operand is being produced by any of the producing execution units 114. If the scheduler 121 detects a match, the control logic 1901 checks the exception indicator 1806. If the control logic 1901 sees that the exception indicator 1806 is true for any of the source architectural register result operands, then the control logic 1901 either prevents the issuance of the instruction for execution or cancels execution of the instruction if it is already issued, depending upon the location of the instruction when the control logic 1901 sees that the exception indicator 1806 is true.

In response to a true exception indicator 1806, the control logic 1901 may prevent the issuance of the consuming instruction for execution by clearing the valid bit of the entry in the scheduler 121 buffer allocated to the instruction, in which case the scheduler 121 will no longer be attempting to issue an instruction from the entry in the buffer of the scheduler 121 that was previously allocated to the consuming instruction. In one embodiment, the scheduler 121 itself may include multiple pipeline stages (e.g., issue stage and operand fetch stage), and the control logic 1901 may prevent the issuance of the consuming instruction by clearing its valid bit as it flows through the pipeline stages of the scheduler 121 during issuance, in which case the consuming instruction becomes an invalid instruction. In other words, it appears as if no instruction were issued that clock cycle to the execution unit 114 to which the consuming instruction was to be issued, and the now invalid instruction is prevented from consuming a produced architectural register result.

Furthermore, in response to a true exception indicator 1806, the control logic 1901 may cancel execution of the instruction if it is already issued by clearing the valid bit of the instruction as it is flowing down the execution unit 114 pipeline, in which case the consuming instruction becomes an invalid instruction. The control logic 1901 cancels the consuming instruction sufficiently early in the consuming execution unit 114 pipeline to prevent the consuming instruction from updating microarchitectural state of the processor 100 based on the architectural register result that was produced by the producing execution unit 114.

Additionally, for any subsequent instructions that are dependent upon the canceled consuming instruction, the control logic 1901 either prevents issuance of those subsequent instructions or cancels their execution if they are issued for execution. When the control logic 1901 of a consuming execution unit 114 receives an exception indicator 1806 with a true value, the control logic 1901 then generates a true value on its exception indicator 1806, which may be used to prevent issue or cancel execution of a subsequent dependent instruction. That is, the true exception indicator 1806 generated by the producing execution unit 114 that detected the need for an architectural exception is effectively propagated to subsequent consuming execution units 114. The issue prevention or execution cancellation of the subsequent dependent instructions advantageously prevents any subsequent dependent instructions, whether directly or indirectly dependent upon the dependent canceled consuming instruction, from updating microarchitectural state based on the architectural register result that was produced by the producing execution unit 114. For example, assume a sequence of instructions of an SCA that includes a first load instruction that loads data (a secret byte) into an architectural register, a shift instruction that shifts the load data that was loaded into the architectural register, and a second load instruction that uses the shifted load data in the architectural register as a source operand to compute its load address. The SCA has flushed the data cache 103 such that the second load instruction will result in a cache miss. Thus, the shift instruction is dependent upon and consumes the architectural register result of the first load instruction, and the second load instruction is dependent upon and consumes the architectural register result of the shift instruction. In this example, the shift instruction does not itself directly update microarchitectural state; however, the shift instruction effectively indirectly updates microarchitectural state by providing a shifted version of the secret byte to the second load instruction, which will update microarchitectural state, e.g., the data cache 103. Advantageously, canceling any subsequent instructions (the second load instruction in the example) that are dependent upon the canceled consuming instruction (the shift instruction in the example) prevents the subsequent dependent instructions (the second load instruction in the example) from updating microarchitectural state based on the architectural register result that was produced by the producing execution unit 114 (the secret byte load data produced by the LSU 117 in the example). Stated alternatively, there may be instructions that do not directly update microarchitectural state that are intermediate between the architectural exception-causing producing instruction and subsequent dependent microarchitectural state-modifying instructions, i.e., the microarchitectural state-modifying instructions may be dependent, albeit indirectly, upon the exception-causing producing instruction. By propagating the true exception indicator 1806 to subsequent consuming execution units 114, the indirectly dependent instructions are prevented from updating microarchitectural state.

In the case of a consuming branch instruction, the control logic 1901 cancels the branch instruction before it signals a branch misprediction. Consequently, branch predictors of the processor 100 (e.g., of the predict unit 102) are prevented from being updated based on the architectural register result that was produced by the producing execution unit 114 and redirection of instruction fetching (e.g., by the instruction fetch unit 106) is prevented based on the architectural register result that was produced by the producing execution unit 114, thereby thwarting an attacker from maliciously mis-training the branch predictors. The branch instruction may be a conditional branch instruction that would have consumed the architectural register result that was produced by the producing execution unit 114 as a branch condition, or the branch instruction may be an indirect branch instruction that would have consumed the architectural register result that was produced by the producing execution unit 114 as a branch target address.

In the case of a consuming load/store instruction, the control logic 1901 cancels the load/store instruction before it modifies the state of the data cache 103. Specifically, the control logic 1901 either inhibits the generation of a fill request if the load/store misses in the data cache 103 or cancels the fill request if already generated, as described above, thereby thwarting an attacker from using the data cache 103 to create a side channel. In the case of a consuming load/store instruction, the control logic 1901 also cancels the load/store instruction before it causes an update of the MDP 111, thereby thwarting an attacker from mis-training the MDP 111.

Because the dependent instruction is canceled, in many instances no valid result is output on the result bus by the execution unit 114 that, during execution of the dependent instruction, would have consumed the architectural register result produced by the producing execution unit 114. Hence, instructions that were dependent upon the architectural register result of the consuming, i.e., dependent, instruction may be prevented from issuing, thereby mitigating side channel attacks that might have been accomplished through an instruction that was dependent upon the architectural register result of the consuming instruction.

Figure 20:
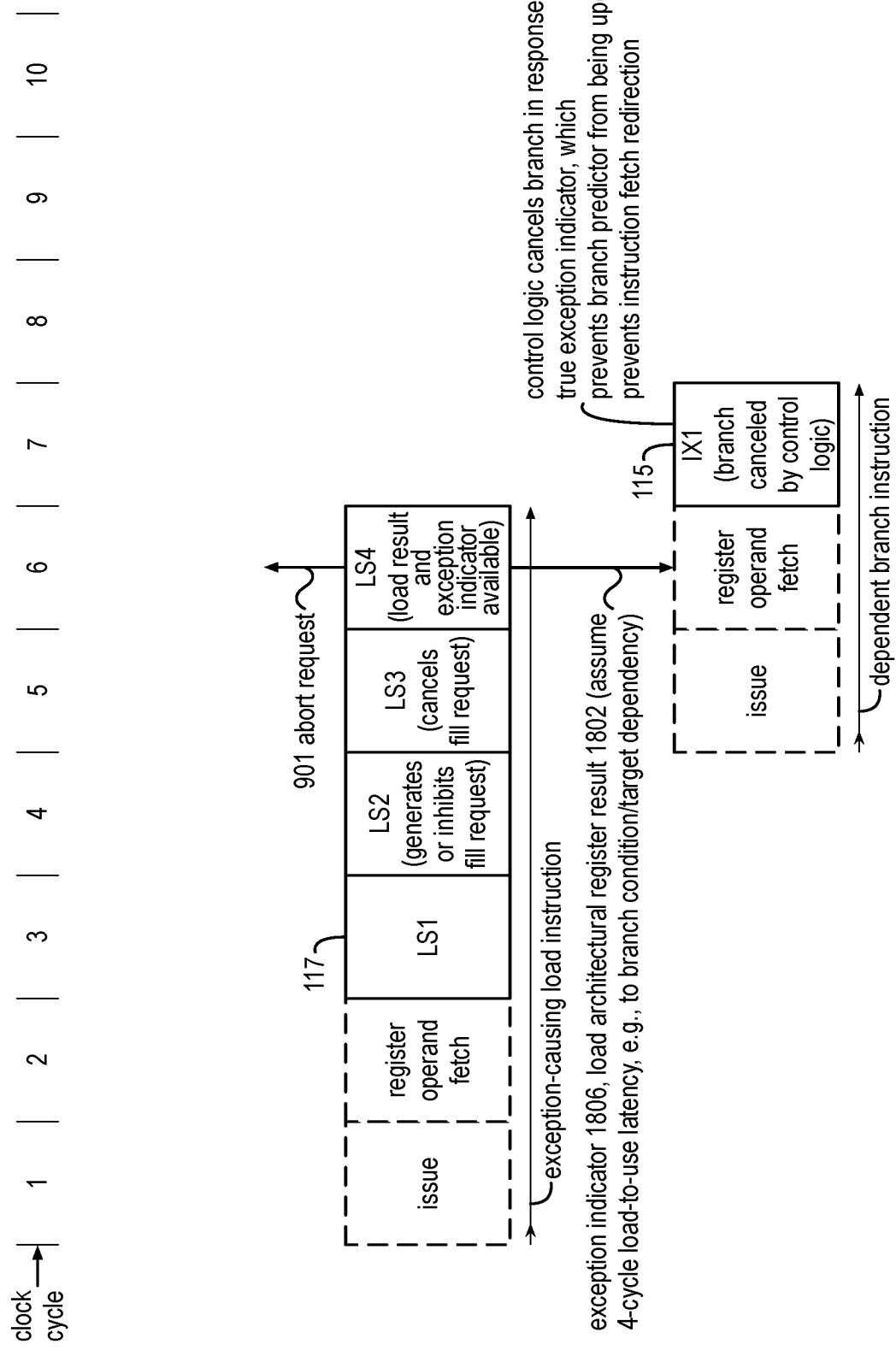
FIGS. 20 and 21 are example pipeline diagrams illustrating operation of the processor core of FIG. 1 to mitigate side channel attacks according to an embodiment of the present disclosure.

FIG. 20 is a pipeline diagram illustrating operation of the processor core 100 of FIG. 1 to mitigate side channel attacks according to an embodiment of the present disclosure. The pipeline diagram of FIG. 20 is similar in many respects to that of FIG. 15. However, rather than a dependent load/store instruction as in FIG. 15, FIG. 20 illustrates a dependent branch instruction being executed by an IXU 115 of FIG. 1. The dependent branch instruction is dependent upon an exception-causing load instruction. The speculatively executed consuming dependent branch instruction may be part of an SCA that attempts to mis-train a branch predictor based on the architectural register result produced by the load instruction and/or cause the path of speculative execution of the processor 100 to be redirected in a manner that may be exploited by the attacker.

Because of the assumed 4-cycle load-to-use latency of the embodiment, the dependent branch instruction is issued in clock cycle 5, e.g., in response to provision of the register number associated with the ARR 1802 generated by the LSU 117. LS4 provides its load architectural register result 1802 in clock cycle 6, and the dependent branch instruction performs its operand fetch of the result of the exception-causing load instruction in clock cycle 6. As in FIG. 15, the exception-causing load instruction generates an abort request 901 from LS4 in clock cycle 6 according to the embodiment of FIG. 20. The prioritization and location logic 1102 and flush logic 1104 are not shown in FIG. 20, although they are present and receive the abort request 901 and, in response, perform an abort process that includes a selective flush which may be a flash flush, hybrid flush or series of single flushes, as described above.

Additionally, LS4 provides the exception indicator 1806 in clock cycle 6, which is true in the example of FIG. 20. In response to the true exception indicator 1806, the control logic 1901 prevents issue of or cancels the dependent branch instruction. In one embodiment, the control logic 1901 prevents issue of the dependent branch instruction by clearing its valid bit in clock cycle 6. In one embodiment, the dependent branch instruction is canceled in clock cycle 7, i.e., by IX1 (first stage of the IXU 115), e.g., by clearing its valid bit. The canceling of the dependent branch instruction prevents further execution of the dependent branch instruction, which prevents the IXU 115 from signaling a branch misprediction, which prevents instruction fetch redirection by the front-end 110. Additionally, canceling of the dependent branch instruction prevents any branch predictors from being updated. Thus, advantageously, the dependent branch instruction is prevented from consuming the architectural register result 1802 produced by the load instruction, either as a branch target address in the case of an indirect branch instruction or as a condition in the case of a conditional branch instruction.

Although FIG. 20 illustrates the prevention of a single dependent instruction (e.g., the dependent branch instruction) from consuming the architectural register result produced by a producing instruction (e.g., the load instruction), other instructions dependent upon the exception-causing load instruction executed by other consuming execution units may be prevented from consuming the architectural register result in a similar manner concurrently and/or in a subsequent clock cycle, e.g., through reception by a consuming execution unit of the architectural exception indicator 1806 via the register file 105 as described above. Furthermore, some dependent instructions may still be in the scheduler 121 waiting to be issued and may be flushed by the abort process before they are issued. Thus, by operation of the combination of the abort process and the prevention of architectural register result consumption by dependent instructions through use of the architectural exception indicator 1806, all instructions dependent upon the producing instruction are prevented from consuming the architectural register result. This is also true for the embodiment illustrated in FIG. 21.

Although the embodiments of FIGS. 20 through 24 are described with various parameters, e.g., the propagation delay through the control logic 1901 from receipt of the true exception indicator 1806 to canceling of the dependent branch instruction, the load-to-use latency, the LSU 117 pipeline stages in which the various actions are performed, the flush type (e.g., flash, hybrid, sequence of single flush), etc., in other embodiments the parameters may be different. As described, regardless of the values of the parameters, embodiments ensure that a dependent instruction will not consume the architectural register result produced by the exception-causing load instruction.

Figure 21:
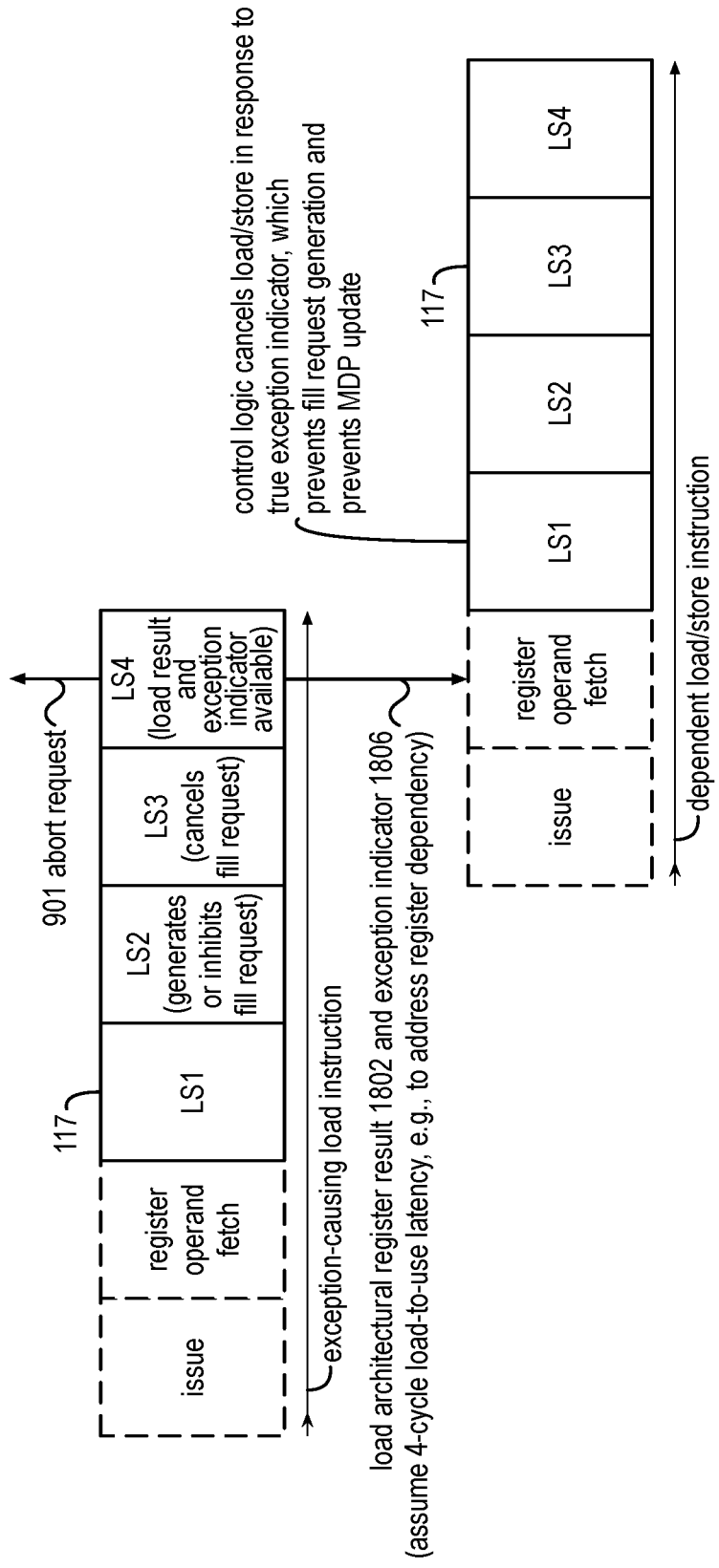

FIG. 21 is a pipeline diagram illustrating operation of the processor core 100 of FIG. 1 to mitigate side channel attacks according to an embodiment of the present disclosure. The pipeline diagram of FIG. 20 is similar in many respects to that of FIG. 20. However, rather than a dependent branch instruction being executed by an IXU 115 as in FIG. 20, a dependent load/store instruction is executed by an LSU 117 in FIG. 21. The speculatively executed consuming dependent load/store instruction may be part of an SCA that attempts to encode within the data cache 103 a secret byte value based on the architectural register result produced by the first load instruction or in some manner create a side channel that would enable the attacker to obtain the value of the secret byte.

As in FIG. 20, a 4-cycle load-to-use latency is assumed in the embodiment, and the dependent load/store instruction is issued in clock cycle 5, e.g., in response to provision of the register number associated with the ARR 1802 generated by the LSU 117. LS4 provides its load architectural register result 1802 in clock cycle 6, and the dependent load/store instruction performs its operand fetch of the result of the exception-causing load instruction in clock cycle 6. As in FIG. 20, the exception-causing load instruction generates an abort request 901 from LS4 in clock cycle 6 according to the embodiment of FIG. 21. The prioritization and location logic 1102 and flush logic 1104 are also not shown in FIG. 21, although they are present and receive the abort request 901 and, in response, perform an abort process that includes a selective flush which may be a flash flush, hybrid flush or series of single flushes, as described above.

Additionally, LS4 provides the exception indicator 1806 in clock cycle 6, which is true in the example of FIG. 21. In response to the true exception indicator 1806, the control logic 1901 prevents issue of or cancels the dependent load/store instruction. In one embodiment, the control logic 1901 prevents issue of the dependent load/store instruction by clearing its valid bit in clock cycle 6. In one embodiment, the dependent load/store instruction is canceled in clock cycle 7, i.e., by LS1 by clearing its valid bit. The canceling of the dependent load/store instruction prevents further execution of the dependent load/store instruction, which prevents the LSU 117 from generating a fill request and prevents update of the MDP 111. Thus, advantageously, the dependent load/store instruction is prevented from consuming the architectural register result 1802 produced by the load instruction, e.g., as a memory address calculation operand that may be used to update state of the data cache 103 and/or the MDP 111, which may thwart an SCA from updating the state of the data cache 103 and/or from mistraining the MDP 111.

Although the pipeline diagrams of FIGS. 20, 21, 23 and 24 describe examples in which the producing instruction is a load instruction, in other embodiments the producing instruction may be other types of instructions that produce an architectural register result, such as an arithmetic instruction (e.g., integer or floating-point), which may be advantageous for thwarting an SCA.

Figure 22:
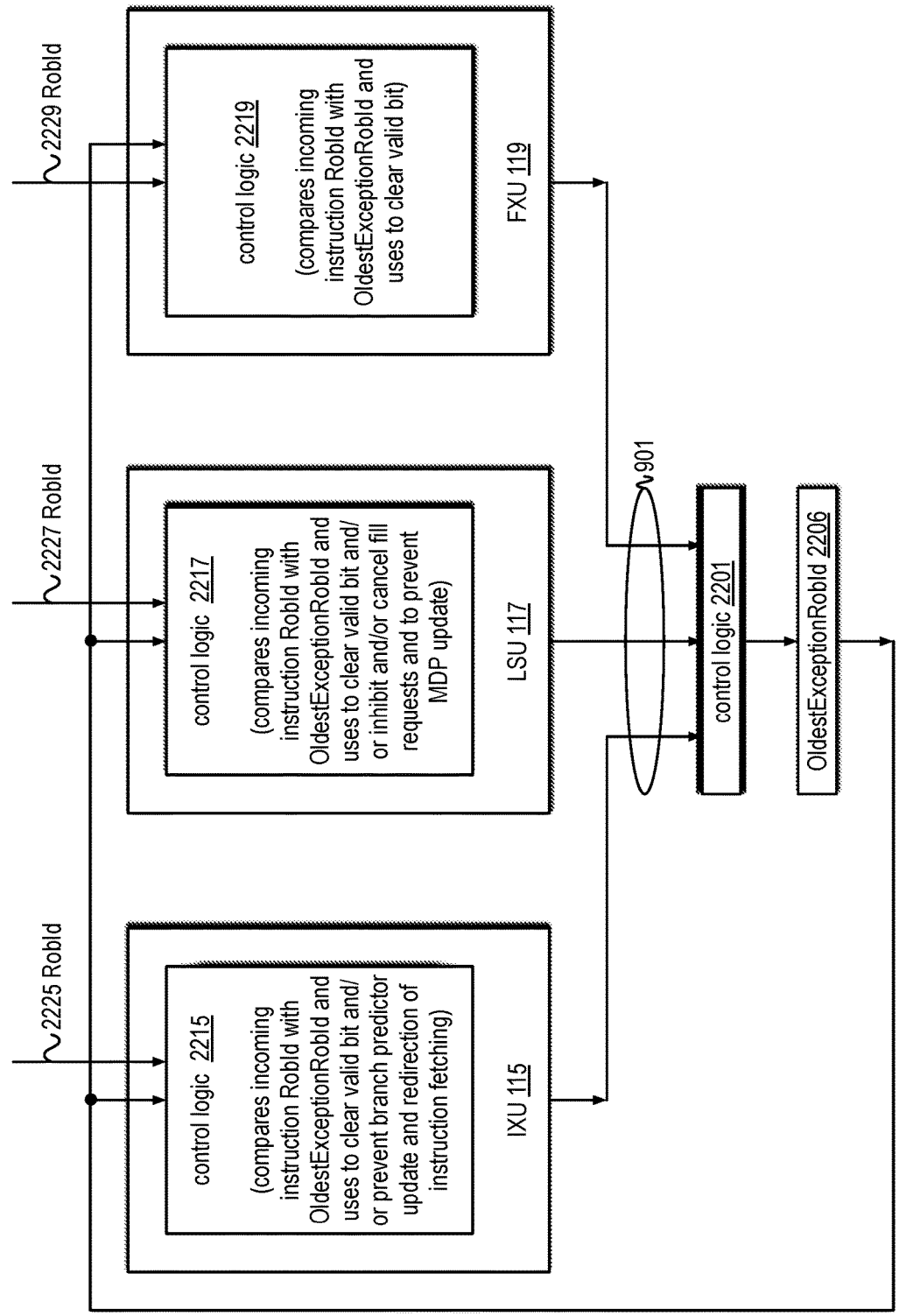
FIG. 22 is an example block diagram of portions of the processor of FIG. 1.

FIG. 22 is an example block diagram of portions of the processor 100 of FIG. 1. The processor 100 includes control logic 2201, an OldestExceptionRobID register 2206, and execution units 114 of FIG. 1, shown in FIG. 22 as the IXU 115, LSU 117, and FXU 119. Each of the IXU 115, LSU 117, and FXU 119 includes respective control logic 2215, 2217 and 2219. Each of the IXU 115, LSU 117, and FXU 119 receives a RobId 2225, 2227, 2229 received by respective control logic 2215, 2217 and 2219 that specifies the entry of the ROB 122 associated with the instruction issued to the respective execution unit for execution. Each of the IXU 115, LSU 117, and FXU 119 generate an abort request 901 (e.g., as described above with respect to FIG. 9) in response to detecting that an instruction it is executing generates a need for an architectural abort. The abort requests 901 are received by control logic 2201. The control logic 2201 updates the OldestExceptionRobID register 2206 with the ROB ID 902 of the abort request 901 associated with the instruction that is oldest in program order. The OldestExceptionRobID register 2206 is fed back as an input to each of the control logic 2215, 2217 and 2219. In one embodiment, the OldestExceptionRobId register 2206 includes an associated valid bit (e.g., similar to valid bit 204 of FIG. 2) that indicates whether the value in the OldestExceptionRobId register 2206 is valid.

When each of the IXU 115, LSU 117, and FXU 119 is issued a valid instruction, its respective control logic 2215, 2217, 2219 compares the respective RobID 2225, 2227, 2229 with the OldestExceptionRobID register 2206 to determine whether the instruction currently being executed is younger than the instruction indicated in the OldestExceptionRobID register 2206. If the current instruction is younger, the control logic 2215, 2217, 2219 cancels the instruction, e.g., by clearing its valid bit. Any instruction that is directly or indirectly dependent upon the instruction indicated by the OldestExceptionRobID register 2206 as younger than the instruction indicated by the OldestExceptionRobID register 2206 will be issued at least the resultto-use latency after issuance of the instruction indicated by the OldestExceptionRobID register 2206, which gives the control logic 2201, 2215, 2217 and 2219 the time needed to detect the need for an exception, set the OldestExceptionRobID register 2206 value, and use it to cancel the dependent instruction. Thus, by canceling any younger instruction that gets issued to an execution unit at least the result-to-use latency after issuance of the instruction indicated by the OldestExceptionRobID register 2206, the control logic 2215, 2217, 2219 cancels all instructions that are directly or indirectly dependent upon the instruction indicated by the OldestExceptionRobID register 2206 and prevents all such dependent instructions from directly or indirectly consuming the architectural register result produced by the instruction indicated by the OldestExceptionRobID register 2206. It should be understood that some instructions dependent upon the instruction indicated by the OldestExceptionRobID register 2206 may be flushed by the abort process as described above before they can be issued for execution, e.g., while still in the front-end 110, mid-end 120 or the scheduler 121, and may therefore not be issued and not need to be canceled during execution.

In the case of a younger branch instruction (e.g., issued to the IXU 115), the control logic 2215 cancels the branch instruction before it signals a branch misprediction. Consequently, branch predictors of the processor 100 (e.g., of the predict unit 102) are prevented from being updated based on the architectural register result that was produced by the producing execution unit 114 that executed the instruction indicated by the OldestExceptionRobID register 2206 and redirection of instruction fetching (e.g., by the instruction fetch unit 106) is prevented based on the architectural register result that was produced by the producing execution unit 114, thereby thwarting an attacker from maliciously mis-training the branch predictors. The branch instruction may be a conditional branch instruction that would have consumed the architectural register result that was produced by the producing execution unit 114 as a branch condition, or the branch instruction may be an indirect branch instruction that would have consumed the architectural register result that was produced by the producing execution unit 114 as a branch target address.

In the case of a younger load/store instruction (e.g., issued to the LSU 117), the control logic 2217 cancels the load/store instruction before it modifies the state of the data cache 103. Specifically, the control logic 2217 either inhibits the generation of a fill request if the load/store misses in the data cache 103 or cancels the fill request if already generated, as described above, thereby thwarting an attacker from using the data cache 103 to create a side channel. In the case of a consuming load/store instruction, the control logic 2217 also cancels the load/store instruction before it causes an update of the MDP 111, thereby thwarting an attacker from mis-training the MDP 111.

Figure 23:
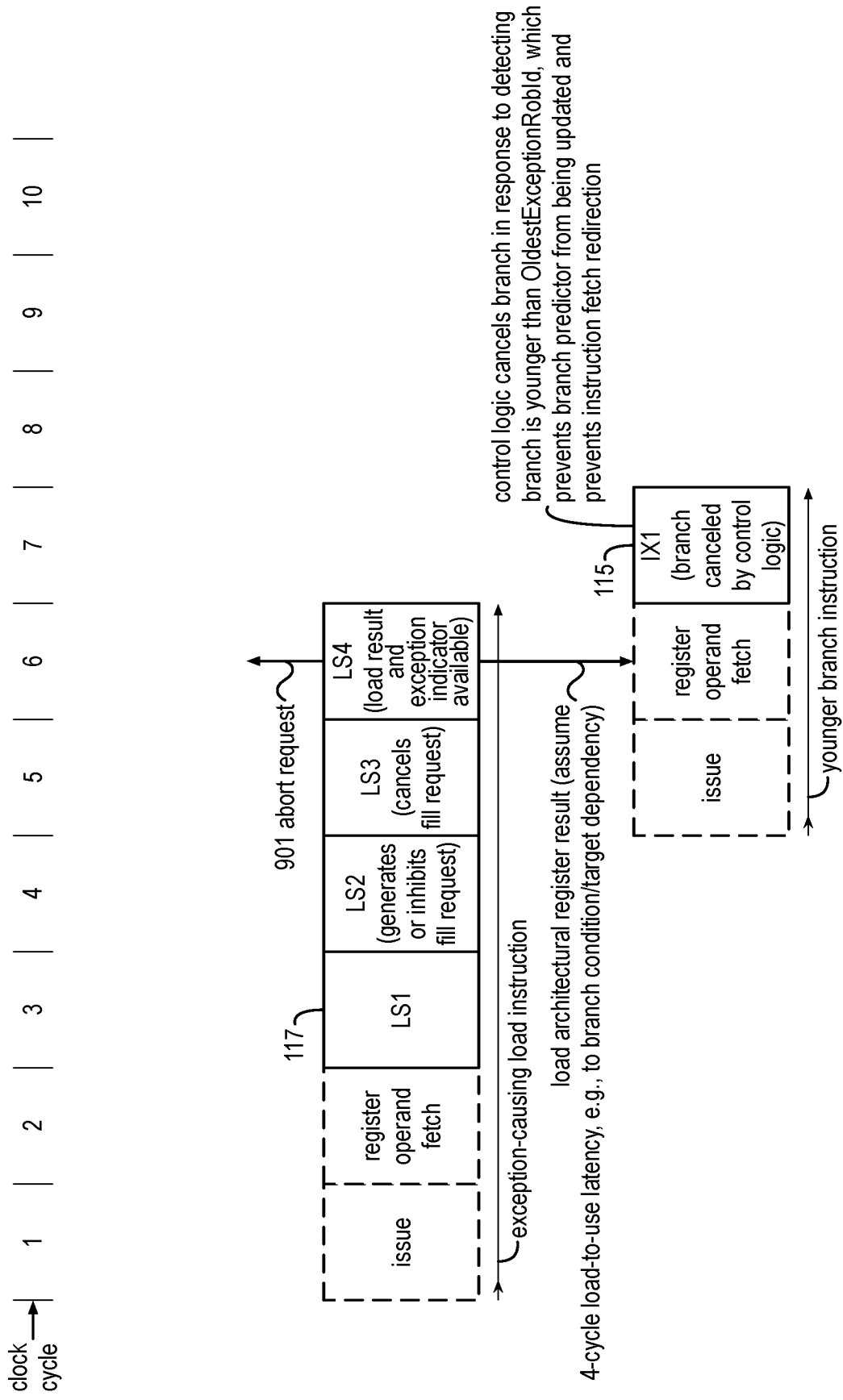
FIGS. 23 and 24 are example pipeline diagrams illustrating operation of the processor core of FIG. 1 to mitigate side channel attacks according to an embodiment of the present disclosure.

FIG. 23 is a pipeline diagram illustrating operation of the processor core 100 of FIG. 1 to mitigate side channel attacks according to an embodiment of the present disclosure. The pipeline diagram of FIG. 23 is similar in many respects to that of FIG. 21. However, in response to detecting that the branch instruction being executed by the IXU 115 is younger than the instruction indicated in the OldestExceptionRobID register 2206, the control logic 2215 cancels the younger branch instruction, e.g., by clearing its valid bit in clock cycle 7. The canceling of the younger branch instruction prevents further execution of the younger branch instruction, which may be dependent upon the instruction indicated in the OldestExceptionRobID register 2206, which prevents the IXU 115 from signaling a branch misprediction, which prevents instruction fetch redirection by the front-end 110. Additionally, canceling of the younger and potentially dependent branch instruction prevents any branch predictors from being updated. Thus, advantageously, the younger and potentially dependent branch instruction is prevented from consuming the architectural register result produced by the load instruction, either as a branch target address in the case of an indirect branch instruction or as a condition in the case of a conditional branch instruction.

Although FIG. 23 illustrates the prevention of a single dependent instruction (e.g., the dependent branch instruction) from consuming the architectural register result produced by a producing instruction (e.g., the load instruction), other instructions dependent upon the exception-causing load instruction executed by other consuming execution units may be prevented from consuming the architectural register result in a similar manner concurrently and/or in a subsequent clock cycle, e.g., by consuming execution units using comparison of the OldestExceptionRobID register 2206 with the ROB identifier of the other dependent instructions. Furthermore, some dependent instructions may still be in the scheduler 121 waiting to be issued and may be flushed by the abort process before they are issued. Thus, by operation of the combination of the abort process and the prevention of architectural register result consumption by dependent instructions through use of the OldestExceptionRobID register 2206 comparisons, all instructions dependent upon the producing instruction are prevented from consuming the architectural register result. This is also true for the embodiment illustrated in FIG. 24.

Figure 24:
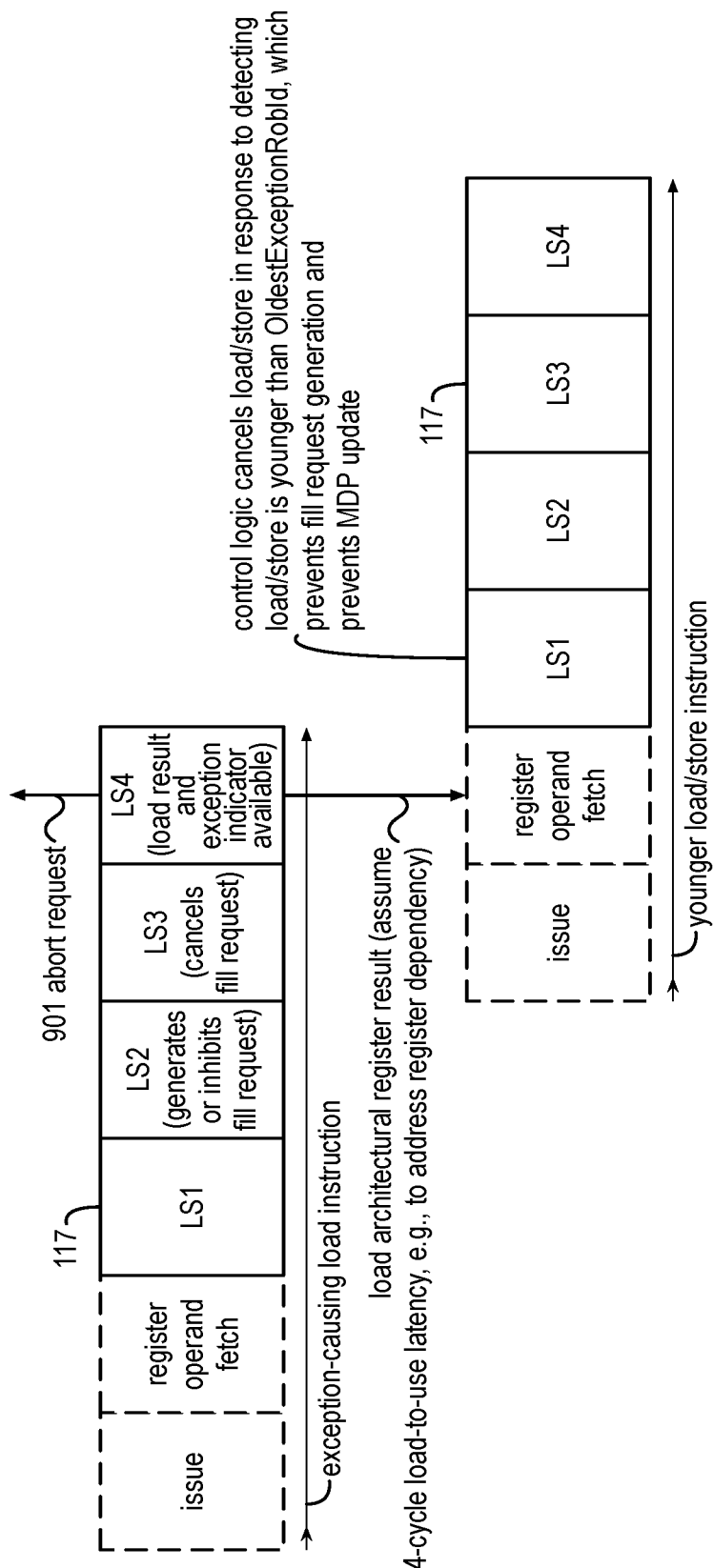

FIG. 24 is a pipeline diagram illustrating operation of the processor core 100 of FIG. 1 to mitigate side channel attacks according to an embodiment of the present disclosure. The pipeline diagram of FIG. 24 is similar in many respects to that of FIG. 21. However, in response to detecting that the branch instruction being executed by the LSU 117 is younger than the instruction indicated in the OldestExceptionRobID register 2206, the control logic 2217 cancels the younger load/store instruction, e.g., by clearing its valid bit in clock cycle 7. The canceling of the younger load/store instruction prevents further execution of the younger load/store instruction, which may be dependent upon the instruction indicated in the OldestExceptionRobID register 2206, which prevents the LSU 117 from generating a fill request and prevents update of the MDP 111. Thus, advantageously, the younger and potentially dependent load/store instruction is prevented from consuming the architectural register result produced by the load instruction, e.g., as a memory address calculation operand that may be used to update state of the data cache 103 and/or the MDP 111, which may thwart an SCA from updating the state of the data cache 103 and/or from mis-training the MDP 111. Embodiments are also contemplated in which a processor 100 may employ both the exception indicator mechanism and the OldestExceptionRobID register comparison mechanism to prevent all instructions dependent upon the producing instruction from consuming its architectural register result.

Figure 25:
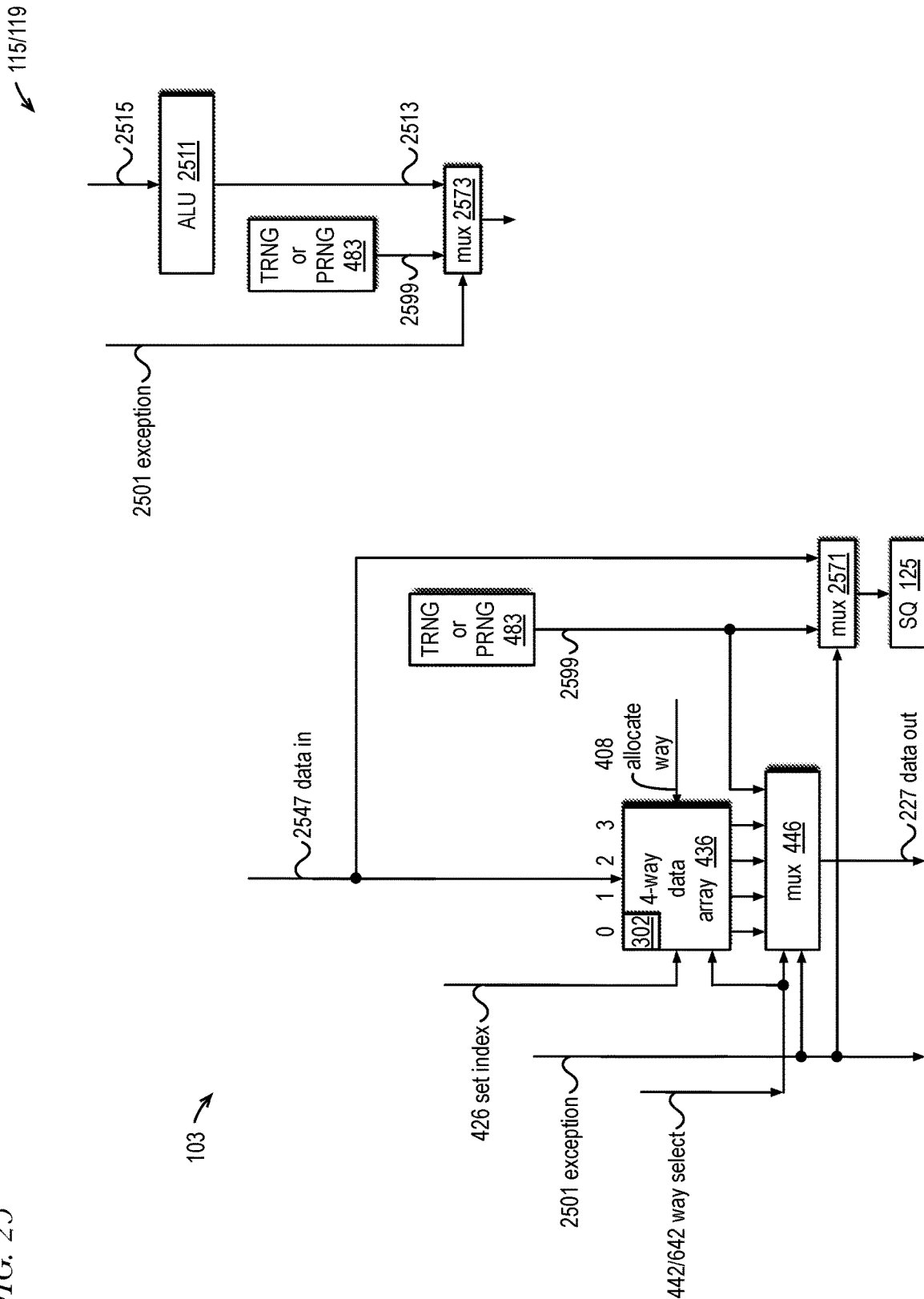
FIG. 25 is an example block diagram illustrating an embodiment of a portion of a data cache in accordance with embodiments of the present disclosure.

FIG. 25 is example block diagrams illustrating a portion of the data cache 103 (e.g., of FIG. 2, 4, 6 or 13) and a portion of the IXU 115 and FXU 119 of FIG. 1 in accordance with embodiments of the present disclosure. The portion of the IXU 115 and FXU 119 is shown on the right-hand side, and the portion of the data cache 103 is shown on the left-hand side and will be described first.

The embodiment of FIG. 25 further includes a true random number generator (TRNG) or pseudo-random number generator (PRNG) 483, referred to generally as the RNG 483, that generates random number 2599. The embodiment of FIG. 25 also includes a mux 2571 and the store queue (SQ) 125 of FIG. 1. The mux 2571 receives the random number 2599 and data in 2547, which is also provided to the data array 436. An exception signal 2501 is true if the instruction being executed by the LSU 117 generates a need for an architectural exception. The exception signal 2501 serves as a control input to the mux 446 along with a way select signal (e.g., 442 of FIG. 4 or 642 of FIG. 6), and the exception signal 2501 serves as a control input to the mux 2571. The random numbers 2599 generated by the RNG 483 are provided as a fifth input to the mux 446 along with the four outputs corresponding to the four ways of the data array 436.

In one embodiment, the random numbers 2599 generated by the RNG 382 are 64-bit data. In embodiments in which the RNG 483 is a TRNG, the TRNG 483 generates true random numbers, i.e., numbers that are produced by a physical process. Examples of a physical process used to generate true random numbers include avalanche noise or breakdown noise generated from a diode, thermal noise from a resistor, and arrangements of free running oscillators whose randomness may be attributable to variations in temperature, material (e.g., semiconductor) characteristics, and electrical conditions local to the integrated circuit. In embodiments in which the RNG 483 is a PRNG, the PRNG 483 generates pseudo-random numbers, i.e., numbers that are produced algorithmically. Various embodiments of the RNG 483 are described with respect to FIGS. 13 through 17 of U.S. patent application Ser. No. 17/064,540 ("the '540 Application"), filed Oct. 6, 2020, which is hereby incorporated by reference in its entirety for all purposes. As described therein and herein, the provision of random load data during execution of a load operation under certain conditions may be helpful in mitigating side channel attacks, such as Meltdown and inverse-Meltdown style SCAs.

In the case of a read operation (e.g., load instruction), the mux 446 receives the cache line data 302 of all four ways and selects one of the ways based on the way select signal 442, and the cache line data 302 selected by the mux 446 is provided on the data out output 227, unless the mux 446 is controlled to select the random data 2599 from the RNG 483 because the exception signal 2501 is true. That is, the load data specified from the cache line data 302 selected by the mux 446 in the absence of a true exception signal 2501 is the architectural register result that would be produced by the load instruction if not for the addition of the RNG 483 and control of the mux 446 by the exception signal 2501. Thus, in the case of a load operation that causes a need for an architectural exception, the LSU 117 outputs random data 2599 generated by the RNG 483 to its result bus rather than the architectural register result that would otherwise be output on the result bus of the LSU 117. Additionally, the random data is written to the destination register of the register file 105; consequently, subsequently issued dependent instructions may receive the random data from the register file 105 rather than from the result/bypass bus. Outputting random data on the result bus rather than the architectural register result that would otherwise be produced by the producing load instruction (or reception of the random data from the register file 105), prevents all instructions dependent upon the producing load instruction from consuming the architectural register result that would otherwise be produced, which may be a secret byte. That is, the secret byte would have been produced by the execution of the load instruction by the LSU 117 absent the random data mechanism even though the speculatively executed load instruction may not have had permission, for example, to read the secret byte. The outputting of the random data on the result bus rather than the architectural register result that would otherwise be produced may be helpful in mitigating side channel attacks that would otherwise encode the secret byte in the data cache 103, for example, as described above.

Additionally, the multiplexer 2571 receives the random data 2599 from the RNG 2599 and the data in 2547. The multiplexer 2571 is controlled by the exception signal 2501. If the exception signal 2501 is true, then the multiplexer 2571 selects the random data 2599 for provision to the store queue 125, otherwise the multiplexer 2571 selects the data in 2547 for provision to the store queue 125. In the case of a store operation that causes a need for an architectural exception, the LSU 117 writes random data 2599 generated by the RNG 483 to the entry in the store queue 125 allocated for the store operation, which may be helpful in mitigating side channel attacks that attempt to capitalize on speculative store-to-load forwarding.

As described above, in one embodiment the way select 442 may be signaled by an earlier stage in the data cache memory 103 pipeline than an embodiment that relies on a comparison of the tags 304 of the tag array 432 to generate a way select. This may be advantageous because it may shorten the time to data out 227 and may enable the hashed tag array 434 of FIG. 4 to provide translation information (not shown) sooner to enable detection of a need for generation of an architectural exception and provision of random data 2599 as data out 227 via mux 446.

On the right-hand side of FIG. 25, the portion of the IXU 115 and FXU 119 includes an ALU 2511, a RNG 483, and a mux 2573. The RNG 483 may be similar to the RNG 483 described with respect to the portion of the data cache 103 described above. The ALU 2511 performs an operation specified by the producing instruction being executed by IXU/FXU 115/119 to generate an architectural register result 2513. The producing instruction may specify architectural register operands 2515 upon which the ALU 2511 performs the operation. The operation may be an arithmetic, logical, or non-arithmetic/logical operation. The mux 2573 receives the architectural register result 2513 from the ALU 2511 and the random data 2599 from the RNG 483 and outputs on the IXU/FXU 115/119 result bus the architectural register result 2513 if the exception indicator 1806 is false and the random data 2599 if the exception indicator 1806 is true. That is, the architectural register result 2513 generated by the ALU 2511 and selected by the mux 2573 in the absence of a true exception signal 2501 is the architectural register result that would be produced by the producing instruction if not for the addition of the RNG 483 and control of the mux 2573 by the exception signal 2501. Thus, in the case of a producing instruction that causes a need for an architectural exception, the IXU/FXU 115/119 outputs random data 2599 generated by the RNG 483 to its result bus rather than the architectural register result that would otherwise be output on its result bus. Additionally, the random data is written to the destination register of the register file 105; consequently, subsequently issued dependent instructions may receive the random data from the register file 105 rather than from the result/bypass bus. Outputting random data on the result bus rather than the architectural register result that would otherwise be produced by the producing instruction and reception of the random data from the register file 105 prevents all instructions dependent upon the producing instruction from consuming the architectural register result that would otherwise be produced.

For example, assume the instruction set of processor 100 includes an instruction that is defined to generate an ALU result based on its source operands or to produce an exception based upon an input condition, e.g., a status flag or a separate register operand. Assume the instruction is executed by the IXU 115 or FXU 119. If the input condition is true, as indicated by a true value on the exception indicator 2501, then the mux 2573 selects the random data 2599 rather than the ALU result 2513 for output onto the result bus of the IXU 115 or FXU 119. This prevents all instructions dependent upon the instruction from consuming the architectural register result that would otherwise be produced by the instruction, which may mitigate an SCA in the case that the ALU result 2513 was a secret value or was a function of a secret value, i.e., if one of the source operands was a secret value.

Figure 26:
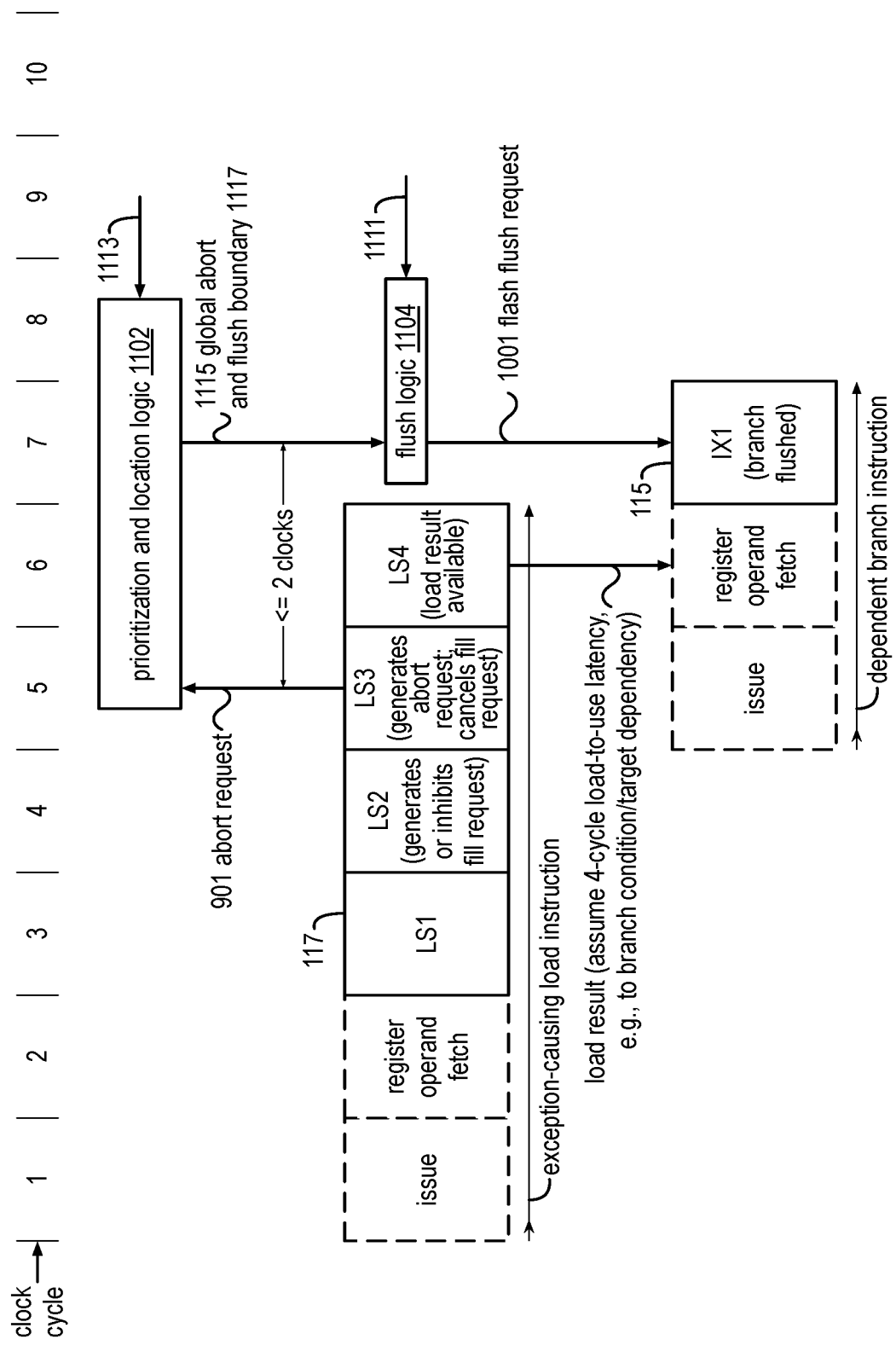
FIGS. 26 and 27 are example pipeline diagrams illustrating operation of the processor core of FIG. 1 to mitigate side channel attacks according to an embodiment of the present disclosure.

FIG. 26 is a pipeline diagram illustrating operation of the processor core 100 of FIG. 1 to mitigate side channel attacks according to an embodiment of the present disclosure. FIG. 26 describes an example embodiment in which the abort and exception handling logic 134 and flush logic 1104 generate a flash flush sufficiently soon after receiving an abort request from a producing execution unit so as to prevent all instructions dependent upon the instruction causing a need for an architectural exception from consuming the architectural register result produced by the exception-causing instruction. The maximum number of clock cycles from reception of the abort request to generation of the flush request (e.g., the propagation delay time of the abort and exception handling logic 134 and the flush logic 1104) is determined by the sum of two factors. The first factor is the number of clock cycles from the stage of the producing execution unit that generates the abort request to the stage that outputs the architectural register result, and the second factor is the number of clock cycles from when the dependent instruction fetches or bypasses the architectural register result to the point in the execution of the dependent/consuming instruction that would cause an update of microarchitectural state of the processor 100.

The pipeline diagram of FIG. 26 is similar in many respects to that of FIG. 15. However, rather than a dependent load/store instruction as in FIG. 15, FIG. 26 illustrates a dependent branch instruction being executed by an IXU 115 of FIG. 1. The dependent branch instruction is dependent upon an exception-causing load instruction as in FIG. 15. As in the example of FIG. 20, the execution of the dependent branch instruction requires one clock cycle and is performed in the IX1 stage. That is, microarchitectural state of the processor 100 (e.g., branch predictor state or a microarchitectural program counter) may be updated by the execution of the dependent branch instruction. Hence, the example of FIG. 26 illustrates that in a processor 100 that includes a producing execution unit that executes a producing instruction in one clock cycle, the smallest value for the second factor described above is one clock cycle, i.e., the second factor that determines the maximum number of clock cycles from reception of the abort request to generation of the flash flush request in order to prevent all instructions dependent upon the instruction causing a need for an architectural exception from consuming the architectural register result produced by the exception-causing instruction.

In addition to the execution time of a dependent instruction, the other factor (the first factor mentioned above) that determines the maximum number of clock cycles from reception of an abort request to generation of the flash flush request is the number of clock cycles from the stage of the producing execution unit that generates the abort request to the stage that outputs the architectural register result. In the example of FIG. 26, the number of clock cycles associated with the first factor is one. That is, as shown, the abort request is generated in LS3 (as in FIG. 17) and the load result is made available in LS4. Hence, in the example embodiment of FIG. 26 as shown, the propagation delay time of the abort and exception handling logic 134 and flush logic 1104 is less than or equal to two clock cycles, i.e., the time from reception of the abort request 901 (caused by the exception-causing load instruction) by the abort and exception handling logic 134 in clock cycle 6 to reception of the initial flush request 1001 of the abort process by the IXU 115 in clock cycle 8, as shown. Although not shown in FIG. 26, as shown in FIG. 11, the flash flush request 1001 is provided to all execution units 114 such that all younger instructions, and hence all dependent instructions, are flushed in clock cycle 8 thereby preventing microarchitectural state from being updated for all execution units 114, since the IXU 115 represents the minimum value of the second factor, i.e., none of the other producing execution units 114 has an execution time less than one clock cycle.

Figure 27:
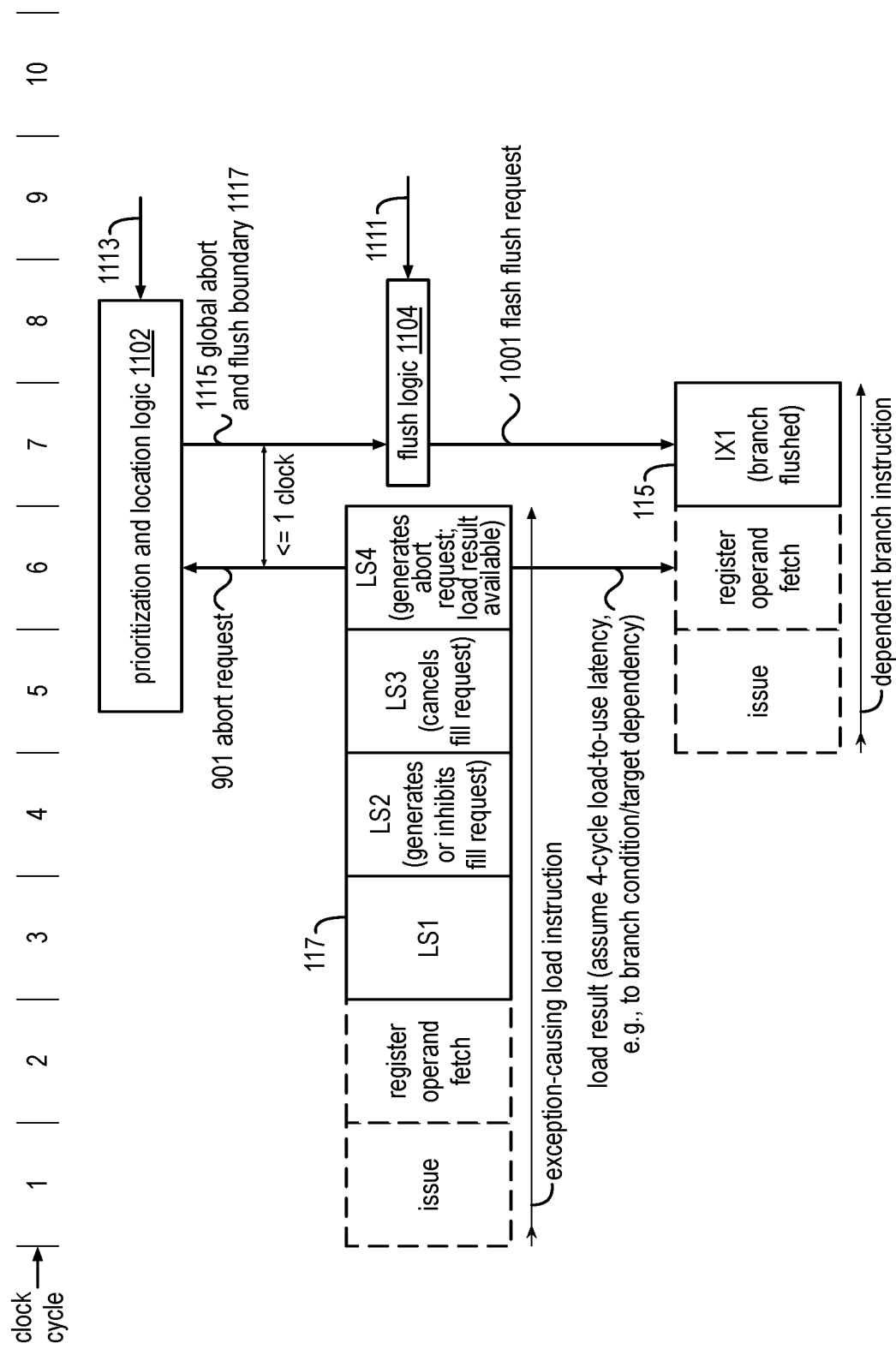

FIG. 27 is a pipeline diagram illustrating operation of the processor core 100 of FIG. 1 to mitigate side channel attacks according to an embodiment of the present disclosure. FIG. 27 is similar to FIG. 26 in many respects, however in the example embodiment of FIG. 27, the value of the first factor that determines the maximum number of clock cycles from reception of the abort request to generation of the flush request is zero clock cycles. That is, the architectural register result is produced in the same stage of the producing execution unit as the stage that generates the abort request. In the example of FIG. 27, the load result is available and the abort request 901 is generated in LS4 during clock 6. Thus, the maximum number of clock cycles from reception of the abort request to generation of the flush request is one clock cycle. As shown in FIG. 27, the propagation delay time of the abort and exception handling logic 134 and flush logic 1104 is less than or equal to one clock cycle. Therefore, advantageously, the embodiment generates the flash flush request 1001 sufficiently soon after receiving the abort request 901 from the producing execution unit (e.g., the LSU 117) to prevent all instructions dependent upon the instruction causing a need for an architectural exception (e.g., the load instruction) from consuming the architectural register result (e.g., load data) produced by the exception-causing instruction.

As disclosed herein, to prevent an instruction within the superscalar out-of-order speculative execution back end that is dependent on a producing instruction from consuming the produced architectural register result means to prevent the dependent instruction from being issued to an execution unit for execution, or to prevent the dependent instruction that has been issued for execution from updating microarchitectural state based on the produced architectural register result, or to allow the dependent instruction to execute and update microarchitectural state based on random data output by the producing execution unit and consumed by the dependent instruction rather than based on the architectural register result generated by the producing execution unit (e.g., load data from data cache). Preventing the dependent instruction from updating microarchitectural state based on the produced architectural register result may include preventing the indirect updating of microarchitectural state based on the produced architectural register result by one or more subsequent instructions that are directly or indirectly dependent upon the dependent instruction. In the case of a consuming instruction that is a branch instruction, microarchitectural state means at least state in a branch predictor or state of a microarchitectural program counter. In the case of a consuming instruction that is a load/store instruction, microarchitectural state means at least state of a data cache.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A microprocessor that mitigates side channel attacks, comprising:
a front end that processes instructions in program order;
a back end that is configured to perform speculative execution of instructions out of program order in a superscalar fashion, wherein the back end comprises a plurality of execution units comprising:
one or more producing execution units configured to produce architectural register results during execution of instructions; and
one or more consuming execution units configured to consume the produced architectural register results during execution of instructions, wherein the producing and consuming execution units are same execution unit or different execution units; and
control logic configured to:
make a detection that, during execution by a producing execution unit, an architectural register result producing instruction causes a need for an architectural exception and consequent flush of all instructions younger in program order than the producing instruction; and
in response to the detection, prevent all load/store instructions within the back end that are dependent upon the producing instruction from updating a data cache of the microprocessor based on the architectural register result produced by the producing instruction by
preventing issuance of the dependent load/store instructions to a
consuming execution unit for execution or by canceling execution of the dependent load/store instructions before the dependent load/store instructions update the data cache.

2. The microprocessor of claim 1,
wherein the control logic is configured to maintain a program order identifier of an oldest in program order instruction causing a need for an architectural exception; and
wherein the control logic is configured to perform a comparison of a program order identifier of instructions issued to the consuming execution units with the program order identifier of the oldest in program order instruction causing a need for an architectural exception and to use the comparisons to prevent all the load/store instructions within the back end that are dependent upon the producing instruction from updating the data cache based on the architectural register result produced by the producing instruction.

3. The microprocessor of claim 1,
wherein each of the producing execution units is configured to provide, along with the architectural register result, an indicator of whether the producing instruction caused a need for an architectural exception; and
wherein the control logic is configured to use the indicator to prevent all the load/store instructions within the back end that are dependent upon the producing instruction from updating the data cache based on the architectural register result produced by the producing instruction.

4. The microprocessor of claim 1,
wherein the control logic is configured to make the detection in response to receiving an abort request from the producing execution unit during execution of the architectural register result producing instruction that causes the need for the architectural exception; and
wherein the control logic is configured to flash flush from the consuming execution units all instructions younger in program order than the architectural register result producing instruction that causes the need for the architectural exception within a number of clock cycles from reception of the abort request sufficient to prevent all the load/store instructions within the back end that are dependent upon the producing instruction from updating the data cache based on the architectural register result produced by the producing instruction.

5. The microprocessor of claim 1,
wherein to cancel execution of the dependent load/store instructions before the dependent load/store instructions update the data cache, the control logic causes the dependent load/store instructions to have their valid bit cleared.

6. The microprocessor of claim 1,
wherein the control logic is further configured to, in response to the detection, prevent all branch instructions within the back end that are dependent upon the producing instruction from updating a branch predictor of the microprocessor based on the architectural register result produced by the producing instruction.

7. The microprocessor of claim 1,
wherein the control logic is further configured to, in response to the detection, prevent redirection of instruction fetching based on the architectural register result.

8. The microprocessor of claim 1,
wherein the control logic is further configured to, in response to the detection, prevent a memory dependence predictor of the microprocessor from being updated based on the architectural register result.

9. The microprocessor of claim 6,
wherein at least one of the dependent branch instructions comprises an indirect branch instruction that uses the architectural register result as a branch target address.

10. The microprocessor of claim 6,
wherein at least one of the dependent branch instructions comprises a conditional branch instruction that uses the architectural register result as a branch condition.

11. The microprocessor of claim 1,
wherein in response to the detection, the control logic causes the producing execution unit that executes the producing instruction that causes the need for the architectural exception to output, on a result bus, random data rather than the architectural register result.

12. A method for mitigating side channel attacks, comprising:
in a microprocessor that comprises a front end that processes instructions in program order and a back end that is configured to perform speculative execution of instructions out of program order in a superscalar fashion, wherein the back end comprises a plurality of execution units comprising one or more producing execution units configured to produce architectural register results during execution of instructions and one or more consuming execution units configured to consume the produced architectural register results during execution of instructions, wherein the producing and consuming execution units are same execution unit or different execution units:
making a detection that, during execution by a producing execution unit, an architectural register result producing instruction causes a need for an architectural exception and consequent flush of all instructions younger in program order than the producing instruction; and
in response to the detection, preventing all load/store instructions within the back end that are dependent upon the producing instruction from updating a data cache of the microprocessor based on the architectural register result produced by the producing instruction by preventing issuance of the dependent load/store instructions to a consuming execution unit for execution or by canceling execution of the dependent load/store instructions before the dependent load/store instructions update the data cache.

13. The method of claim 12, further comprising:
maintaining a program order identifier of an oldest in program order instruction causing a need for an architectural exception; and
performing a comparison of a program order identifier of instructions issued to the consuming execution units with the program order identifier of the oldest in program order instruction causing a need for an architectural exception and using the comparisons to perform said preventing all the load/store instructions within the back end that are dependent upon the producing instruction from updating the data cache based on the architectural register result produced by the producing instruction.

14. The method of claim 12, further comprising:
providing, by each of the producing execution units along with the architectural register result, an indicator of whether the producing instruction caused a need for an architectural exception; and
using the indicator to perform said preventing all load/store instructions within the back end that are dependent upon the producing instruction from updating the data cache based on the architectural register result produced by the producing instruction.

15. The method of claim 12, further comprising:
wherein said making the detection is made in response to receiving an abort request from the producing execution unit during execution of the architectural register result producing instruction that causes the need for the architectural exception; and
flash flushing from the consuming execution units all instructions younger in program order than the architectural register result producing instruction that causes the need for the architectural exception within a number of clock cycles from reception of the abort request sufficient to prevent all the load/store instructions within the back end that are dependent upon the producing instruction from updating the data cache based on the architectural register result produced by the producing instruction.

16. The method of claim 12,
wherein said canceling execution of the dependent load/store instructions before the dependent load/store instructions update the data cache comprises causing the dependent load/store instructions to have their valid bit cleared.

17. The method of claim 12, further comprising:
in response to the detection, preventing all branch instructions within the back end that are dependent upon the producing instruction from updating a branch predictor of the microprocessor based on the architectural register result produced by the producing instruction.

18. The method of claim 12, further comprising:
in response to the detection, preventing redirection of instruction fetching based on the architectural register result.

19. The method of claim 12, further comprising:
in response to the detection, preventing a memory dependence predictor of the microprocessor from being updated based on the architectural register result.

20. The method of claim 17,
wherein at least one of the dependent branch instructions comprises an indirect branch instruction that uses the architectural register result as a branch target address.

21. The method of claim 17,
wherein at least one of the dependent branch instructions comprises a conditional branch instruction that uses the architectural register result as a branch condition.

22. The method of claim 12, further comprising:
in response to the detection, causing the producing execution unit that executes the producing instruction that causes the need for the architectural exception to output, on a result bus, random data rather than the architectural register result.

\* \* \* \* \*

UNITED STATES PATENT AND TRADEMARK OFFICE
CERTIFICATE OF CORRECTION

PATENT NO. : 11,868,469 B2
APPLICATION NO. : 17/204701
DATED : January 9, 2024
INVENTOR(S) : John G. Favor and Srivatsan Srinivasan Page 1 of 1

It is certified that error appears in the above-identified patent and that said Letters Patent is hereby corrected as shown below:

In the Claims

In Column 48, Lines 28-32, in Claim 1, delete "preventing issuance of the dependent load/store instructions to a consuming execution unit for execution or by canceling execution of the dependent load/store instructions before the dependent load/store instructions update the data cache." and insert -- preventing issuance of the dependent load/store instructions to a consuming execution unit for execution or by canceling execution of the dependent load/store instructions before the dependent load/store instructions update the data cache. --, at Line 27, after "by" as a continuation subpoint.

Signed and Sealed this
Twentieth Day of February, 2024

Katherine Kelly Vidal
*Director of the United States Patent and Trademark Office*